(12) United States Patent
van de Rijt et al.

(10) Patent No.: US 11,490,757 B2
(45) Date of Patent: Nov. 8, 2022

(54) COOKING DEVICES AND METHODS OF USING THE SAME

(71) Applicant: Provisur Technologies, Inc., Chicago, IL (US)

(72) Inventors: Frederik N. L. A. van de Rijt, Hedel (NL); Pieter Auke Bosma, Voorhout (NL); Patrick Xander Steensma, Wateringen (NL); Inge van der Helm, Delft (NL)

(73) Assignee: Provisur Technologies, Inc., Chicago, IL (US)

( * ) Notice: Subject to any disclaimer, the term of this patent is extended or adjusted under 35 U.S.C. 154(b) by 528 days.

(21) Appl. No.: 16/589,901

(22) Filed: Oct. 1, 2019

(65) Prior Publication Data
US 2020/0029722 A1    Jan. 30, 2020

Related U.S. Application Data

(62) Division of application No. 15/442,077, filed on Feb. 24, 2017, now Pat. No. 10,463,187.
(Continued)

(51) Int. Cl.
*A47J 37/04* (2006.01)
*A47J 27/14* (2006.01)
(Continued)

(52) U.S. Cl.
CPC ............. *A47J 27/14* (2013.01); *A21B 1/245* (2013.01); *A21B 1/48* (2013.01); *A47J 37/044* (2013.01); *A47J 37/045* (2013.01); *F24C 15/322* (2013.01)

(58) Field of Classification Search
CPC ... A21B 1/48; A21B 1/245; A21B 1/26; A47J 37/045; A47J 37/044; A47J 37/0641; A47J 37/0647
See application file for complete search history.

(56) References Cited

U.S. PATENT DOCUMENTS 2,083,864 A   6/1937  Puckett
2,228,998 A   1/1941  Birdseye
(Continued)

FOREIGN PATENT DOCUMENTS

CA     2882647 C      5/2007
CN    101855151 A    10/2010
(Continued)

OTHER PUBLICATIONS

International Search Report for PCT/NL2013/050043, dated May 29, 2013, 5 pages.
(Continued)

*Primary Examiner* — Reginald Alexander
(74) *Attorney, Agent, or Firm* — Klintworth & Rozenblat IP LLP

(57) ABSTRACT

In one aspect, a cooking device includes independently controllable cooking zones. In one aspect, a cooking device includes a first cooking zone with heated air configured to move horizontally there through in a first direction and a second cooking zone with heated air configured to move horizontally there through in a second direction different than the first direction. In one aspect, the first and second directions are opposite directions. In one aspect, the heated air flows from one side of the cooking device.

17 Claims, 36 Drawing Sheets

Related U.S. Application Data

(60) Provisional application No. 62/300,639, filed on Feb. 26, 2016.

(51) Int. Cl.
*A21B 1/24* (2006.01)
*A21B 1/48* (2006.01)
*F24C 15/32* (2006.01)

(56) References Cited

U.S. PATENT DOCUMENTS

| | | | |
|---|---|---|---|
| 3,443,505 A | 5/1969 | Kaufman, Jr. | |
| 3,706,378 A | 12/1972 | Markwick | |
| 3,905,760 A | 9/1975 | Johansson et al. | |
| 3,908,533 A | 9/1975 | Fagerstrom et al. | |
| 3,938,651 A | 2/1976 | Alfred et al. | |
| 4,039,278 A | 8/1977 | Denholm | |
| 4,089,322 A | 5/1978 | Guibert | |
| 4,118,181 A | 10/1978 | Onodera | |
| 4,120,646 A * | 10/1978 | Groff | A21B 1/48 |
| | | | 126/91 A |
| 4,191,881 A | 3/1980 | Ahlgren et al. | |
| 4,479,310 A | 10/1984 | Duc | |
| 4,548,191 A | 10/1985 | Hwang | |
| 4,565,282 A | 1/1986 | Olsson et al. | |
| 4,631,029 A | 12/1986 | Lanham et al. | |
| 4,648,314 A | 3/1987 | Plicht et al. | |
| 4,689,303 A | 8/1987 | Kraft et al. | |
| 4,716,820 A * | 1/1988 | Stuck | A47J 37/044 |
| | | | 99/443 C |
| 4,750,416 A | 6/1988 | Graham | |
| 4,812,622 A | 3/1989 | Takeda et al. | |
| 4,830,175 A | 5/1989 | Durst et al. | |
| 4,831,238 A | 5/1989 | Smith et al. | |
| 4,875,343 A | 10/1989 | Jeppsson | |
| RE33,510 E | 1/1991 | Williams | |
| 5,078,120 A | 1/1992 | Hwang | |
| 5,111,929 A | 5/1992 | Pierick et al. | |
| 5,189,948 A | 3/1993 | Liebermann | |
| 5,228,557 A | 7/1993 | Lago | |
| 5,243,962 A | 9/1993 | Hwang | |
| 5,322,007 A | 6/1994 | Caridis et al. | |
| 5,329,916 A | 7/1994 | Lygum | |
| 5,335,590 A | 8/1994 | Crump, III et al. | |
| 5,343,714 A | 9/1994 | Kiczek et al. | |
| 5,394,791 A | 3/1995 | Vallee | |
| 5,460,260 A | 10/1995 | Ochs et al. | |
| 5,515,775 A | 5/1996 | Crump, III et al. | |
| RE35,259 E | 6/1996 | Williams | |
| 5,615,603 A | 4/1997 | Polin | |
| 5,702,245 A | 12/1997 | London | |
| 5,743,376 A | 4/1998 | Ochs | |
| 5,836,240 A | 11/1998 | Kuenen | |
| 5,850,781 A | 12/1998 | Kuenen | |
| 5,942,265 A | 8/1999 | Roberds et al. | |
| 6,065,463 A | 5/2000 | Martin | |
| 6,095,805 A | 8/2000 | Kuenen | |
| 6,138,660 A | 10/2000 | Middleton, Jr. | |
| 6,244,168 B1 | 6/2001 | van de Vorst et al. | |
| 6,247,922 B1 | 6/2001 | Kuenen | |
| 6,494,131 B2 | 12/2002 | van de Vorst et al. | |
| 6,531,172 B2 | 3/2003 | Perrine | |
| 6,658,993 B2 | 12/2003 | Kuenen | |
| 6,689,407 B2 | 2/2004 | Shefet et al. | |
| 6,691,698 B2 | 2/2004 | Gunawardena et al. | |
| 6,713,107 B2 | 3/2004 | Shefet et al. | |
| 6,932,210 B2 | 8/2005 | Krämer | |
| 7,107,899 B2 | 9/2006 | Nothum, Jr. | |
| 7,178,662 B2 | 2/2007 | Olsson et al. | |
| 7,258,226 B2 | 8/2007 | Nelson et al. | |
| 7,258,227 B2 | 8/2007 | Rettore et al. | |
| 7,270,231 B2 | 9/2007 | Heber | |
| 7,374,035 B2 | 5/2008 | Olsson et al. | |
| 7,494,005 B2 | 2/2009 | Messick, Jr. et al. | |
| 7,565,967 B2 | 7/2009 | Maine, Jr. et al. | |
| 7,975,840 B2 | 7/2011 | Messick, Jr. et al. | |
| 7,987,972 B2 | 8/2011 | Hennigar et al. | |
| 8,302,765 B2 | 11/2012 | Lago | |
| 8,333,087 B2 * | 12/2012 | McCormick | A21B 1/26 |
| | | | 62/411 |
| 8,348,046 B1 | 1/2013 | Baumgardner et al. | |
| 8,381,499 B2 | 2/2013 | Parisini et al. | |
| 8,415,592 B2 | 4/2013 | Kuenen | |
| 8,424,676 B2 | 4/2013 | Jones et al. | |
| 8,646,383 B1 | 2/2014 | Howard | |
| 8,707,861 B2 | 4/2014 | Gunawardena | |
| 8,753,703 B2 | 6/2014 | Gunawardena et al. | |
| 8,800,757 B2 | 8/2014 | Malmberg et al. | |
| 8,807,021 B2 | 8/2014 | McVeagh et al. | |
| 8,820,517 B2 | 9/2014 | Gramby | |
| 8,839,714 B2 | 9/2014 | Schjerven, Sr. et al. | |
| 8,839,779 B2 | 9/2014 | Wiker et al. | |
| 9,021,944 B2 | 5/2015 | Leferink et al. | |
| 9,044,022 B2 | 6/2015 | Van Der Eerden et al. | |
| 9,061,829 B2 | 6/2015 | Salsone et al. | |
| 9,107,422 B2 | 8/2015 | Howard et al. | |
| 9,161,651 B2 | 10/2015 | Ros et al. | |
| 9,169,074 B2 | 10/2015 | Messick, Jr. et al. | |
| 9,220,276 B2 | 12/2015 | Howard | |
| 9,221,611 B2 | 12/2015 | Ulchak et al. | |
| 9,320,284 B2 | 4/2016 | Van Camp et al. | |
| 9,585,400 B2 | 3/2017 | Wiker et al. | |
| 9,585,401 B2 | 3/2017 | Wiker et al. | |
| 2002/0029698 A1 | 3/2002 | van de Vorst et al. | |
| 2004/0103923 A1 | 6/2004 | Brink | |
| 2006/0054465 A1 | 3/2006 | Kraus et al. | |
| 2007/0298148 A1 | 12/2007 | van der Eerden et al. | |
| 2009/0120304 A1 | 5/2009 | Ishino | |
| 2010/0058937 A1 | 3/2010 | Leferink et al. | |
| 2011/0084056 A1 | 4/2011 | Kuenen | |
| 2011/0168689 A1 | 7/2011 | Kuenen | |
| 2011/0226137 A1 | 9/2011 | van der Eerden et al. | |
| 2011/0247355 A1 | 10/2011 | McCormick | |
| 2011/0297513 A1 | 12/2011 | Lago | |
| 2013/0133637 A1 | 5/2013 | McVeagh et al. | |
| 2013/0220145 A1 | 8/2013 | Ros et al. | |
| 2014/0037809 A1 | 2/2014 | Middleton, Jr. | |
| 2014/0202339 A1 * | 7/2014 | Cole | A47J 37/045 |
| | | | 99/443 C |
| 2015/0079259 A1 | 3/2015 | Ahmed | |
| 2015/0245643 A1 | 9/2015 | Kop et al. | |
| 2015/0250213 A1 | 9/2015 | Howard | |
| 2015/0342227 A1 | 12/2015 | Verbruggen et al. | |
| 2015/0353285 A1 | 12/2015 | Matsuzaki et al. | |
| 2017/0245671 A1 | 8/2017 | van de Rijt | |

FOREIGN PATENT DOCUMENTS

| | | | |
|---|---|---|---|
| CN | 2346754 A2 | 7/2011 | |
| CN | 102202989 A | 9/2011 | |
| CN | 102405181 A | 4/2012 | |
| DE | 10 2013 105 034 A1 | 11/2013 | |
| EP | 0 333 565 B1 | 9/1989 | |
| EP | 0528593 A1 | 2/1993 | |
| EP | 0953286 A1 | 11/1999 | |
| EP | 1069387 A1 | 1/2001 | |
| EP | 1688687 A1 | 8/2006 | |
| EP | 2135509 A1 | 12/2009 | |
| EP | 2200913 A1 | 6/2010 | |
| EP | 2421775 A2 | 2/2012 | |
| EP | 2679097 A1 | 1/2014 | |
| FR | 2428977 A1 | 1/1980 | |
| GB | 2096878 A | 10/1982 | |
| GB | 2129269 A | 5/1984 | |
| GB | 2206190 A | 12/1988 | |
| JP | 5323965 B1 * | 10/2013 | A21B 1/10 |
| WO | 99/57496 A1 | 11/1999 | |
| WO | 2005096826 A1 | 10/2005 | |
| WO | 2006/049492 A1 | 5/2006 | |

(56) References Cited

FOREIGN PATENT DOCUMENTS

WO          2009084949 A2     7/2009
WO          2014170134 A1     10/2014

OTHER PUBLICATIONS

FMC Foodtech, The Optimized Oven, published at least as early as May 4, 2016, 12 pages.
International Search Report and Written Opinion for PCT/US17/19431 dated Jun. 27, 2017, 37 pages.
International Search Report and Written Opinion for PCT/US2017/031230 dated Sep. 21, 2017, 21 pages.
Extended European Search Report for application No. 17757334.2 dated Dec. 11, 2019 (10 pages).

* cited by examiner

FIG. 6

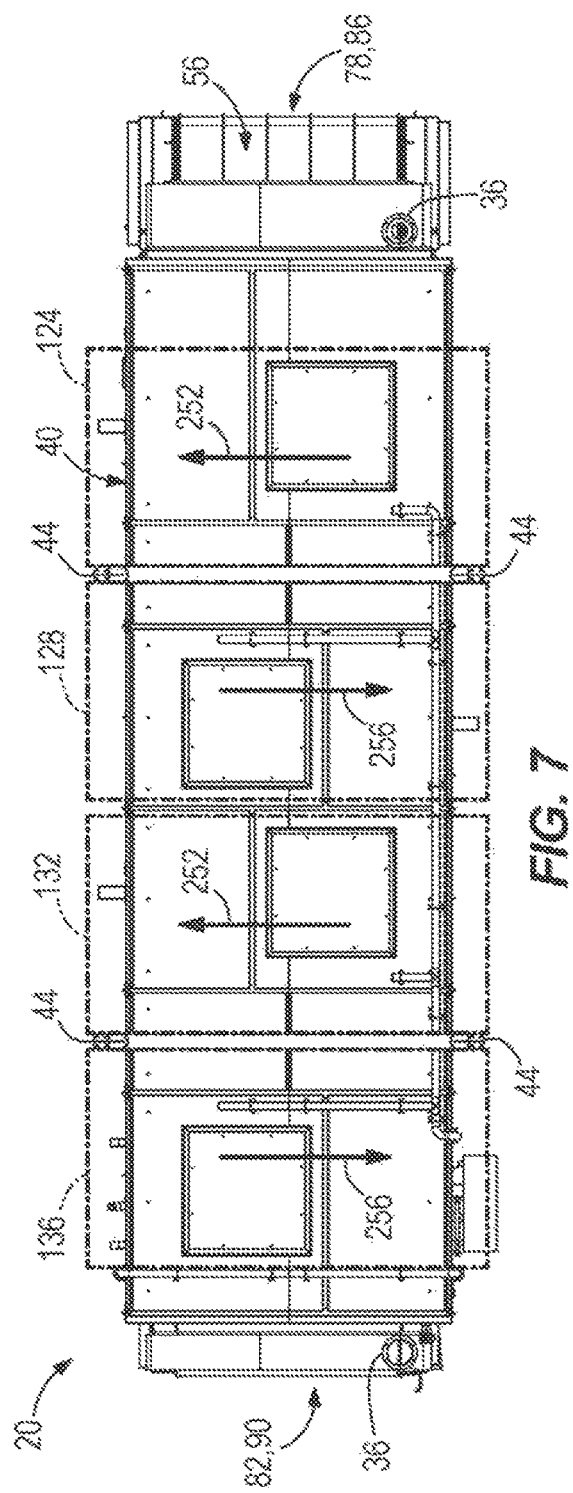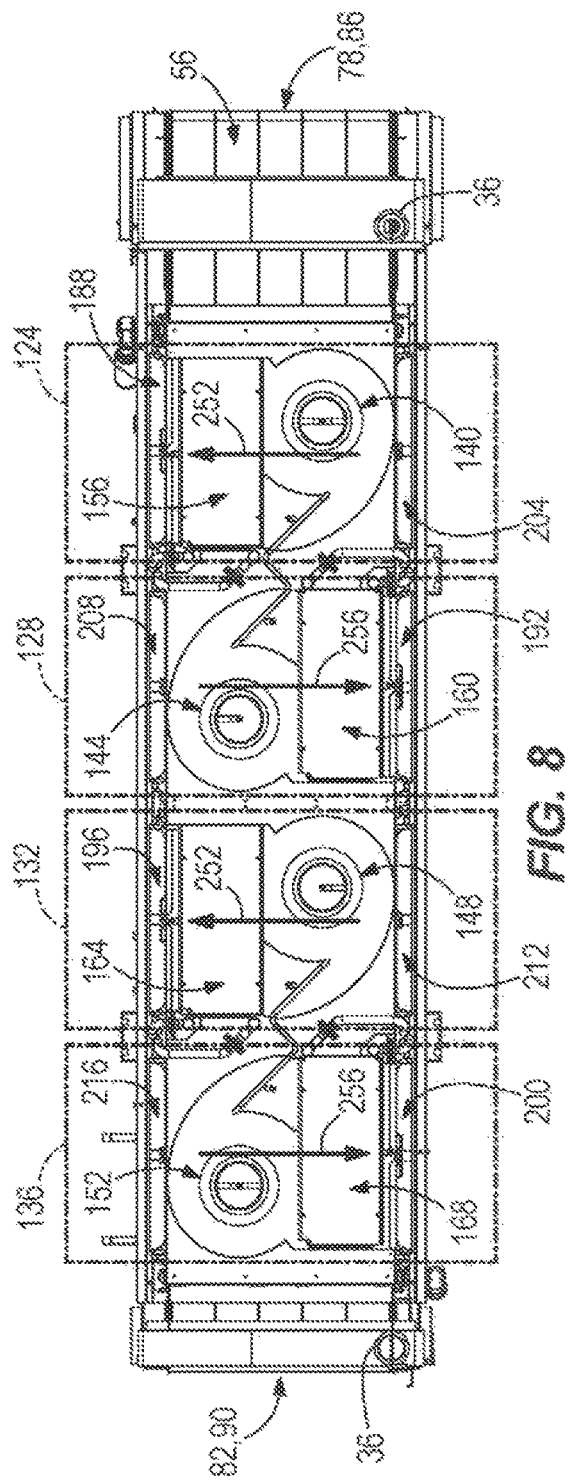

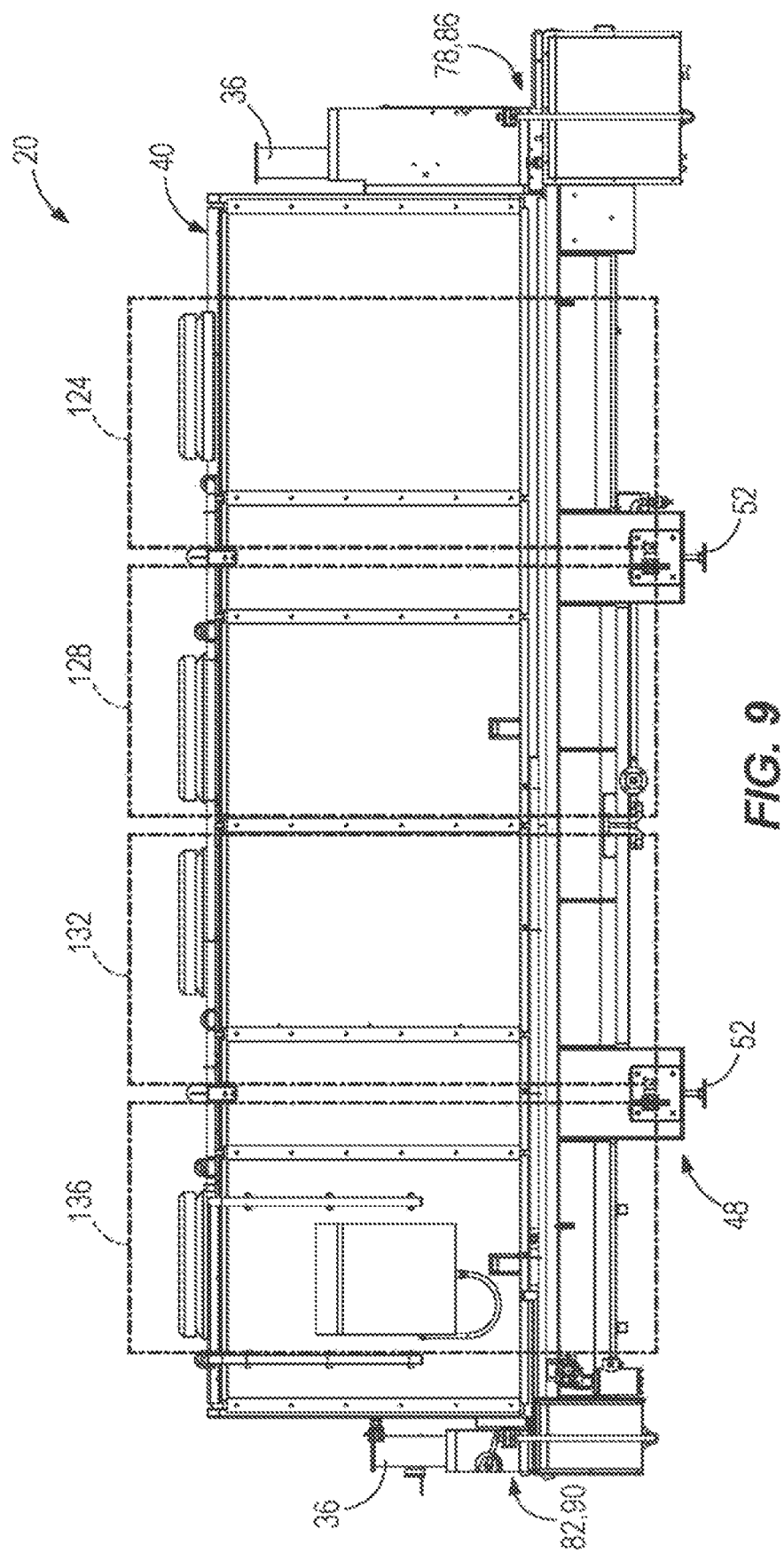

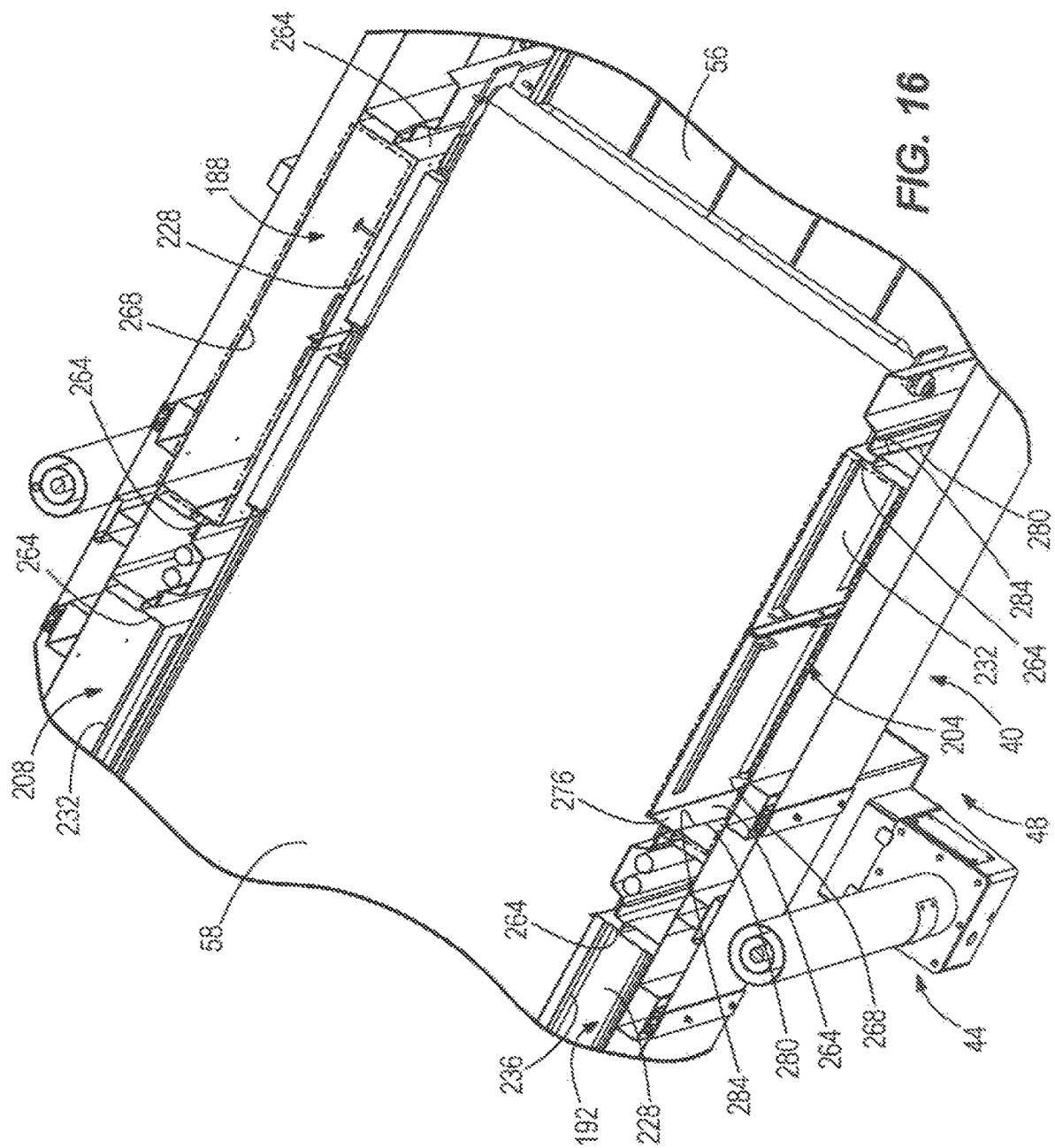

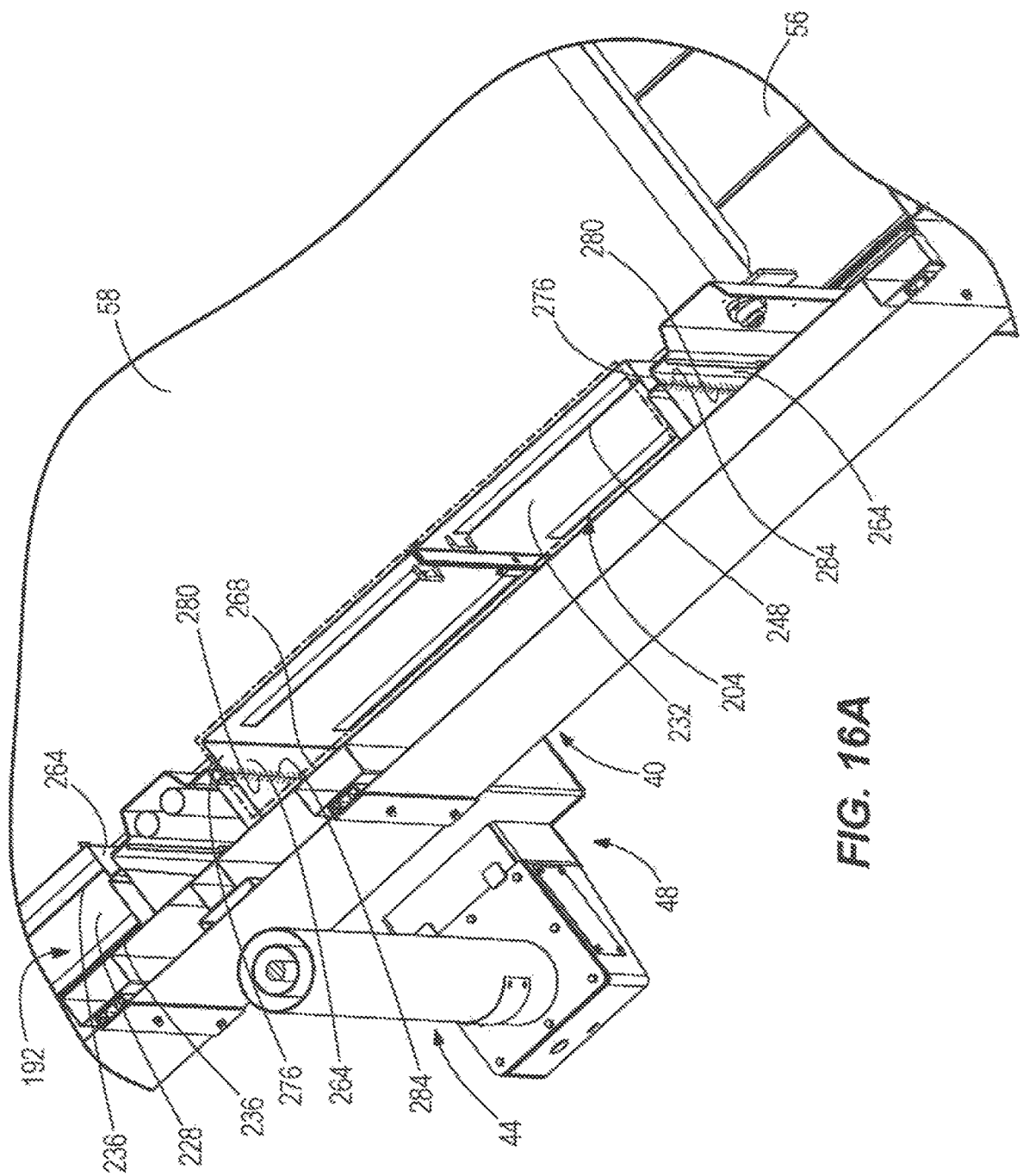

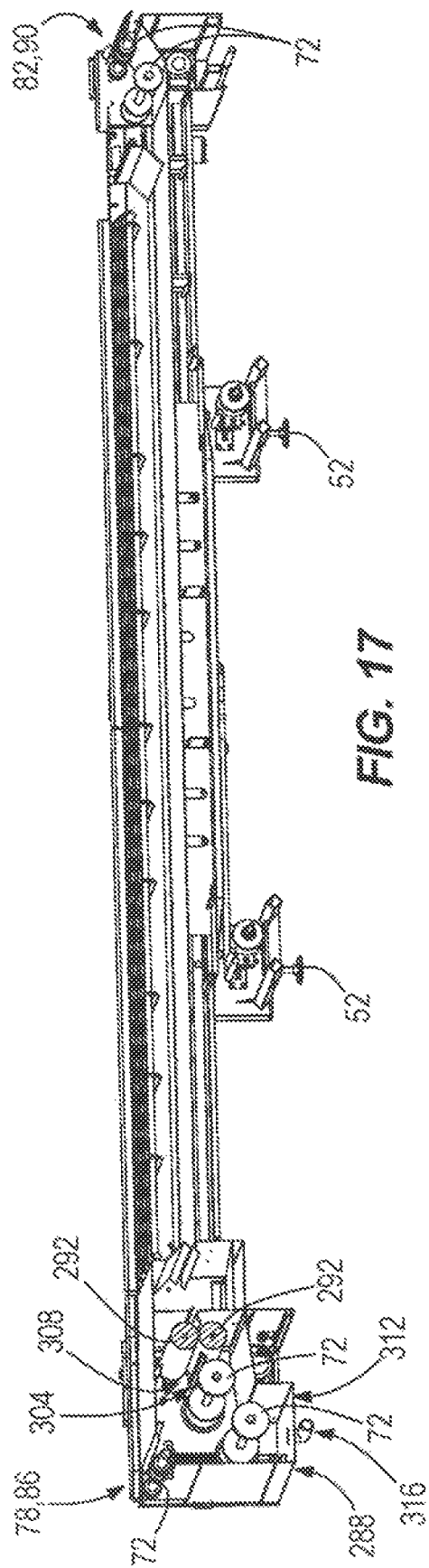

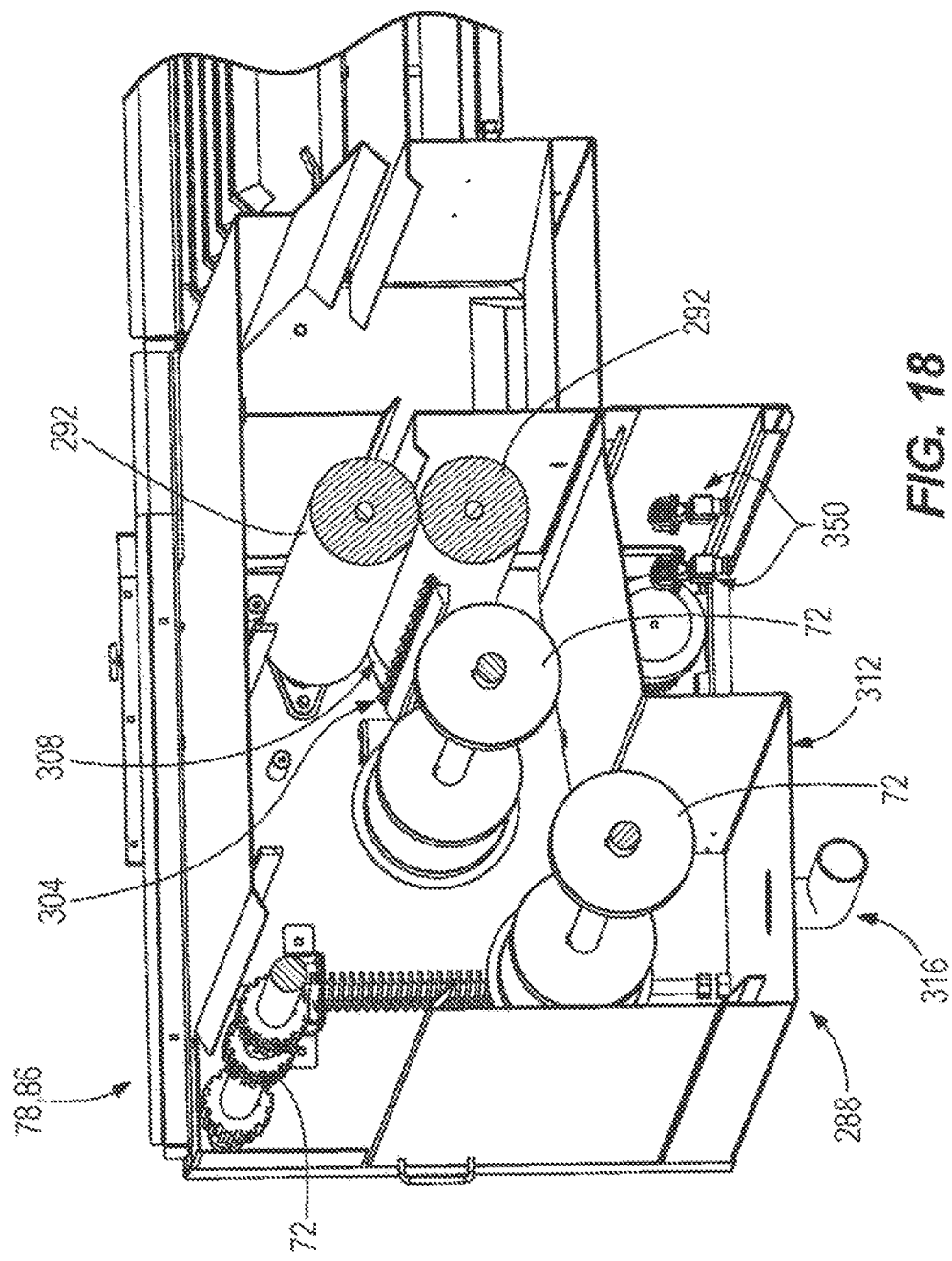

COOKING DEVICES AND METHODS OF USING THE SAME

RELATED APPLICATIONS

The present application is a divisional application of, and claims the priority benefit of, co-pending U.S. patent application Ser. No. 15/442,077, filed Feb. 24, 2017, which is incorporated by reference herein. U.S. patent application Ser. No. 15/442,077 and the present application claim the priority benefit of U.S. Provisional Patent Application No. 62/300,639, filed Feb. 26, 2016, which is incorporated by reference herein.

FIELD OF THE INVENTION

The present disclosure generally relates to a cooking device for cooking food product and, more particularly, to a cooking device including improved cooking performance of food products.

BACKGROUND

Many conventional cooking devices exist and are used to cook food product in a variety of manners. Such conventional cooking devices attempt to cook food product in reliable, consistent and efficient manners. However, such conventional cooking devices fall short in achieving one or more of these desired results, thereby resulting in one or more deficiencies of the conventional cooking devices. Accordingly, a need exists for a cooking device that is capable of cooking food product in one or more of uniform, reliable, consistent and/or efficient manners.

SUMMARY

Thus, a need exists for a cooking device that is capable of cooking food product in one or more of reliable, consistent and/or efficient manners.

In one aspect, a cooking device is provided.

In one aspect, a method of operating a cooking device is provided.

In one aspect, a cooking device is provided and includes a plurality of independently controlled cooking zones, in which at least one of temperature, pressure, humidity, and air flow may be controlled within each zone independently of another zone.

In one aspect, a method of controlling a cooking device is provided and includes independently controlling a plurality of zones within the cooking device.

In one aspect, a cooking device is provided and includes a first cooking zone and a second cooking zone, wherein food product is configured to pass through the first cooking zone and the second cooking zone, and wherein heated air passes through the first cooking zone in a first direction and heated air passes through the second cooking zone in a second direction different than the first direction.

In one aspect, a method of cooking food product is provided and includes passing heated air through a first cooking zone of a cooking device in a first direction and passing heated air through a second cooking zone in a second direction different than the first direction.

In one aspect, a cooking device is provided and includes a first cooking zone with air configured to move horizontally there through in a first direction and a second cooking zone with air configured to move horizontally there through in a second direction different than the first direction.

In one aspect, the second direction may be opposite the first direction.

In one aspect, the cooking device may have a longitudinal extent and the first and second directions may be transverse to the longitudinal extent.

In one aspect, the first and second directions may be generally perpendicular to the longitudinal extent of the cooking device.

In one aspect, the cooking device may include a top, a bottom, an inlet end, an outlet end, a left side and a right side, and the first direction may be from the left side to the right side, and the second direction may be from the right side to the left side.

In one aspect, the cooking device may further include a first adjustable opening in fluid communication with the first cooking zone and a second adjustable opening in fluid communication with the second cooking zone. The heated air is configured to pass through the first adjustable opening into the first cooking zone and heated air is configured to pass through the second adjustable opening into the second cooking zone. A size of the first adjustable opening and a size of the second adjustable opening are adjustable.

In one aspect, the cooking device may further include a conveyor belt at least partially positioned in the first cooking zone and the second cooking zone. The conveyor belt is configured to transport food product thereon through the first cooking zone and the second cooking zone.

In one aspect, the cooking device may further include a first conveyor belt, a second conveyor belt positioned above the first conveyor belt, and a third conveyor belt positioned above the first and second conveyor belts. The first, second and third conveyor belts are at least partially positioned in the first cooking zone and the second cooking zone. The first, second and third conveyor belts are configured to transport food product thereon through the first cooking zone and the second cooking zone.

In one aspect, the cooking device may further include a third cooking zone with air configured to move horizontally there through in the first direction, and a fourth cooking zone with air configured to move horizontally there through in the second direction.

In one aspect, the first, second, third and fourth zones may be consecutively positioned in the cooking device from an infeed end of the cooking device to an outlet end of the cooking device.

In one aspect, a cooking device is provided and includes a first cooking zone including a first temperature sensor positioned in the first cooking zone, a first heating element positioned in the first cooking zone and configured to receive a quantity of fuel, and a first fuel valve configured to control the quantity of fuel provided to the first heating element. The cooking device also includes a second cooking zone including a second temperature sensor positioned in the second cooking zone, a second heating element positioned in the second cooking zone and configured to receive a quantity of fuel, and a second fuel valve configured to control the quantity of fuel provided to the second heating element. The cooking device further includes a conveyor belt at least partially positioned in the first cooking zone and the second cooking zone. The conveyor belt is configured to transport food product through the first cooking zone and the second cooking zone.

In one aspect, the cooking device may have a longitudinal extent, and the first cooking zone and the second cooking zone may be consecutively positioned in the cooking device from an infeed end of the cooking device to an outlet end of the cooking device.

In one aspect, the first and second fuel valves may be pneumatically controlled.

In one aspect, the first and second cooking zones may be substantially similar in size.

In one aspect, the first cooking zone may further include a first fan positioned therein configured to move heated air through the first cooking zone, the second cooking zone may further include a second fan positioned therein configured to move heated air through the second cooking zone, and the first fan and the second fan may be configured to operate independently of each other.

In one aspect, the first fan may be configured to horizontally move heated air through the first cooking zone in a first direction, and the second fan may be configured to horizontally move heated air through the second cooking zone in a second direction different than the first direction.

In one aspect, at least one of the first heating element and the first fan may be controlled based on a type of food product to be cooked by the cooking device.

In one aspect, both the first heating element and the first fan may be controlled based on the type of food product to be cooked by the cooking device.

In one aspect, the first cooking zone may further include a first adjustable opening in fluid communication with the first cooking zone, wherein heated air is configured to pass through the first adjustable opening into the first cooking zone. The second cooking zone may further include a second adjustable opening in fluid communication with the second cooking zone, wherein heated air is configured to pass through the second adjustable opening into the second cooking zone.

In one aspect, the first fuel valve may be associated with the first temperature sensor and operation of the first fuel valve may be dependent on a temperature reading of the first temperature sensor. The second fuel valve may be associated with the second temperature sensor and operation of the second fuel valve may be dependent on a temperature reading of the second temperature sensor.

In one aspect, a cooking device is provided and includes a first cooking zone with air configured to move horizontally there through in a first direction and a second cooking zone with air configured to move horizontally there through in a second direction different than the first direction.

In one aspect, the second direction may be opposite the first direction.

In one aspect, the cooking device may have a longitudinal extent, and the first and second directions may be transverse to the longitudinal extent.

In one aspect, the first and second directions may be generally perpendicular to the longitudinal extent of the cooking device.

In one aspect, the cooking device may include a top, a bottom, an inlet end, an outlet end, a left side and a right side opposite the left side. The first direction may be from the left side to the right side, and the second direction may be from the right side to the left side.

In one aspect, the cooking device may further include a first adjustable opening in fluid communication with the first cooking zone and a second adjustable opening in fluid communication with the second cooking zone. The heated air may be configured to pass through the first adjustable opening into the first cooking zone and heated air may be configured to pass through the second adjustable opening into the second cooking zone, and a size of the first adjustable opening and a size of the second adjustable opening may be adjustable.

In one aspect, the cooking device may further include a first adjustable nozzle defining the first adjustable opening therein and a second adjustable nozzle defining the second adjustable opening therein. The first adjustable nozzle may include a first member and a second member spaced apart from the first member to define the first adjustable opening therebetween, and at least one of the first member and the second member of the first adjustable nozzle may be movable relative to each other to adjust a size of the first adjustable opening. The second adjustable nozzle may include a first member and a second member spaced apart from the first member to define the second adjustable opening therebetween, and at least one of the first member and the second member of the second adjustable nozzle may be movable relative to each other to adjust a size of the second adjustable opening.

In one aspect, the first member and the second member of the first adjustable nozzle may converge toward one another to provide a first nozzle inlet that is larger than a first nozzle outlet, and the first member and the second member of the second adjustable nozzle may converge toward one another to provide a second nozzle inlet that is larger than a second nozzle outlet.

In one aspect, one of the first member and the second member of the first adjustable nozzle may be fixed and the other one of the first member and the second member of the first adjustable nozzle may be moveable, and one of the first member and the second member of the second adjustable nozzle may be fixed and the other one of the first member and the second member of the second adjustable nozzle may be moveable.

In one aspect, the cooking device may further include a conveyor belt at least partially positioned in the first cooking zone and the second cooking zone, and the conveyor belt may be configured to transport food product thereon through the first cooking zone and the second cooking zone.

In one aspect, the cooking device may further include a first conveyor belt, a second conveyor belt positioned above the first conveyor belt, and a third conveyor belt positioned above the first and second conveyor belts. The first, second and third conveyor belts may be at least partially positioned in the first cooking zone and the second cooking zone, and the first, second and third conveyor belts may be configured to transport food product thereon through the first cooking zone and the second cooking zone.

In one aspect, the cooking device may further include a first cooking location between the first conveyor belt and the second conveyor belt, a second cooking location between the second conveyor belt and the third conveyor belt, a third cooking location above the third conveyor belt, a first adjustable opening in fluid communication with the first cooking location, wherein heated air may be configured to pass through the first adjustable opening into the first cooking location, a second adjustable opening in fluid communication with the second cooking location, wherein heated air may be configured to pass through the second adjustable opening into the second cooking location, and a third adjustable opening in fluid communication with the third cooking location, wherein heated air may be configured to pass through the third adjustable opening into the third cooking location.

In one aspect, the first adjustable opening, the second adjustable opening and the third adjustable opening may be adjustable independent of each other.

In one aspect, heated air may move horizontally through the first cooking location, the second cooking location and the third cooking location.

In one aspect, the cooking device may further include a first air guiding plate positioned in the first cooking zone to at least partially assist with guiding air horizontally through the first cooking zone, and a second air guiding plate positioned in the second cooking zone to at least partially assist with guiding air horizontally through the second cooking zone.

In one aspect, the first air guiding plate may also be a first drip pan configured to catch debris within the first cooking zone, and the second air guiding plate may also be a second drip pan configured to catch debris within the second cooking zone.

In one aspect, the cooking device may further include a third cooking zone with air configured to move horizontally there through in the first direction, and a fourth cooking zone with air configured to move horizontally there through in the second direction.

In one aspect, the first, second, third and fourth zones may be consecutively positioned in the cooking device from an infeed end of the cooking device to an outlet end of the cooking device.

In one aspect, a cooking device is provided and includes a plurality of vertically oriented cooking tiers, wherein each of the cooking tiers includes a conveyor belt.

In one aspect, the plurality of vertically oriented cooking tiers may be comprised of an uneven quantity of vertically oriented cooking tiers.

In one aspect, the cooking device may be configured to selectively operate any uneven quantity of the plurality of cooking tiers to cook food product.

In one aspect, the cooking device may be configured to operate all of the cooking tiers to cook food product.

In one aspect, the conveyor belts of the plurality of vertically oriented cooking tiers may be configured to transport food product in alternating directions.

In one aspect, the conveyor belts of the plurality of vertically oriented cooking tiers may further include a first conveyor belt configured to rotate in a first manner to transport food product in a first direction, a second conveyor belt positioned above the first conveyor belt and configured to rotate in a second manner to transport food product in a second direction opposite the first direction, and a third conveyor belt positioned above the second conveyor belt and configured to rotate in the first manner to transport food product in the first direction.

In one aspect, the cooking device may further include a first conveyor belt, a second conveyor belt positioned above the first conveyor belt, and a third conveyor belt positioned above the first and second conveyor belts. The first, second and third conveyor belts may be at least partially positioned in the first cooking zone and the second cooking zone, and the first, second and third conveyor belts may be configured to transport food product thereon through the first cooking zone and the second cooking zone.

In one aspect, the cooking device may further include a first cooking location between the first conveyor belt and the second conveyor belt, a second cooking location between the second conveyor belt and the third conveyor belt, a third cooking location above the third conveyor belt, a first adjustable opening in fluid communication with the first cooking location, wherein heated air may be configured to pass through the first adjustable opening into the first cooking location, a second adjustable opening in fluid communication with the second cooking location, wherein heated air may be configured to pass through the second adjustable opening into the second cooking location, and a third adjustable opening in fluid communication with the third cooking location, wherein heated air is configured to pass through the third adjustable opening into the third cooking location.

In one aspect, heated air passing through the first adjustable opening may pass horizontally through the first cooking location, heated air passing through the second adjustable opening may pass horizontally through the second cooking location, and heated air passing through the third adjustable opening may pass horizontally through the third cooking location.

In one aspect, the cooking device may further include a heating element to heat air within the cooking device and a fan configured to move air through the cooking device. The heating element and the fan may be positioned above the plurality of vertical oriented cooking tiers.

In one aspect, the cooking device may further include a return air chamber in fluid communication with the fan and the plurality of vertically oriented cooking tiers. The fan may be configured to move air from the plurality of vertically oriented cooking tiers into the return air chamber, and the return air chamber may be positioned substantially below the fan.

In one aspect, the cooking device may further include a fan chamber in fluid communication with the return air chamber, and the fan chamber may be positioned above the plurality of vertically oriented cooking tiers. The air may move from the return air chamber directly into the fan chamber.

In one aspect, the heating element and the fan may be positioned over top of the plurality of vertical oriented cooking tiers.

In one aspect, the cooking device may further include a humidifying element configured to emit steam into the cooking device.

In one aspect, the humidifying element may be positioned between the fan and the heating element.

In one aspect, the cooking device may further include a cleaning device configured to clean at least one of the conveyor belts of the plurality of vertically oriented cooking tiers.

In one aspect, the cleaning device may include a sprayer and a brush, and the sprayer may be configured to spray liquid onto the at least one of the conveyor belts and the brush may be configured to engage the at least one of the conveyor belts.

In one aspect, the cleaning device may only clean a lowest one of the conveyor belts of the plurality of vertically oriented cooking tiers.

In one aspect, the cleaning device may be configured to clean the at least one of the conveyor belts during a cooking operation of the cooking device.

In one aspect, a cooking device is provided and includes a conveyor belt configured to move food product through the cooking device, a fan configured to move heated air through the cooking device, and a dual-functional member positioned in the cooking device configured to guide heated air through the cooking device and catch debris falling from the conveyor belt.

In one aspect, the dual functional member may be positioned below the conveyor belt.

In one aspect, the conveyor belt may be a first conveyor belt including a first top surface and defining a first cooking location above the first top surface. The cooking device may further include a second conveyor belt positioned below and spaced-apart from the first conveyor belt. The second conveyor belt may include a second top surface and may define a second cooking location above the second top surface. The dual-functional member may be positioned in the second cooking location to guide heated air through the second cooking location and catch debris falling from the first conveyor belt.

In one aspect, the dual-functional member may include a drain configured to allow debris to pass therethrough and from the dual-functional member.

In one aspect, the dual-functional member may have a floor surface angled toward the drain.

In one aspect, the dual-functional member may be selectively removable from the cooking device.

In one aspect, a cooking device is provided and includes a base including a surface and a hood coupled to the base and moveable relative to the base between a raised position, in which the hood is moved vertically upward relative to and spaced above the base, and a lowered position, in which the hood is moved downward toward the base for cooking operation. The cooking device also includes a plurality of sealing members coupled to one of the base and the hood. The plurality of sealing members engage the other one of the base and the hood with the hood in the lowered position and do not engage the other one of the base and the hood with the hood in the raised position. The cooking device further includes a plurality of cooking zones at least partially defined in the cooking device by the plurality of sealing members, wherein cooking conditions within each of the plurality of cooking zones is independently controlled.

In one aspect, the plurality of sealing members may be one of dividing members or engagement members.

In one aspect, the plurality of sealing members may be comprised of both dividing members and engagement members.

In one aspect, the plurality of sealing members may comprise a plurality of dividing members. The plurality of dividing members may extend from an interior surface of the hood and may be movable with the hood. Each of the plurality of dividing members may include a flexible portion. The flexible portion of each of the dividing members may contact a surface of the base in the lowered position and may not contact the surface with the hood in the raised position.

In one aspect, the cooking device may further include a plurality of engagement members coupled to the base and spaced-apart from one another. The engagement members may be configured to engage the hood with the hood in the lowered position and may not engage the hood with the hood in the raised position. The plurality of engagement members may cooperate with the plurality of dividing members to at least partially define the plurality of cooking zones within the cooking device.

In one aspect, the hood may include a front, a rear opposite the front, a first side between the front and the rear, a second side opposite the first side and between the front and the rear, and a top. The plurality of dividing members may extend downward from the top of the hood, and the engagement members may be coupled to a side of the base and may engage one of the first side and the second side of the hood.

In one aspect, the plurality of sealing members may comprise a plurality of engagement members coupled to the base and spaced-apart from one another. The engagement members may be configured to engage the hood with the hood in the lowered position and may not engage the hood with the hood in the raised position.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 6 is a top perspective view of the cross-section of the cooking device shown in FIG. 5, according to one aspect of the present disclosure.

FIG. 7 is a top view of the cooking device shown in FIG. 1 with one example of a plurality of cooking zones and one example of air flow directions through the plurality of cooking zones, according to one aspect of the present disclosure.

FIG. 8 is a top view of a portion of the cooking device shown in FIG. 1 with the hood removed and the examples of the plurality of cooking zones and air flow directions illustrated in FIG. 7, according to one aspect of the present disclosure.

FIG. 9 is an elevational view of the cooking device shown in FIG. 1 with the examples of the plurality of cooking zones illustrated in FIGS. 7 and 8, according to one aspect of the present disclosure.

FIG. 16 is a top perspective view of a portion of the cooking device shown in FIG. 1 with the hood engaging the engagement members between the plurality of cooking zones to assist with defining air chambers on both sides of each of the plurality of cooking zones through which air may pass, wherein at least some of the air chambers are highlighted with a dashed line for better emphasis, according to one aspect of the present disclosure.

FIG. 16A is an enlarged top perspective view of a portion of the cooking device shown in FIG. 16, according to one aspect of the present disclosure.

FIG. 17 is a top perspective view of one example of a belt cleaning system of the cooking device shown in FIG. 1 with the main conveyor belt removed to better illustrate portions of the belt cleaning system, according to one aspect of the present disclosure.

FIG. 18 is a top perspective of a portion of the belt cleaning system shown in FIG. 17 with the main conveyor belt removed to better illustrate portions of the belt cleaning system, according to one aspect of the present disclosure.

DETAILED DESCRIPTION

Referring to FIGS. 1-18, one example of a cooking device 20 is illustrated. The cooking device 20 is configured to cook a wide variety of food products passing therethrough in a variety of desired manners. For example, food products that may be cooked by the cooking device 20 may include, but are not limited to, beef, chicken, pork, seafood, vegetable, or any other material, and may include a wide variety of forms including, but not limited to, patties, chicken legs, chicken wings, meatballs, filets, chunks, or any other form. In one example, the food product is of the type and form to be able to withstand the motion through the cooking device 20. In one example, the food product is of the type and form to be able to withstand conveyance through the cooking device 20 and drops, sliding or falling of the food product that will occur in the cooking device 20 from one conveyor to another conveyor via a chute or ramp.

Figure 1:
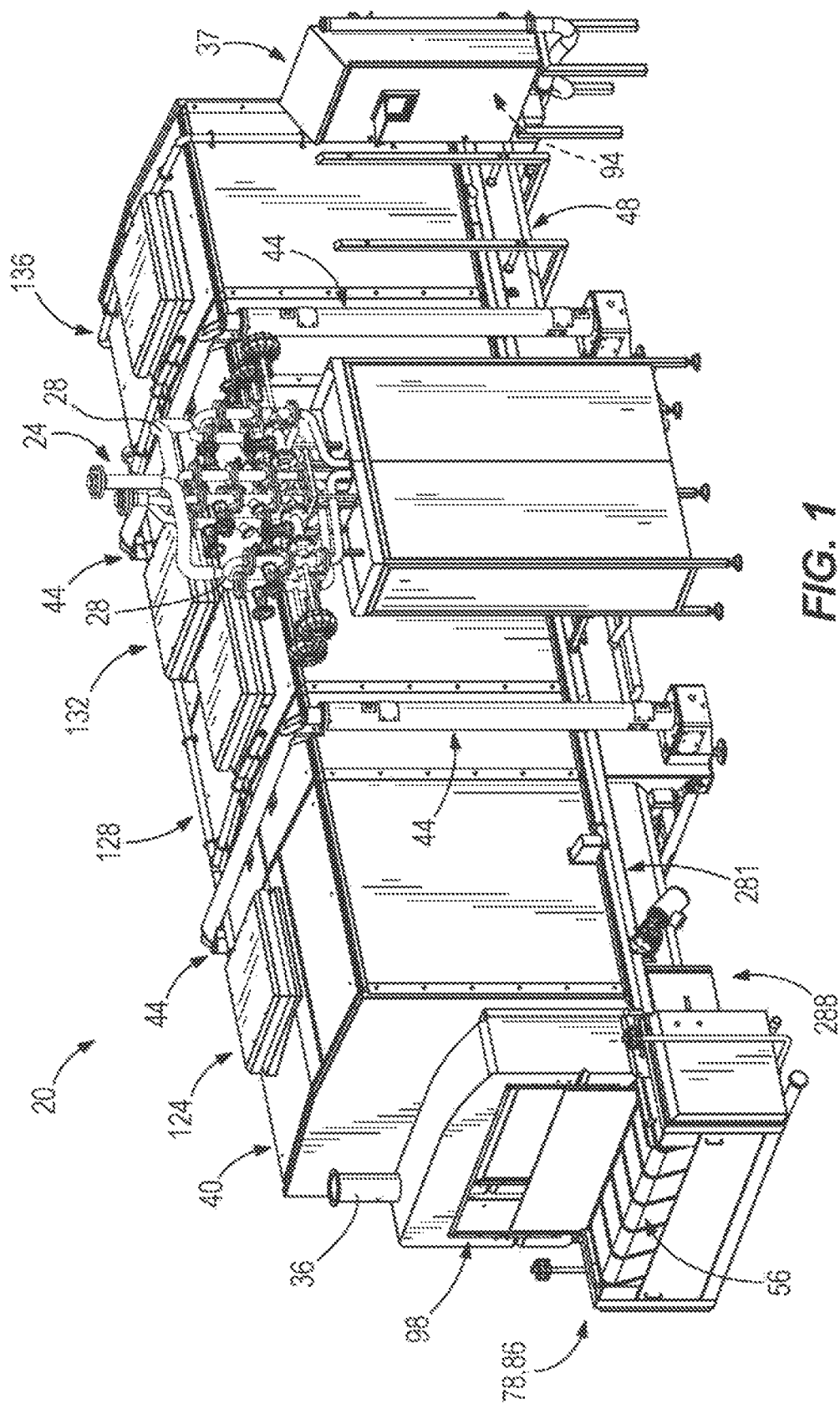
FIG. 1 is a top perspective view of one example of a cooking device shown from a first side of the cooking device, according to one aspect of the present disclosure.
Figure 2:
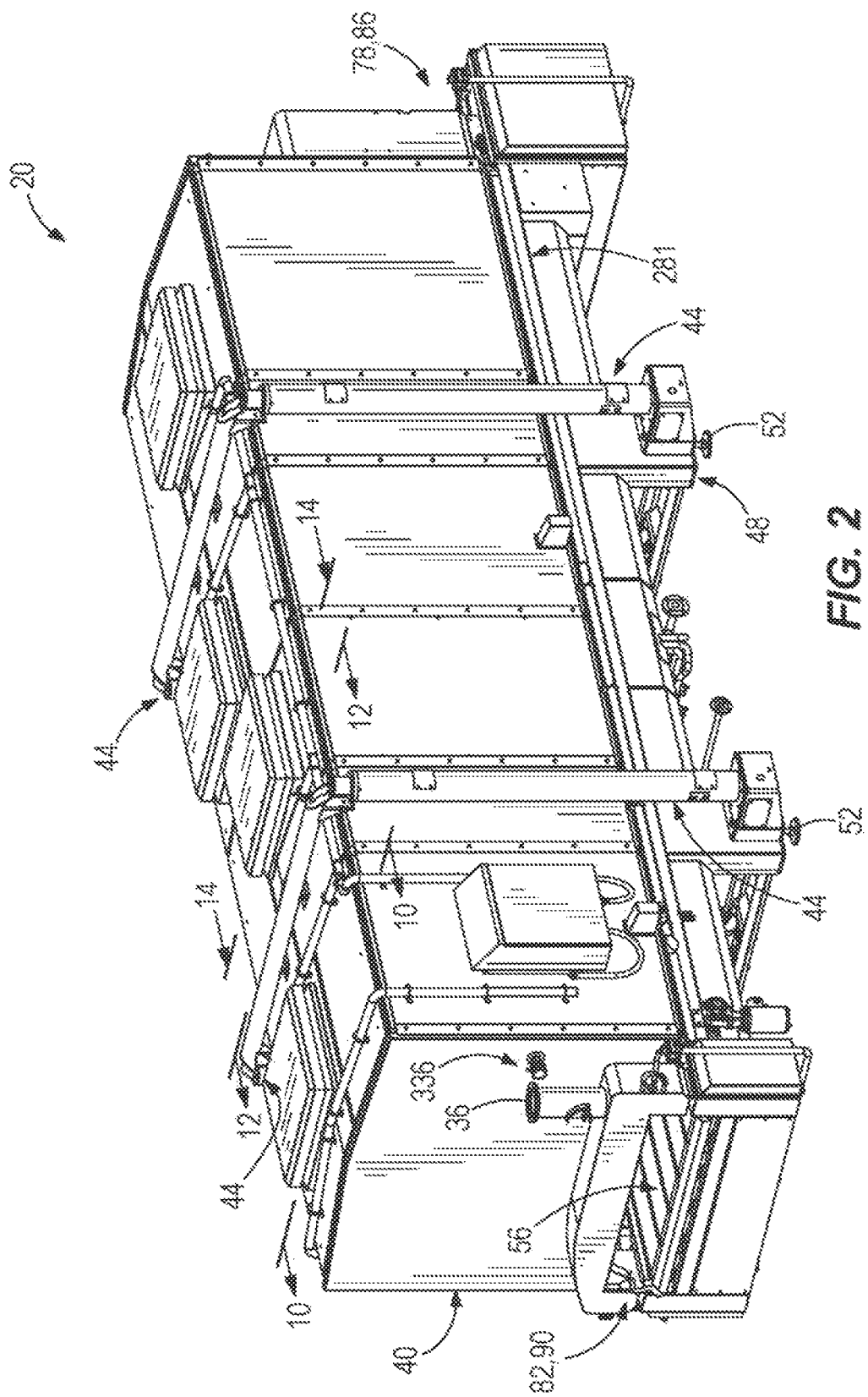
FIG. 2 is another top perspective view of the cooking device shown in FIG. 1 from a second side of the cooking device opposite the first side, according to one aspect of the present disclosure.
Figure 3:
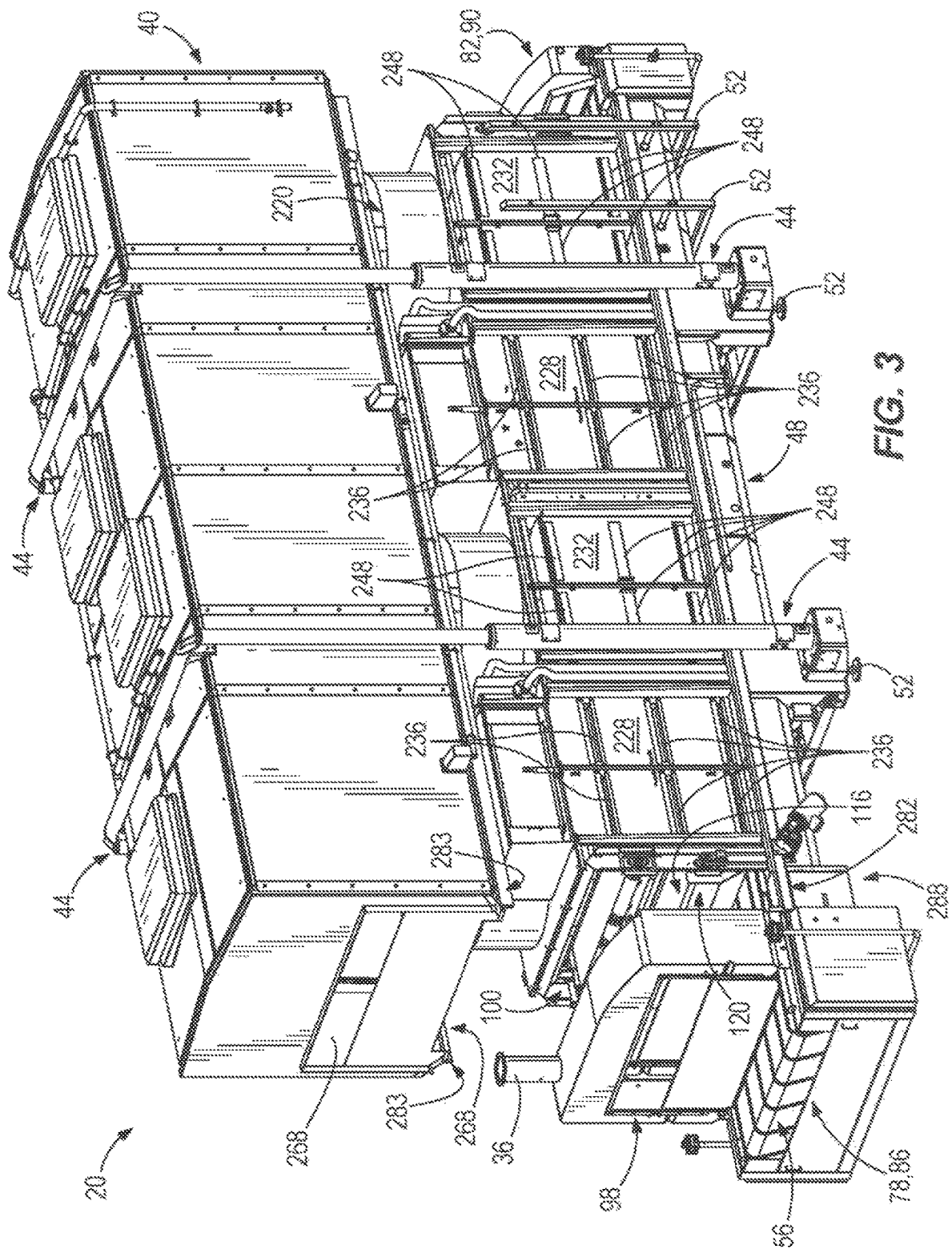
FIG. 3 is a top perspective view of the cooking device shown in FIG. 1 with one example of a hood or cover of the cooking device in a raised position, according to one aspect of the present disclosure.

With particular reference to FIGS. 1-3, the cooking device 20 includes fuel connections 24 and associated piping 28 (only shown in FIG. 1) to transport the fuel to one or more heating elements. In one example, the fuel may be thermal oil. It should be understood that the cooking device 20 may operate with a wide variety of fuels or other heat sources and all of such possibilities are intended to be within the spirit and scope of the present disclosure. In other examples, the cooking device 20 may include electric heating elements, which would be powered by electricity. The cooking device 20 also includes a pair of air exhausts 36 for exhausting air from the cooking device 20. In the illustrated example, one exhaust 36 is positioned at an infeed or inlet of the cooking device 20 and one exhaust 36 is positioned at an outfeed or outlet of the cooking device 20. It should be understood that the cooking device 20 is capable of including any number of exhausts (including none, one, etc.) and such exhaust(s) may be oriented anywhere on the cooking device. In the illustrated example, the cooking device 20 also includes a cabinet or enclosure 37 configured to include, enclose or confine a variety of components including, but not limited to, at least some of the components for controlling operation of the cooking device 20. For example, the cabinet 37 may include a control member 94 including, among other things, a memory and a processor (described in more detail below).

With continued reference to FIGS. 1-3, the cooking device 20 also includes a hood or cover 40 and a plurality of lifting mechanisms 44 coupled to the hood 40 for selectively lifting and lowering the hood 40 relative to the remainder of the cooking device 20. The hood 40 may be insulated to increase cooking efficiency of the cooking device 20. In the illustrated example, the cooking device 20 includes four lifting mechanisms 44. In other examples, the cooking device 20 may include any number of lifting mechanisms and all of such possibilities (including zero and one lifting mechanism) are intended to be within the spirit and scope of the present disclosure. In one example, the lifting mechanisms 44 may be hydraulic lifting mechanisms. In other examples, the lifting mechanisms 44 may be pneumatic, screw drive, linear actuator, or any other type of lifting mechanisms.

Figure 4:
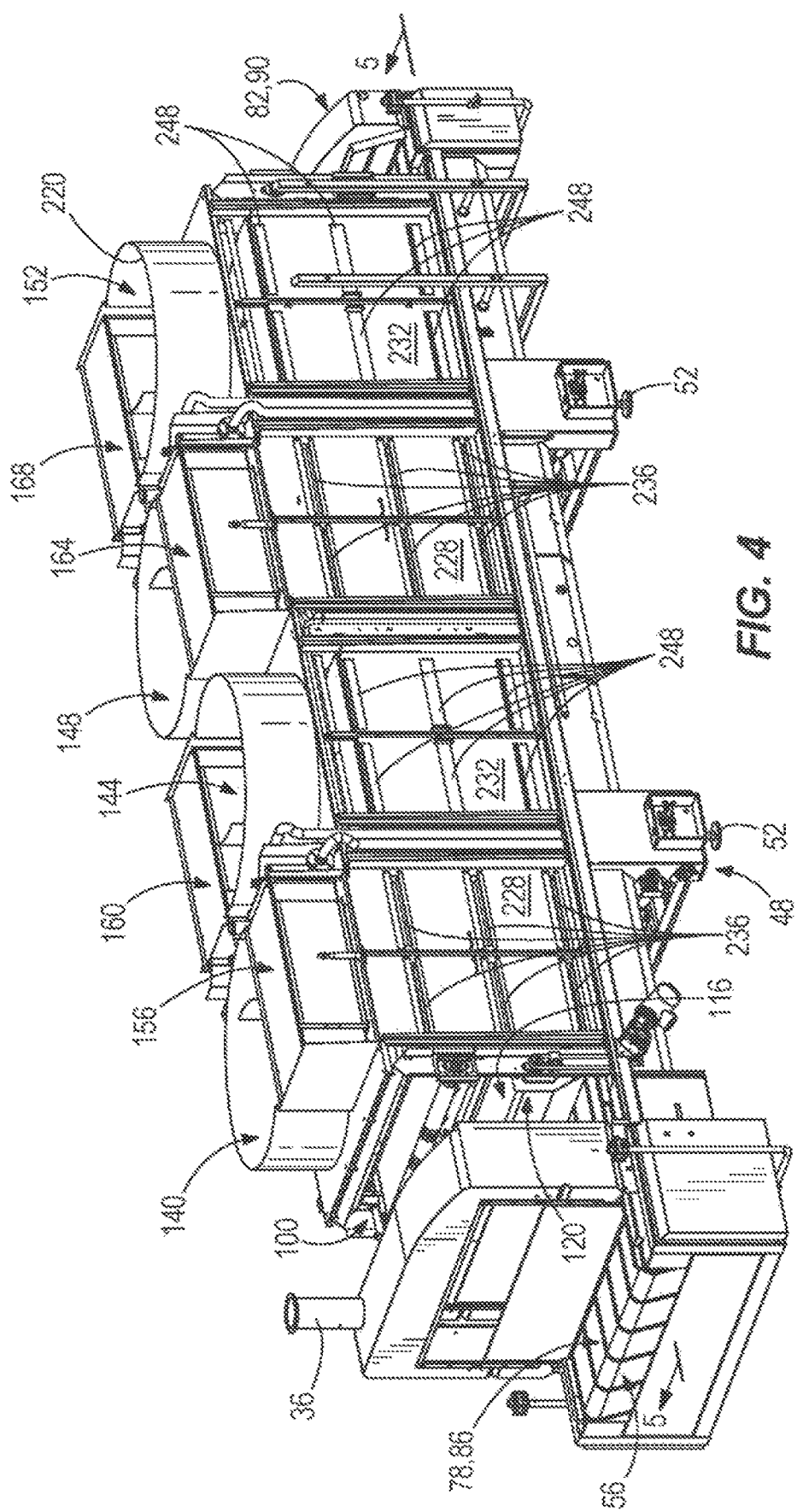
FIG. 4 is a top perspective view of a portion of the cooking device shown in FIG. 1 with the hood of the cooking device removed to better illustrate portions of the cooking device under the hood or cover, according to one aspect of the present disclosure.

With further reference to FIGS. 1-3 and additional reference to FIG. 4, the cooking device 20 includes a base 48 including a plurality of legs or supports 52 for supporting the cooking device 20 on a ground surface. The lifting mechanisms 44 are coupled to the base 48 and the hood 40 is moveable vertically relative to the base 48 via the lifting mechanisms 44. In FIG. 3, the hood 40 is illustrated in a fully lifted position. Lifting or elevating the hood 40 relative to the remainder of the cooking device 20 facilitates manual cleaning of the cooking device 20 along with providing easy access to the components of the cooking device 20 for repairing and/or replacing the components of the cooking device 20.

Figure 5:
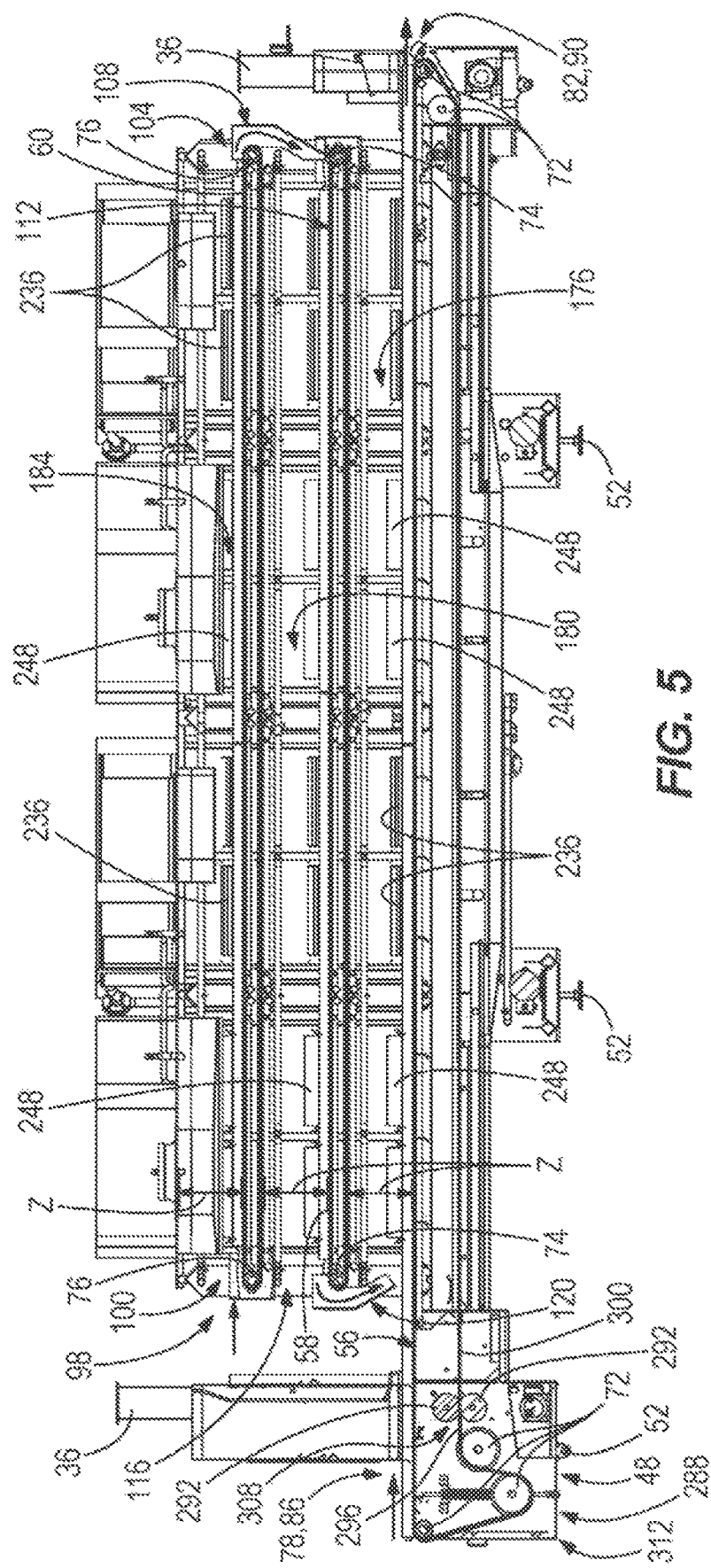
FIG. 5 is a cross-sectional view taken along line 5-5 in FIG. 4, according to one aspect of the present disclosure.
Figure 6:
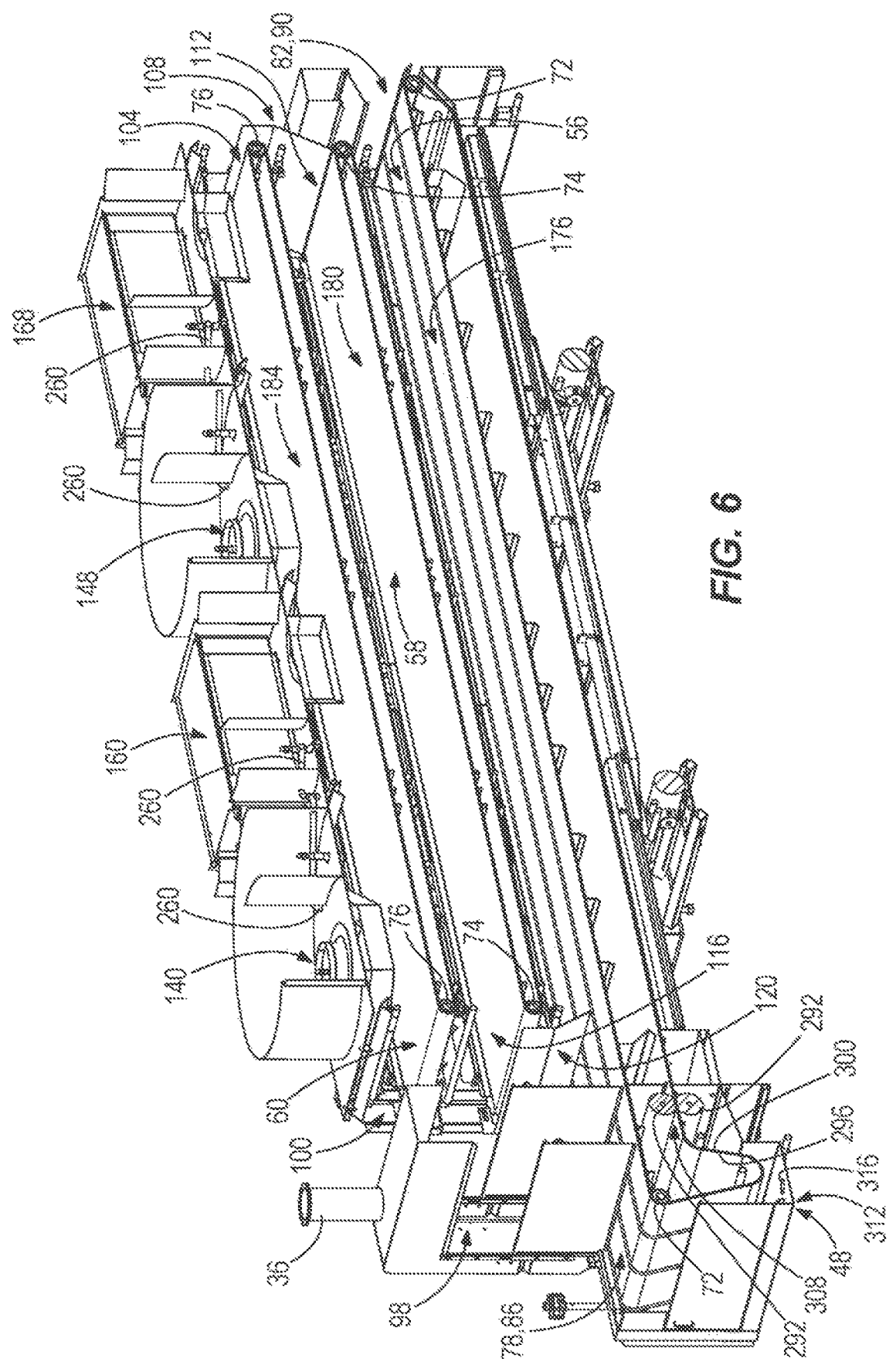
Figure 19:
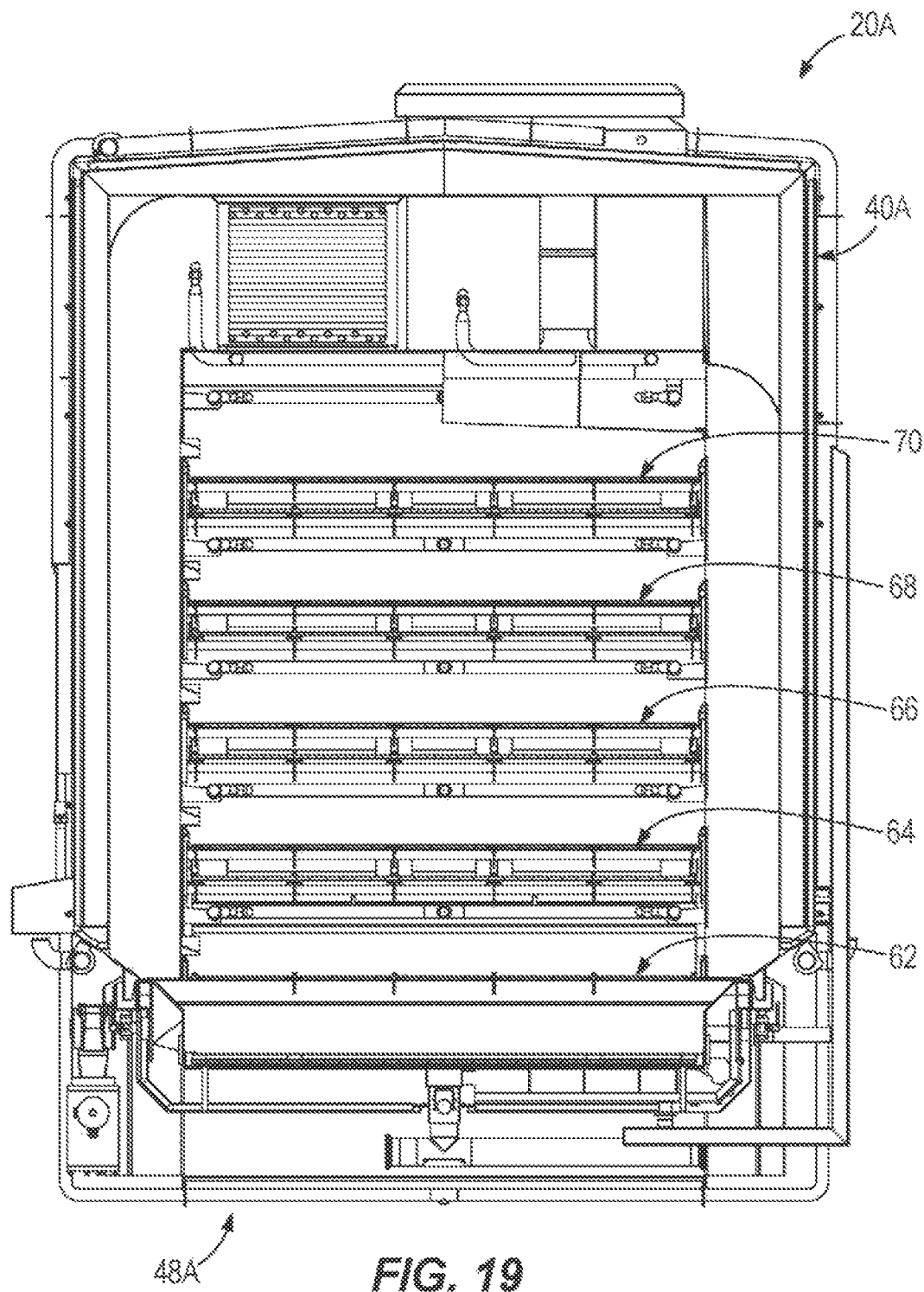
FIG. 19 is a cross-sectional view of another example of a cooking device including more layers or levels for cooking food product, according to one aspect of the present disclosure.

Referring now to FIGS. 5 and 6, the cooking device 20 includes a plurality of transport devices, 56, 58, 60 configured to transport food product through the cooking device 20. In the illustrated example, the transport devices 56, 58, 60 are vertically stacked relative to each other to provide multiple cooking layers or levels within the cooking device 20 to cook food product. Also, in the illustrated example, the cooking device 20 includes three transport devices 56, 58, 60. In other examples, the cooking device 20 may include any number of transport devices such as, for example, one transport device, five transport devices, or any other number of transport devices. In one example, with respect to FIG. 19, another example of a cooking device 20A is illustrated and this example of the cooking device 20A includes five vertically stacked transport devices 62, 64, 66, 68, 70.

Returning to the example illustrated in FIGS. 5 and 6, the transport devices 56, 58, 60 are endless conveyor belts comprised of appropriate structure and material for food handling applications. The conveyor belts 56, 58, 60 are wrapped around associated rollers 72, 74, 76 with at least one of the rollers for each belt being driven by a drive member 77 for rotating the associated conveyor belt.

With continued reference to FIGS. 5 and 6, the illustrated example of the cooking device 20 includes a main or bottom conveyor belt 56, a middle conveyor belt 58 and an upper conveyor belt 60. Spacing between the three conveyor belts 56, 58, 60 may be adjusted as desired. In one example, spacing between the conveyor belts 56, 58, 60 may be adjusted depending on the type and/or size of the food product transported or conveyed through the cooking device 20. The main conveyor belt 56 has an inlet 78 and an outlet 82. This inlet 78 and outlet 82 of the main conveyor belt 56 may also coincide with an inlet 86 and an outlet 90 of the cooking device 20. In one example, food product enters the cooking device 20 on the main conveyor belt 56 from the inlet 78 and is transported or conveyed through the cooking device 20 on the main conveyor belt 56 in a first direction to the outlet 82 where the food product exits the cooking device 20. The cooking device 20 includes a control member 94 that is configured to control the main conveyor belt 56 at various speeds depending on at least one of the type of food product to be cooked, the form of the food product and/or the desired manner or time of cooking the food product. In this one example, only the main conveyor belt 56 may be used to cook food products. In such an example, the control member 94 may either turn off or prevent the middle and upper conveyors belts 58, 60 from rotating while not in use or the control member 94 may rotate the middle and upper conveyor belts 58, 60, but they are not used in this cooking operation.

In another example, all three of the conveyor belts 56, 58, 60 may be used to cook food products within the cooking device 20. In this example, the cooking device 20 includes a second or upper inlet 98 in which food product may be introduced into the cooking device 20. This second inlet 98 is aligned with an inlet 100 of the upper conveyor belt 60. The upper conveyor belt 60 transports or conveys the food product in the first direction from the inlet 100 of the upper conveyor belt 60 to an outlet or end 104 of the upper conveyor belt 60. A first chute or deflector 108 is positioned near the outlet 104 of the upper conveyor belt 60 to deflect or direct the food product from the outlet 104 of the upper conveyor belt 60 downward to an inlet 112 of the middle conveyor belt 58. The middle conveyor belt 58 transports or conveys the food product in a second direction (opposite to the first direction) from the inlet 112 of the middle conveyor belt 58 to an outlet or end 116 of the middle conveyor belt 58. A second chute or deflector 120 is positioned near the outlet 116 of the middle conveyor belt 58 to deflect or direct the food product from the outlet 116 of the middle conveyor belt 58 downward to the inlet 78 of the main conveyor belt 56. The main conveyor belt 56 then conveys the food product toward the outlet 82 of the main conveyor belt 56 in the manner described above in the previous example. This second example of cooking food product may be desired, for example, when the food product requires longer cooking times. The control member 94 may control the three conveyor belts 56, 58, 60 at various speeds to adjust the cooking time of the food products. The control member 94 may adjust the speeds of the conveyor belts 56, 58, 60 independently or the speeds of the belts 56, 58, 60 may be adjusted in unison (e.g., all belts have the same speed).

Referring now to FIGS. 1-5, 7 and 8, the cooking device 20 includes a plurality of cooking zones 124, 128, 132, 136. In the illustrated example, the cooking device 20 includes four cooking zones 124, 128, 132, 136. In other examples, the cooking device 20 is capable of including any number of cooking zones and all of such possibilities are intended to be within the spirit and scope of the present disclosure. One example of another cooking device 20B including a different quantity of cooking zones is illustrated in FIGS. 22-35 and will be described in greater detail below. Additionally, it should be understood that the shape and size of the cooking zones 124, 128, 132, 136 and the components of the cooking device 20 included in each of the cooking zones 124, 128, 132, 136 may vary greatly and any and all of such variations are intended to be within the spirit and scope of the present disclosure.

With continued reference to FIGS. 1-5, 7 and 8, in the illustrated example, the cooking zones 124, 128, 132, 136 are serially oriented in a longitudinal direction along the cooking device 20. In order to assist with describing the plurality of cooking zones 124, 128, 132, 136, the cooking zones 124, 128, 132, 136 will be referred to as the first cooking zone 124, the second cooking zone 128, the third cooking zone 132 and the fourth cooking zone 136. This manner of numerical labeling is not intended to be limiting upon the present disclosure. Additionally, this numerical allocation of the zone is not intended to imply a consecutive order of the cooking zones in either an upstream or downstream manner; however, in some examples, this numerical allocation may imply a consecutive order of the cooking zones.

As indicated above, the illustrated example of the cooking device 20 includes four cooking zones 124, 128, 132, 136. Accordingly, the cooking device 20 includes four fans 140, 144, 148, 152 and four heating elements 156, 160, 164, 168 with one fan and one heating element associated with each cooking zone. In one example, it should be understood that the cooking device 20 may include any number of cooking zones and, accordingly, may include any number of fans and any number of heating elements as long as the number of fans and the number of heating elements is equal to the number of cooking zones. In other words, the cooking device 20 includes a complementary number of fans, heating elements and cooking zones. In other examples, the cooking device 20 may include a different number of fans and/or cooking elements than the number of cooking zones.

Figure 10:
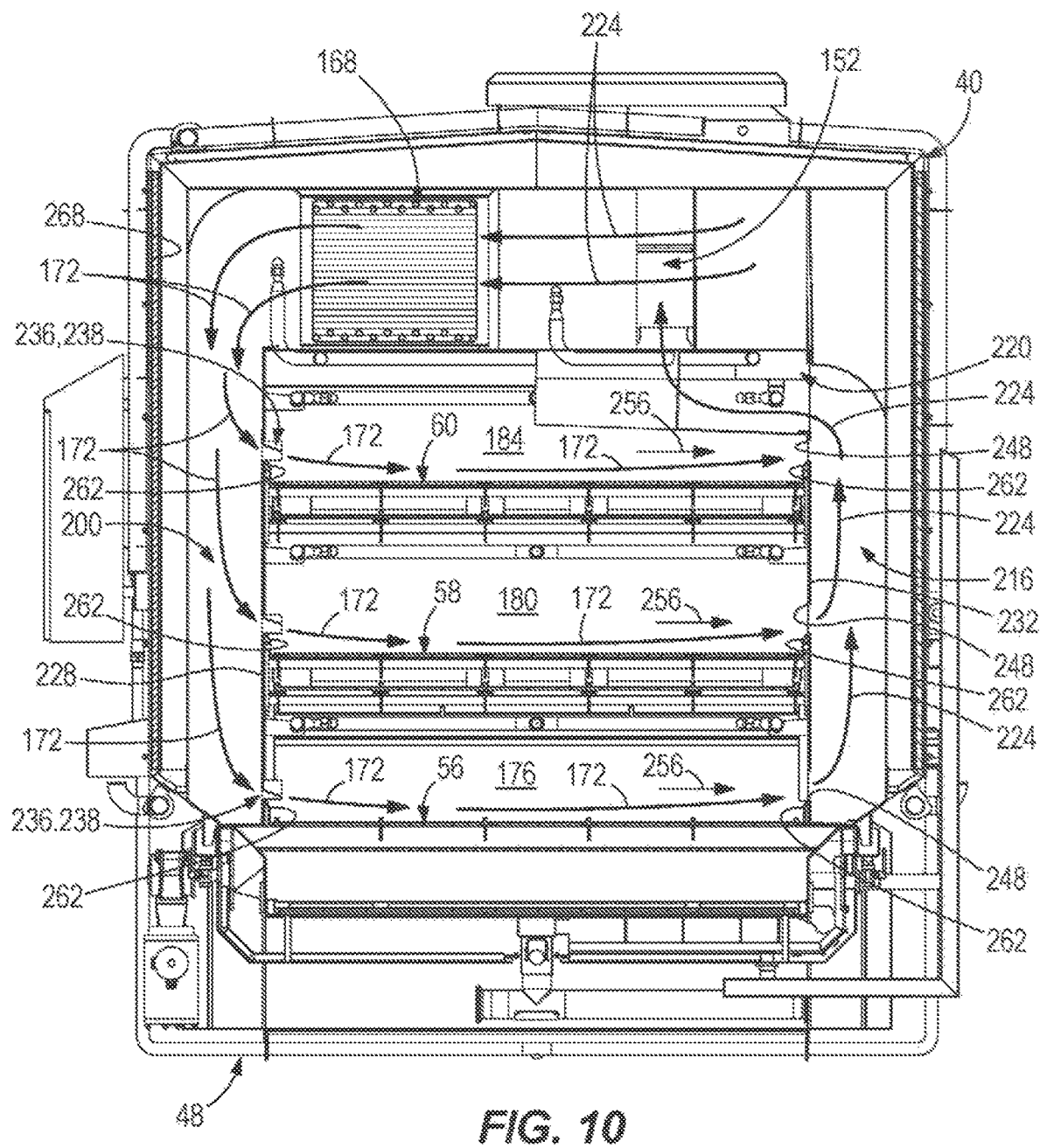
FIG. 10 is a cross-sectional view taken along line 10-10 in FIG. 2, according to one aspect of the present disclosure.
Figure 11:
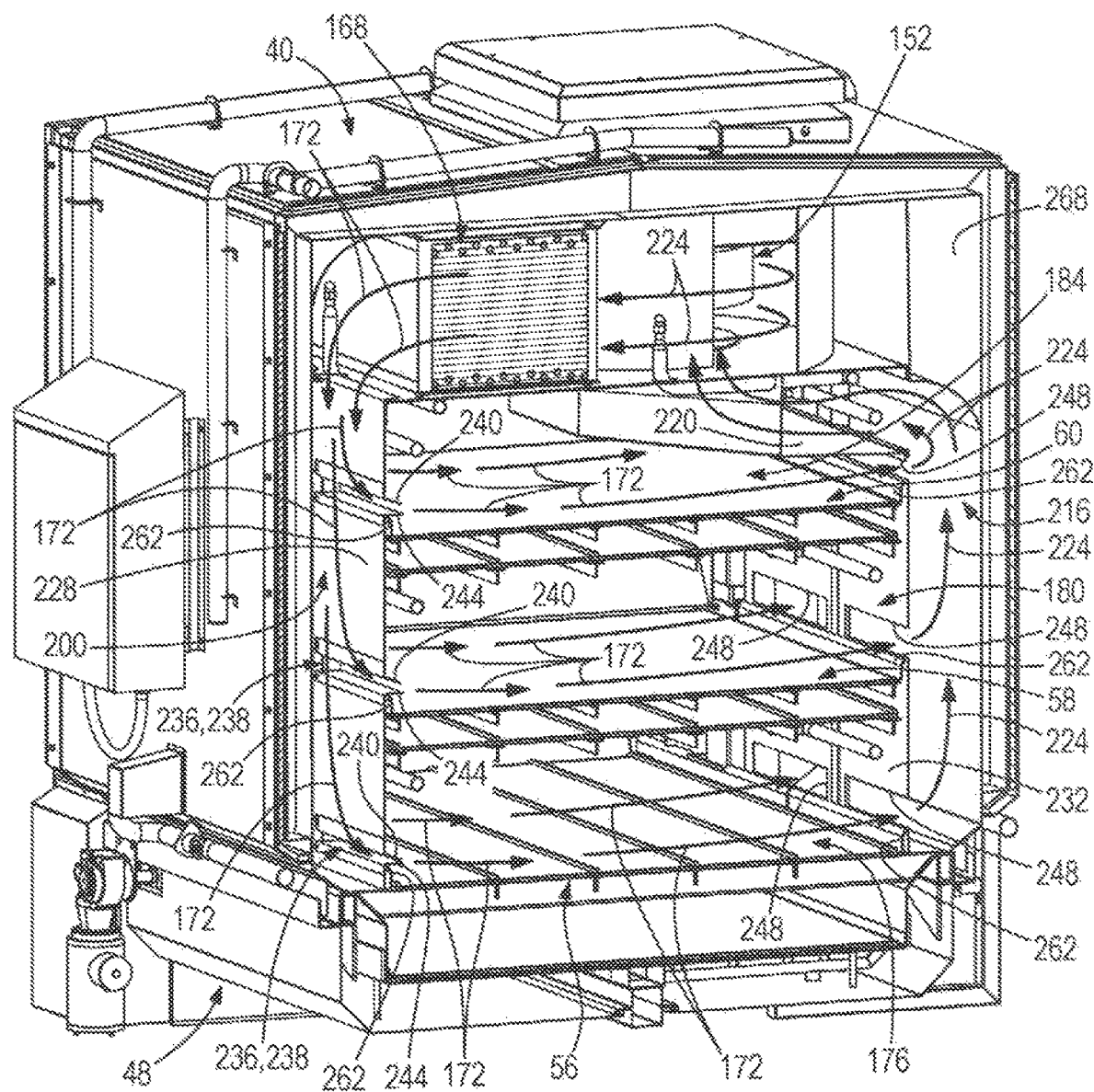
FIG. 11 is a top perspective view of the cross-section of the cooking device shown in FIG. 10, according to one aspect of the present disclosure.

Referring now to FIGS. 10 and 11, a cross-section of the fourth cooking zone 136 is illustrated. In the illustrated example of the fourth cooking zone 136, heated air 172 is directed over the food product in a horizontal or side-to-side manner. As indicated above, the illustrated example of the cooking device 20 includes three layers of conveyor belts 56, 58, 60, thereby defining a cooking location 176, 180, 184 on each of the three conveyor belts 56, 58, 60 (three cooking locations). The heated air 172 is directed horizontally through each of the cooking locations 176, 180, 184 defined above each of the conveyor belts 56, 58, 60. In order to facilitate this horizontal flow of heated air 172 over the food product in all three cooking locations 176, 180, 184 within all of the cooking zones 124, 128, 132, 136, each cooking zone includes a fan 140, 144, 148, 152, a heating element 156, 160, 164, 168, an air infeed chamber or path 188, 192, 196, 200, and an air return chamber or path 204, 208, 212, 216. In the illustrated example of the fourth cooking zone 136, the fan 152 and heating element 168 are positioned above the conveyor belts 56, 58, 60. In the fourth cooking zone 136, the fan 152 draws return air 224 (or air that is exiting the cooking locations) from the cooking locations 176, 180, 184 into a fan chamber 220 via the air return path 216. The fan 152 then directs return air 224 from the fan chamber 220, through the heating element 168 where the return air 224 is heated into heated air 172 and then directs the heated air 172 into the air infeed path 200. The air infeed path 200 is configured to direct the heated air 172 from the heating element 168 and direct the heated air 172 into the cooking locations 176, 180, 184 in a horizontal manner. The heated air 172 passes through the three cooking locations 176, 180, 184 in a horizontal manner and exits the three cooking locations 176, 180, 184 back into the air return path 216. The return air 224 is then drawn or directed back into the fan chamber 220 via the fan 152 where the return air 224 is again cycled through the zone 136.

With continued reference to FIGS. 10 and 11, the hood 40 assists with defining the air flow path around the fourth cooking zone 136. The hood 40 provides an upper limiting surface positioned above the fan 152, the fan chamber 220 and the heating element 168 to inhibit air from escaping the air flow path in an upward direction. The hood 40 also assists with defining the air infeed path 200 along with a first side plate 228 of the cooking device 20. Further, the hood 40 assists with defining the air return path 216 along with a second side plate 232 of the cooking device 20. In the illustrated example, a plurality of openings or apertures 236 are defined through the first side plate 228 in fluid communication with the air infeed path 200 and the three cooking locations 176, 180, 184. One opening 236 is aligned with each of the three cooking locations 176, 180, 184 to allow heated air 172 to pass through the first side plate 228 and enter the cooking locations 176, 180, 184 in a horizontal manner. In the illustrated example, the openings 236 are elongated slots having a longitudinal extent extending parallel to a longitudinal extent of the conveyor belts 56, 58, 60. In other examples, the openings 236 may have any shape and size and all of such possibilities are intended to be within the spirit and scope of the present disclosure. In other examples, any number of openings 236 may be defined in the first side plate 228 and in fluid communication with the air infeed path 200 and the three cooking locations 176, 180, 184. For example, the first side plate 228 may include a plurality of openings defined therein at each of the three cooking locations 176, 180, 184 to direct heated air 172 through a plurality of openings into each of the three cooking locations 176, 180, 184.

With continued reference to FIGS. 10 and 11, the illustrated example of the cooking device 20 includes adjustable openings 236 that are configured to be adjusted to change the size of the openings. Decreasing the size of the openings 236 increases the velocity of the heated air 172 passing through the openings 236 into the three cooking locations 176, 180, 184. Conversely, increasing the size of the openings 236 decreases the velocity of the heated air 172 passing through the openings 236 into the three cooking locations 176, 180, 184. The openings 236 may be adjustable in any manner and all of such possibilities are intended to be within the spirit and scope of the present disclosure.

In the illustrated example, each of the openings 236 is comprised of a nozzle 238 and each of the nozzles 238 includes a pair of converging members or plates 240, 244 having an inlet and an outlet with the outlet being smaller than the inlet. This nozzle configuration increases the velocity and/or flow rate of the heated air 172 as it passes from the air infeed path 200 into the cooking locations 176, 180, 184. It should be understood that the nozzles 238 may have any configuration and all of such possibilities are intended to be within the spirit and scope of the present disclosure. Returning to the illustrated example, the converging plates 240, 244 may be moved relative to each other to adjust the spacing between the two plates 240, 244. Moving the plates 240, 244 closer together will decrease the size of the opening 236 in the nozzle 238, thereby resulting in increasing the velocity of the heated air 172 exhausted from the nozzle 238. Conversely, moving the plates 240, 244 further apart will increase the size of the opening 236 in the nozzle 238, thereby resulting in decreasing the velocity of the heated air 172 exhausted from the nozzle 238. In one example, one of the plates 240 or 244 may be moveable and the other plate 240 or 244 may be fixed. In another example, both plates 240, 244 may be moveable. In one example, the openings 236 or nozzles 238 may be adjusted independently of each other. For example, with respect to FIG. 11, the bottom opening 236 or nozzle 238 has a smaller opening than the top and middle nozzle 238. In another example, all of the nozzles 238 may be adjusted together and have the same size opening. In the illustrated example, the openings 236 are adjusted vertically. That is, a height of each of the openings 236 is adjusted to be higher or lower. In other examples, the size of the openings 236 may be adjusted horizontally. That is, a width of each of the openings 236 may be adjusted to be wider or narrower.

In examples of the cooking device 20 where the openings 236 are adjustable, the openings 236 may be adjusted in a variety of manners. In one example, the openings 236 are adjustable manually. With respect to the illustrated example, if the openings 236 are adjusted manually, a person may manually loosen one or both of the plates 240, 244, move the one or both of the plates 240, 244 to a desired location, then secure the one or both of the plates 240, 244 in the desired location. This may be performed for any number of the openings 236. In another example, the openings 236 may be adjusted by a control member 94. In this example, the cooking device 20 may include one or more actuators and/or motors coupled to any number of the openings 236 to adjust the size of the openings 236. The actuators are in electronic communication with the control member 94 and the control member 94 may activate the actuator(s) to adjust the size of the openings 236. Adjusting the openings 236 with a control member 94 provides the ability to adjust the size of the openings 236 during cooking operation of the cooking device 20. Whereas, manually adjusting the openings 236 may require the cooking device 20 to adequately cool down after the cooking operation to provide a safe condition for a person adjusting the openings 236. In some examples, the control member 94 may independently adjust the openings 236, thereby proving the capability of having different sized openings 236, or the control member 94 may adjust the openings 236 in sync, thereby ensuring the openings 236 have the same size. In a further example, the openings 236 could be adjusted in sync within a similar zone. In still a further example, the openings 236 could be adjusted in sync on a level or tier basis. For example, all of the openings 236 on the bottom tier associated with the main conveyor belt 56 may be adjusted in sync with each other, all the openings 236 in the middle tier associated with the second or middle conveyor belt 58 may be adjusted in sync with each other, and all the openings 236 in the top tier associated with the top conveyor belt 60 may be adjusted in sync with each other. In yet other examples, the openings 236 may be fixed and non-adjustable. In such an example with fixed openings 236, desirable operability may occur with specific sizes of the openings 236 and such desirable operability may be ensured by fixing the size of the openings 236.

With further reference to FIGS. 10 and 11, the illustrated example of the cooking device 20 includes a plurality of openings or apertures 248 defined through the second side plate 232 in fluid communication with the three cooking locations 176, 180, 184 and the air return path 216. A pair of openings 248 are aligned with each of the three cooking locations 176, 180, 184 to allow heated air 172 to pass through the second side plate 232 and exit the cooking locations 176, 180, 184 in a horizontal manner into the air return path 216. In the illustrated example, the openings 248 are elongated slots having a longitudinal extent extending parallel to a longitudinal extent of the conveyor belts 56, 58, 60. In other examples, the openings 248 may have any shape and size and all of such possibilities are intended to be within the spirit and scope of the present disclosure. In other examples, any number of openings 248 may be defined in the second side plate 232 and in fluid communication with the three cooking locations 176, 180, 184 and the air return path 216. For example, the second side plate 232 may include a single opening 248 defined therein at each of the three cooking locations 176, 180, 184 or more than two openings 248 at each of the three cooking locations 176, 180, 184 to allow air to exit the cooking locations 176, 180, 184 and enter the air return path 216.

With continued reference to FIGS. 10 and 11, the illustrated example of the openings 248 defined in the second side plate 232 are fixed in size and shape. In other examples, the openings 248 defined in the second side plate 232 may be adjustable to adjust the size of the openings 248. In such an example, the openings 248 defined in the second side plate 232 may have any configuration, operation and alternatives describe with respect to the openings 236 defined in the first side plate 228 or they may have different configurations and operations, with all of such possibilities intended to be within the spirit and scope of the present disclosure.

In one example, one or more of the first and second side plates 228, 232 may be movable to selectively expose and cover the components of the cooking device 20 behind the side plates 228, 232. This movability may allow a user to clean and/or repair/replace the components of the cooking device 20 behind the side plates 228, 232.

Figure 20:
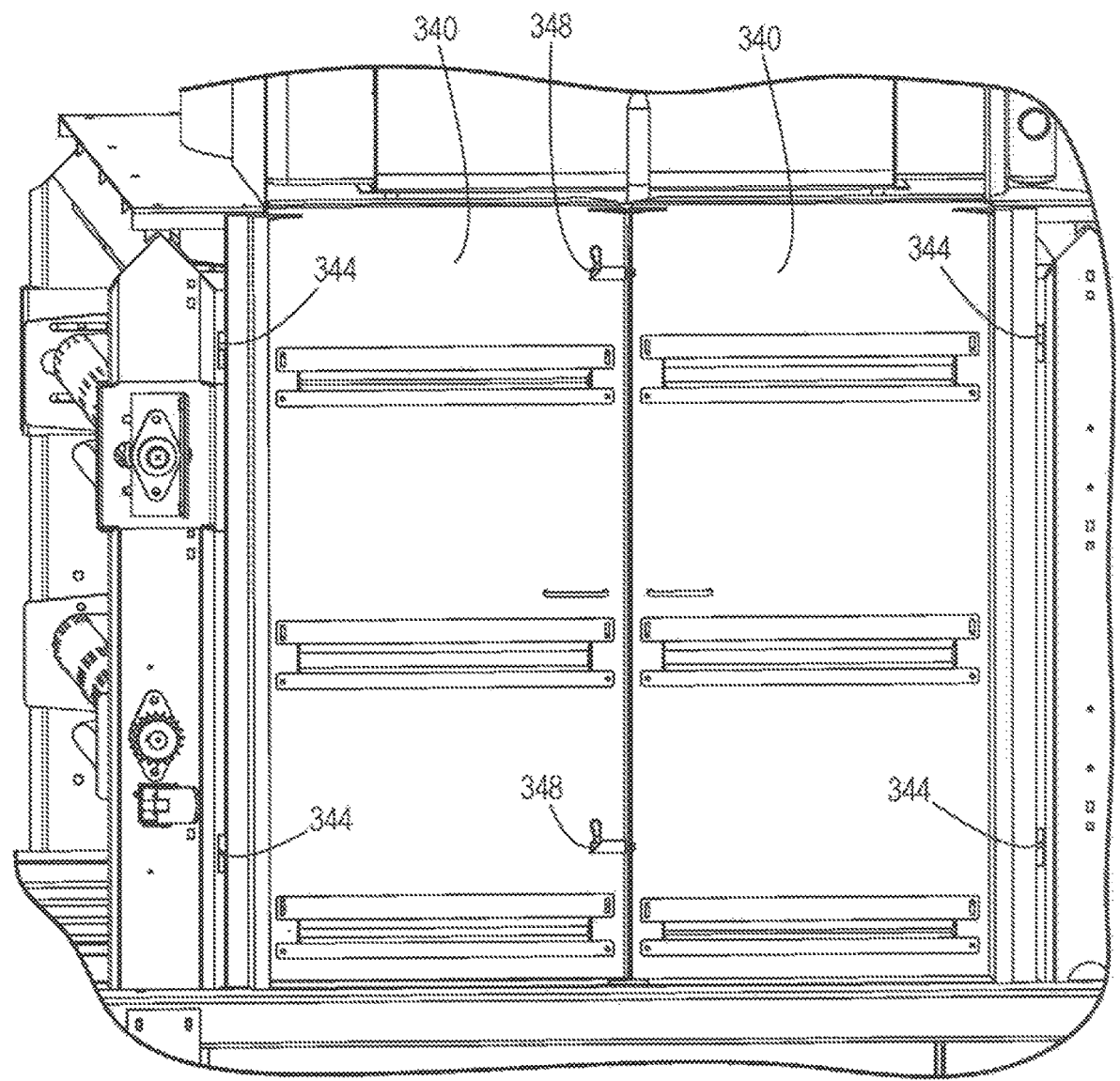
FIG. 20 is an elevational view of one example of a side plate of the cooking device of FIG. 1 shown in a closed or secured position, according to one aspect of the present disclosure.
Figure 21:
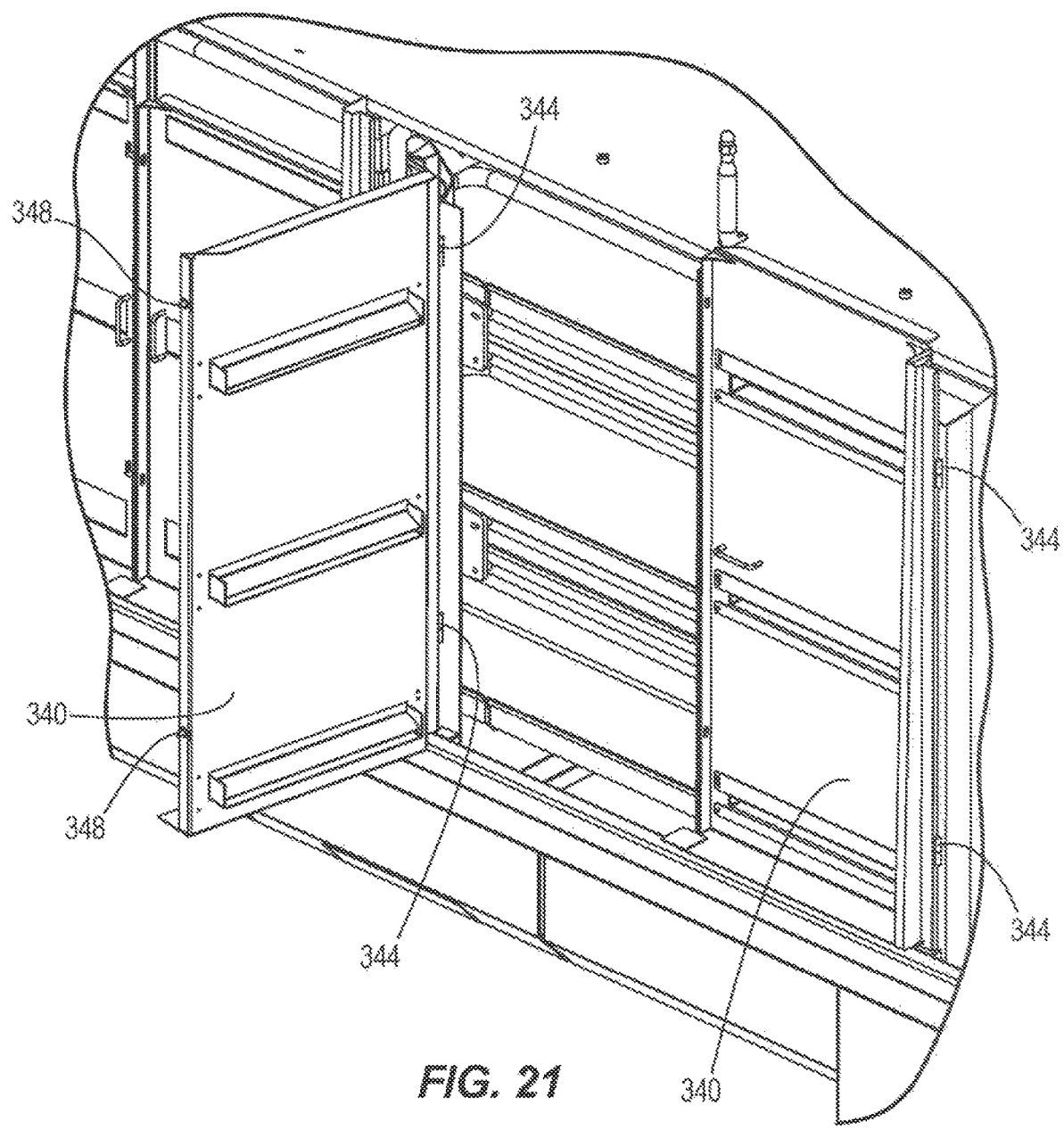
FIG. 21 is a top perspective view of the side plate shown in FIG. 20 in an open position, according to one aspect of the present disclosure.
Figure 22:
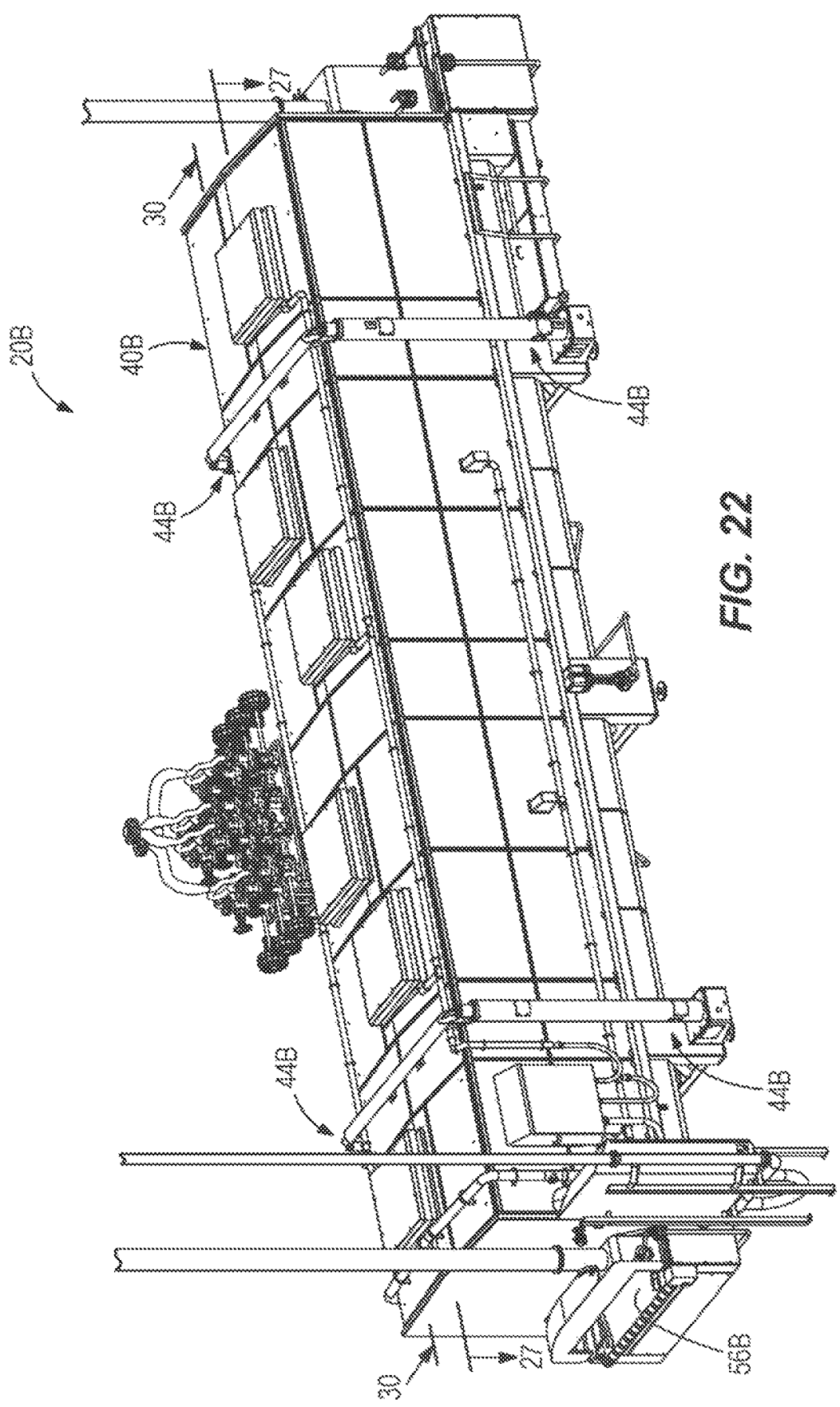
FIG. 22 is a top perspective view of another example of a cooking device, according to one aspect of the present disclosure.
Figure 23:
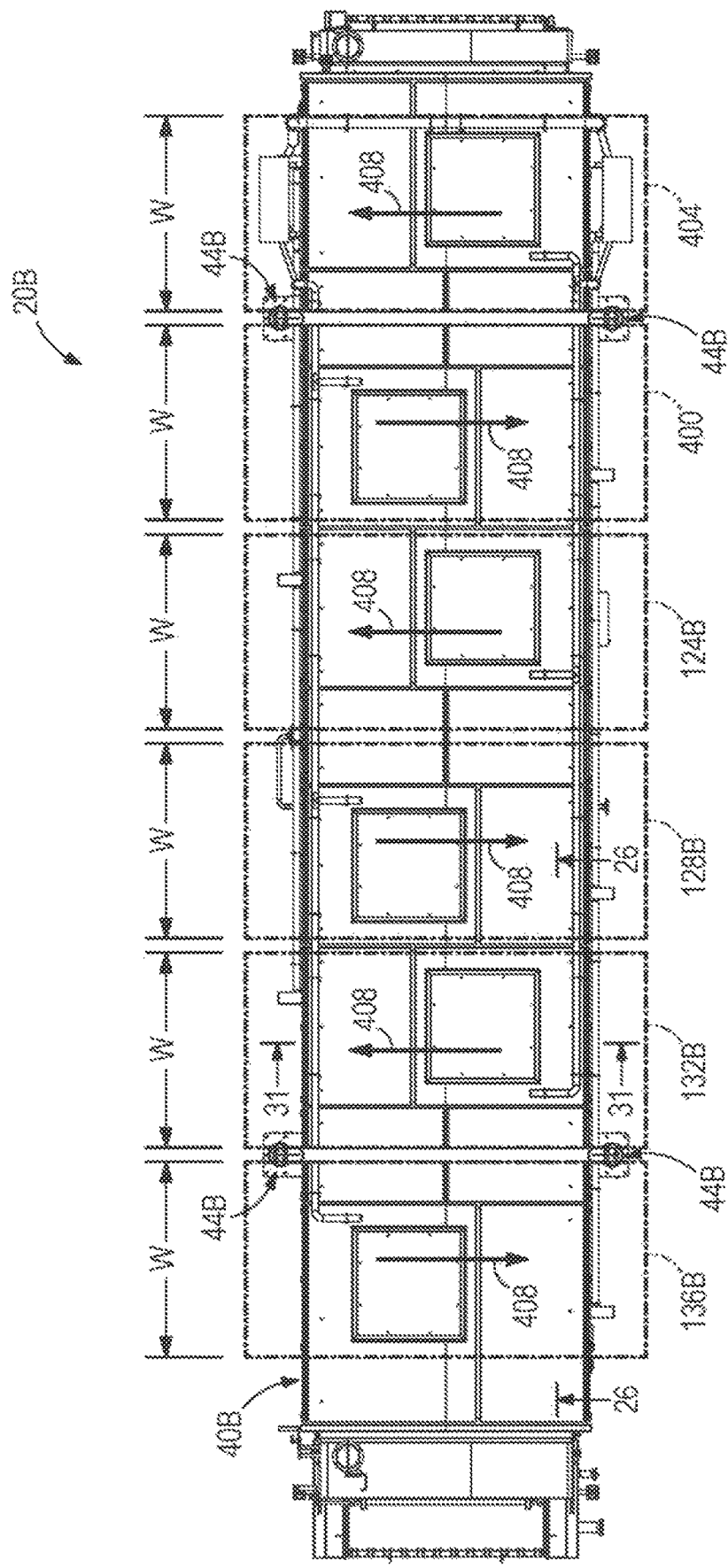
FIG. 23 is a top view of the cooking device shown in FIG. 22 with one example of a plurality of cooking zones and one example of air flow directions through the plurality of cooking zones, according to one aspect of the present disclosure.
Figure 24:
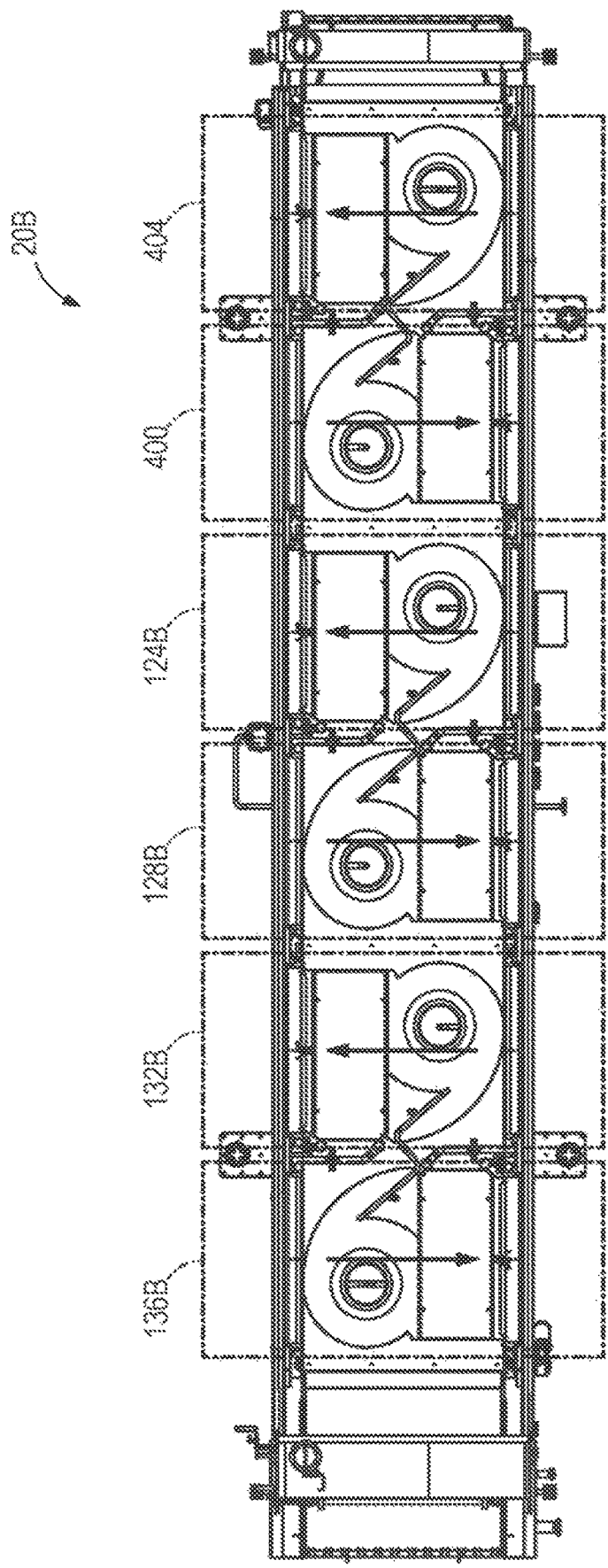
FIG. 24 is a top view of a portion of the cooking device shown in FIG. 22 with the hood removed and the examples of the plurality of cooking zones and air flow directions illustrated in FIG. 23, according to one aspect of the present disclosure.
Figure 25:
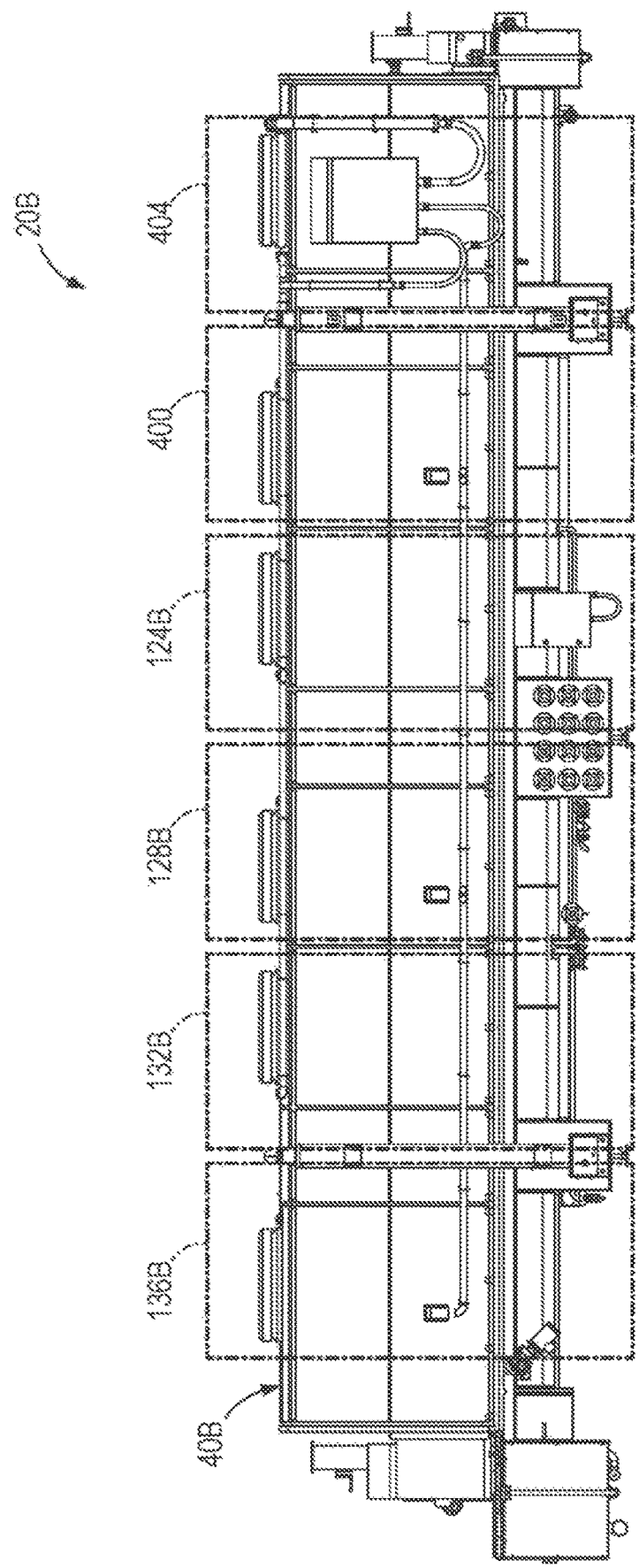
FIG. 25 is an elevational view of the cooking device shown in FIG. 22 with the examples of the plurality of cooking zones illustrated in FIGS. 23 and 24, according to one aspect of the present disclosure.

With reference to FIGS. 20 and 21, in one example, one or more of the first and second side plates 228, 232 may be comprised of two plates 340 with each plate 340 being pivotable or rotatable about one or more hinges 344 or other mechanisms allowing the one or more side plates 228, 232 to pivot or rotate relative to the cooking device 20 between an opened position (see FIG. 21; only one door shown in the opened position) and a closed or secured position (see FIG. 20; both doors shown in the closed position). One or more securing or locking mechanism 348 such as, for example, clasps, friction-fit mechanisms, interference-fit mechanisms, detents, latches, or other securing or locking mechanisms may be used with the pivotable or rotatable side plates 228, 232 to secure the side plates 228, 232 in the closed or secured position. In one example, the first and second side plates 228, 232 may be comprised of a single plate each (rather than two plates each as illustrated in FIGS. 20 and 21) and the single plate may be pivotable or rotatable about one or more hinges or other mechanisms.

In another example, one or more of the first and second side plates 228, 232 may be removable from the cooking device 20. The cooking device 20 may include any type of coupling mechanism that allows the removable side plates 228, 232 to be selectively coupled to and removed from the cooking device 20. In a further example, one or more of the first and second plates 228, 232 may be both pivotable and removable.

Figure 12:
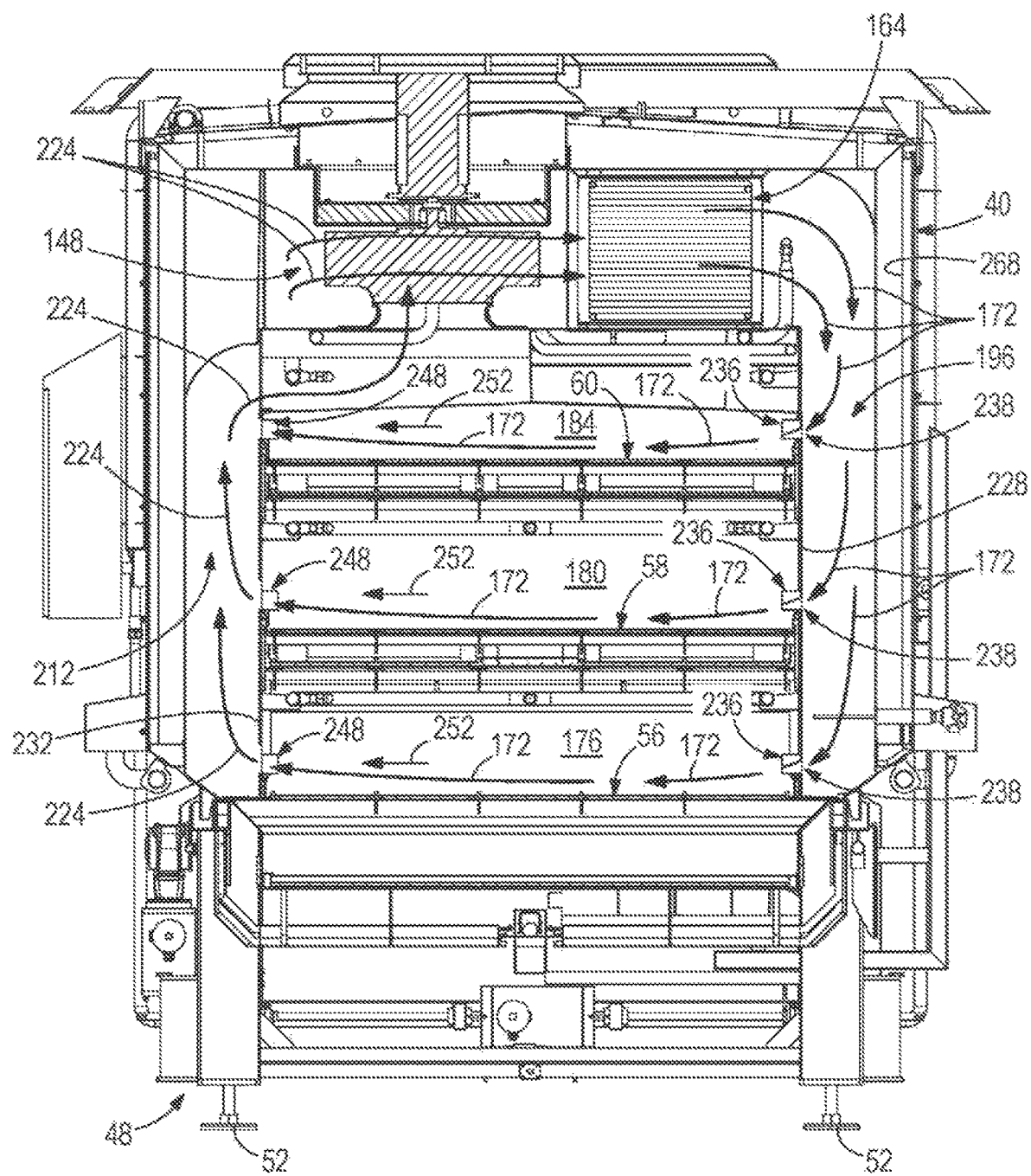
FIG. 12 is a cross-sectional view taken along line 12-12 in FIG. 2, according to one aspect of the present disclosure.
Figure 13:
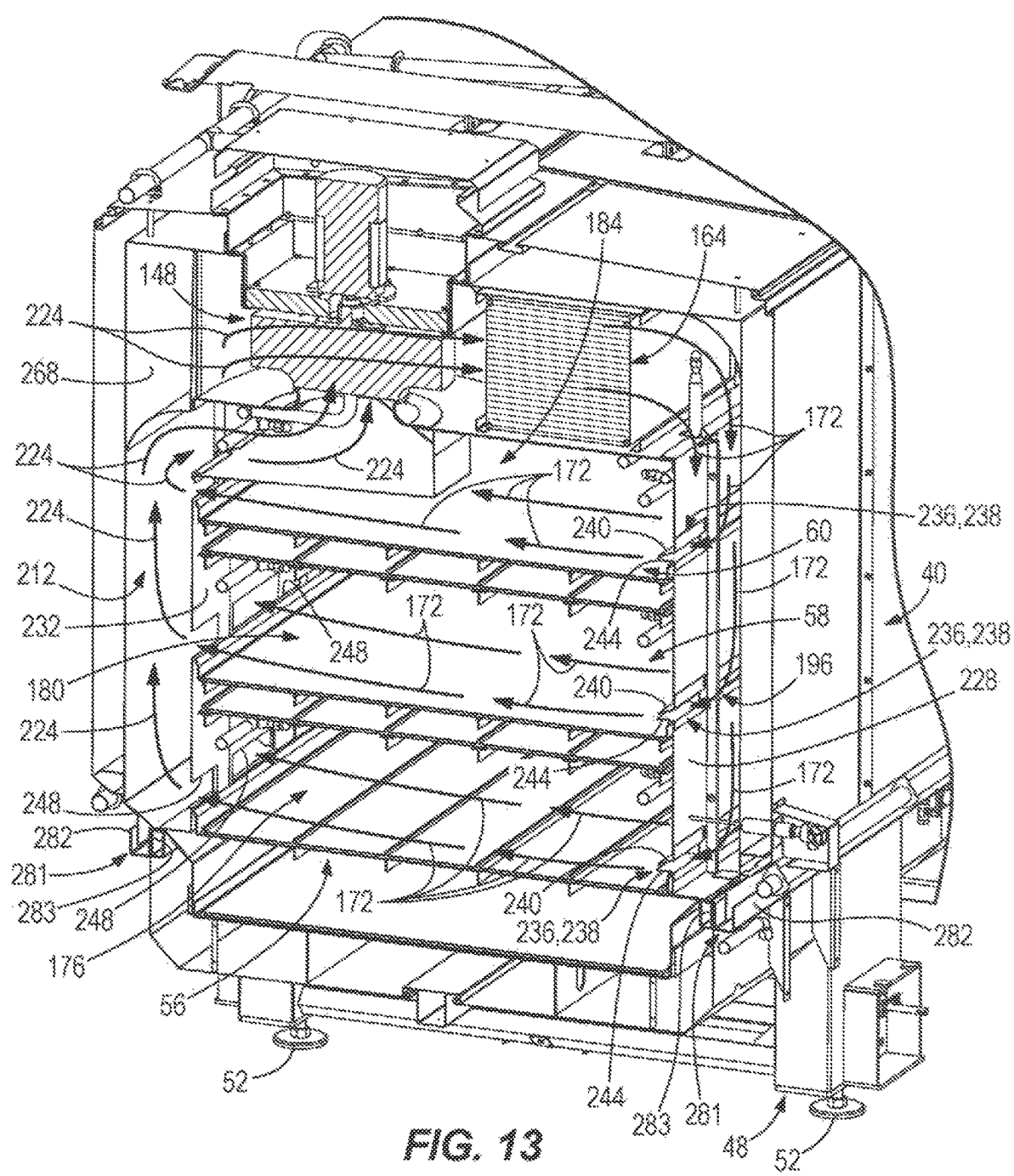
FIG. 13 is a top perspective view of the cross-section of the cooking device shown in FIG. 12, according to one aspect of the present disclosure.

Referring now to FIGS. 12 and 13, a cross-section of the third cooking zone 132 is illustrated. In the illustrated example of the third cooking zone 132, heated air 172 is directed over the food product in a horizontal or side-to-side manner similarly to the fourth cooking zone 136. In the illustrated example, heated air 172 is directed over the food product in a horizontal manner in all of the cooking zones 124, 128, 132, 136. The third cooking zone 132 is similar to the fourth cooking zone 136 described in detail above except, for example, the position of the fan 148 and heating element 164 are reversed and the horizontal air flow over the food product is in an opposite horizontal direction to the direction of the air flow in the fourth cooking zone 136. More particularly, the fan 148 and heating element 164 in the third cooking zone 132 are still positioned above the conveyor belts 56, 58, 60, but the fan 148 in the third cooking zone 132 is on the same side of the cooking device 20 as the heating element 168 in the fourth cooking zone 136. Similarly, the heating element 164 in the third cooking zone 132 is on the same side of the cooking device 20 as the fan 152 in the fourth cooking zone 136. The air flow in the third cooking zone 132 is reversed relative to the air flow in the fourth cooking zone 136. That is, as viewed in the cross-sectional views illustrated in FIGS. 10 and 12, the air flow in the fourth cooking zone 136 illustrated in FIG. 10 circulates through the fourth cooking zone 136 in a counter-clockwise direction and the air flow in the third cooking zone 132 illustrated in FIG. 12 circulates through the third cooking zone 132 in clockwise direction. The third cooking zone 132 includes similar structure as the fourth cooking zone 136, but the positioning of at least some of the structure in the third cooking zone 132 is reversed or on opposite sides of the cooking device 20 than the structure of the fourth cooking zone 136.

Referring now to FIGS. 10 and 11, as previously described, the illustrated example of the cooking device 20 includes four cooking zones 124, 128, 132, 136. In the illustrated example, the heated air 172 is horizontally directed over the food product in the cooking locations 176, 180, 184 of all of the cooking zones 124, 128, 132, 136. Additionally, in the illustrated example, the heated air 172 is directed through the cooking locations 176, 180, 184 in alternating horizontal directions. For example, the heated air 172 is directed in a first horizontal direction 252 in the first cooking zone 124, the heated air 172 is directed in a second horizontal direction 256 opposite to the first horizontal direction 252 in the second cooking zone 128, the heated air 172 is directed in the first horizontal direction 252 in the third cooking zone 132 and the heated air 172 is directed in the second horizontal direction in the fourth cooking zone 136. Accordingly, in the illustrated example, the heated air 172 is directed through the cooking locations 176, 180, 184 in the same horizontal direction in the first and third cooking zones 124, 132 and the heated air 172 is directed through the cooking locations 176, 180, 184 in the same horizontal direction in the second and fourth cooking zones 128, 136. As indicated above, the cooking device 20 is capable of having any number of cooking zones and, accordingly, the heated air 172 may be alternatively directed throughout any number of cooking zones included in the cooking device 20. Horizontal directing of the heated air 172 may also be considered as being directed in a direction generally parallel to top surfaces of the conveyor belts 56, 58, 60.

In other examples, the cooking device 20 may direct the heated air 172 over the food product through the cooking locations 176, 180, 184 in other manners. For example, heated air 172 may be horizontally directed over the food product in the cooking locations 176, 180, 184 in a first direction in any number of the cooking zones and heated air 172 may be horizontally directed over the food product in the cooking locations 176, 180, 184 in a second direction opposite the first direction in any number of the other cooking zones not having heated air directed therethrough in the first direction.

The cooking device 20 is configured to substantially isolate the cooking zones 124, 128, 132, 136 from one another to ensure consistent and reliable cooking conditions within each cooking zone. Additionally, in some examples, the cooking conditions within each of the cooking zones 124, 128, 132, 136 is independently controlled to provide a desired manner of cooking the food product. Examples of the components with the cooking zones 124, 128, 132, 136 that may be independently controlled include, but are not limited to, the fan 140, 144, 148, 152, the heating element 156, 160, 164, 168, the size of the openings 236 in the first and/or second side plates 228, 232 and a humidity within each cooking zone 124, 128, 132, 136 via one or more humidifying elements 260 (the cooking device 20 may include a single humidifying element within the cooking device 20 or any number of humidifying elements throughout the cooking device 20). In one example, the cooking device 20 may control the humidity for the entire cooking device 20 rather than controlling the humidity for each cooking zone 124, 128, 132, 136. In one example, the cooking device 20 includes a plurality of pipes for transporting steam to the humidifying elements 260 within the cooking device 20. In such an example, the pipes may all be the same length from a steam source or neck where the individual pipes separate to extend to their associated humidifying elements 260. By having similar length pipes, a substantially equal quantity of steam may be transported to all of the humidifying elements 260. Further, in such an example, the cooking device 20 may include a single valve to control the flow of steam to the humidifying elements 260. In another example, each pipe or each humidifying element 260 may include its own valve to individually control the quantity of steam transported to the humidifying elements. 260.

With continued reference to FIGS. 10 and 11, the cooking device 20 includes a plurality of guide members 262 to assist with guiding the food product through the cooking device 20. In the illustrated example, the guide members 262 are positioned near each edge of the transport devices 56, 58, 60 to inhibit food product from falling off the sides of the transport devices 56, 58, 60. In other examples, the cooking device 20 may include any number of guide members associated with any number of transport devices 56, 58, 60. Also, in the illustrated example, the guide members 262 are positioned underneath the nozzles 238 or, when considered in another manner, the nozzles 238 are positioned above the guide members 262. The guide members 262 may either be part of the side plates 228, 232 or may be independent components separate from the side plates 228, 232 and coupled within the cooking device 20.

Figure 14:
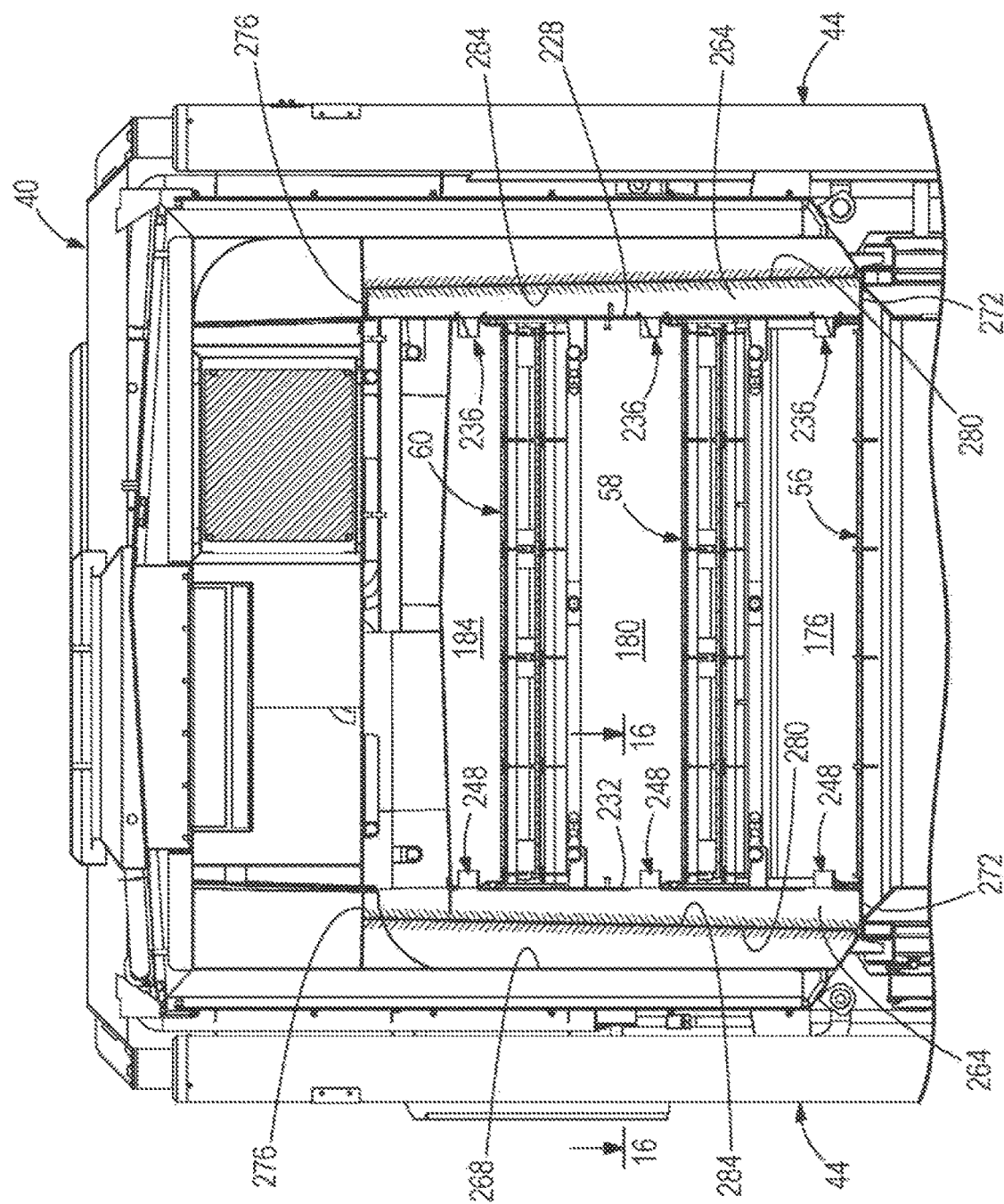
FIG. 14 is a cross-sectional view taken along line 14-14 in FIG. 2 with at least a portion of the hood highlighted to show an engagement or interaction between the hood and one example of engagement members of the cooking device to separate the cooking device into the plurality of cooking zones, according to one aspect of the present disclosure.
Figure 15:
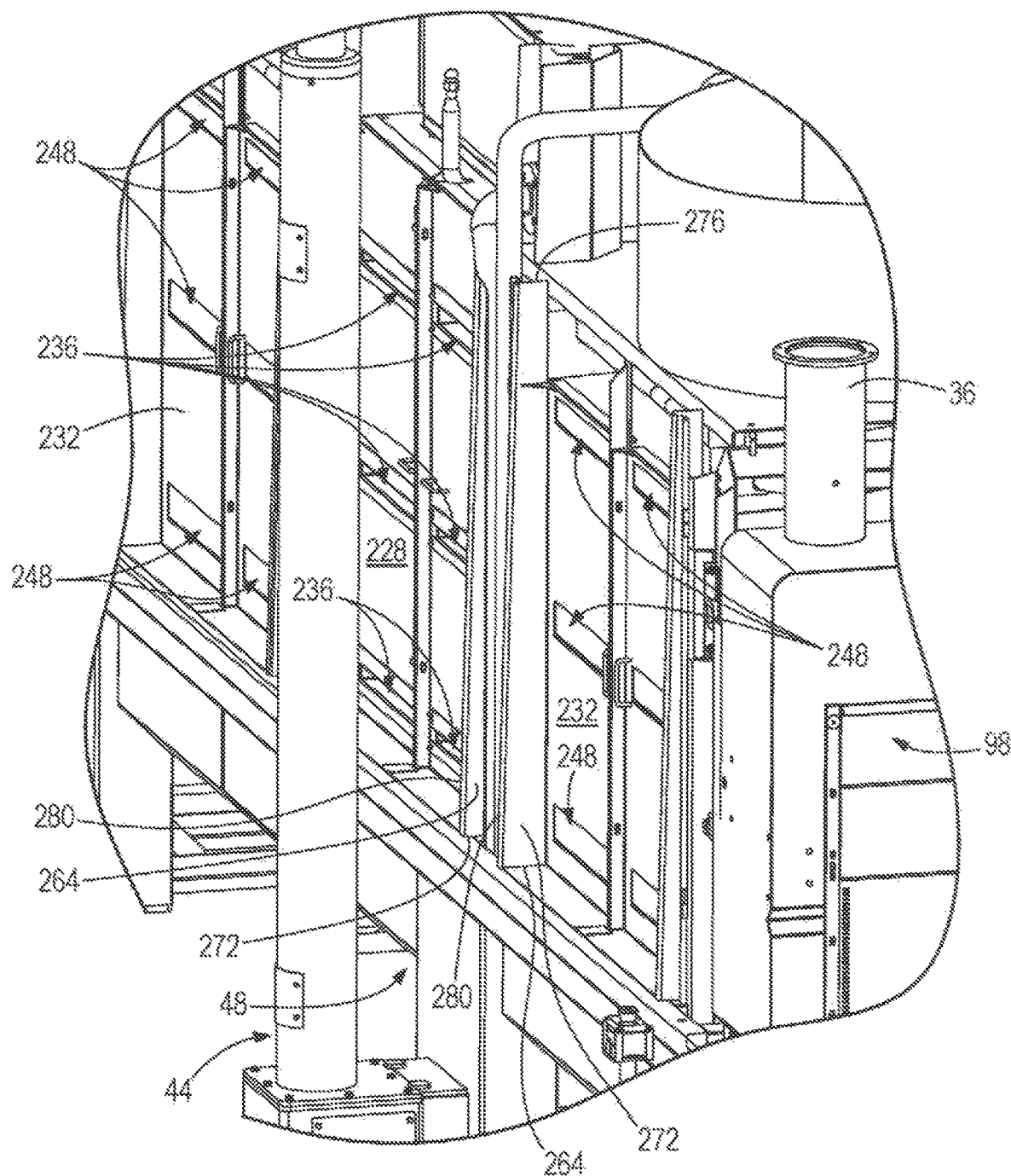
FIG. 15 is a top perspective view of a portion of the cooking device shown in FIG. 1 with the hood removed to illustrate the one example of engagement members positioned between the plurality of cooking zones to assist with defining the plurality of cooking zones, according to one aspect of the present disclosure.

With reference to FIGS. 14-16, the cooking device 20 includes a plurality of sealing members or engagement members 264 positioned between the first side plate 228 and an inner surface 268 of the hood 40 and a plurality of engagement members 264 positioned between the second side plate 232 and the inner surface 268 of the hood 40. In the illustrated example, each cooking zone 124, 128, 132, 136 includes four engagement members 264, with two engagement members 264 extending from the first side plate 228 and two engagement members 264 extending from the second side plate 232. Each cooking zone 124, 128, 132, 136 includes two of the engagement members 264 near an inlet end of the cooking zone (inlet end of a cooking zone may be determined as the end of cooking zone nearest the inlet of the main conveyor belt) and two of the engagement members 264 near an outlet end of the cooking zone (outlet end of a cooking zone may be determined as the end of the cooking zone nearest the outlet of the main conveyor belt).

When the hood 40 is in the downward position, the inner surface 268 of the hood 40 engages the engagement members 264 to form both the air infeed path 188, 192, 196, 200 and the air return path 204, 208, 212, 216. Once the hood 40 engages the engagement members 264, the air infeed path 188, 192, 196, 200 is defined by the inner surface 268 of the hood 40 on an outside of the path, engagement members 264 on the ends of the path and the first side plate 228 on an inside of the air infeed path. The air return path 204, 208, 212, 216 is defined by the inner surface 268 of the hood 40 on an outside of the path, engagement members 264 on the ends of the path and the second side plate 232 on an inside of the air return path.

In the illustrated example, the engagement members 264 have a tapered shape that taper from a wide end 272 at a bottom of the engagement members 264 to a narrower end 276 at a top of the engagement members 264. This tapered shape provides a ramped or angled surface 280 on each of the engagement members 264 that mate or engage a complementary ramped or angled surface 284 on the interior surface 268 of the hood 40. These ramped surfaces 280, 284 may facilitate proper downward guiding and alignment of the inner surface 268 of the hood 40 relative to the remainder of the cooking device 20, gradual engagement between the inner surface 268 of the hood 40 and/or a proper seal between the inner surface 268 of the hood 40 and the engagement members 264 to properly seal and/or substantially isolate the cooking zones 124, 128, 132, 136 relative to one another. Upon full engagement between the inner surface 268 of the hood 40 and the engagement members 264, little to no air may pass between the engagement members 264 and the inner surface 268 of the hood 40 engaging the engagement members 264.

Engagement members 264 positioned at the extreme ends of the cooking device 20 (e.g., at the infeed end of the first cooking zone 124 and at the outfeed end of the fourth cooking zone 136) inhibit air from escaping ends of the first and fourth cooking zones 124, 136 and into the atmosphere. Engagement members 264 positioned between cooking zones 124, 128, 132, 136 internally of the extreme ends of the cooking device 20 inhibit air from passing from one cooking zone to an adjacent cooking zone.

The cooking device 20 is also capable of relatively isolating the cooking zones 124, 128, 132, 136 by circulating air through the cooking zones at a sufficiently high velocity. The cooking zones 124, 128, 132, 136 are in fluid communication at the cooking locations 176, 180, 184 above each of the three conveyor belts 56, 58, 60. Circulating the air in opposite directions at a sufficiently high velocity in adjacent cooking zones 124, 128, 132, 136 inhibits the air from wanting to flow into an adjacent zone at the cooking locations 176, 180, 184. The velocity of the air flow may be a wide variety of air flows and be sufficiently high to inhibit air flow between adjacent cooking zones 124, 128, 132, 136 at the cooking locations 176, 180, 184 above the conveyor belts 56, 58, 60. For example, the velocity of the air may be between about 0 meters/second (m/s) and about 20 m/s. Also, for example, the velocity of the air may be between about 0 m/s and about 10 m/s.

Referring now to FIGS. 1-3 and 13, the cooking device 20 includes a thermal seal 281 between the hood 40 and the base 48. The thermal seal 281 is configured to inhibit air from undesirably escaping from an interior of the cooking device 20 between the hood 40 and the base 48. The cooking device 20 may include a wide variety of thermal seals and all of such possibilities are intended to be within the spirit and scope of the present disclosure. In the illustrated example, the thermal seal 281 includes a basin or receptacle 282 on two sides of the base 48 both of which are configured to contain a liquid such as, for example, water. Portion or bottom edges 283 of the hood 40 are submerged within the liquid contained within the receptacles 282, thereby creating a thermal seal between the hood 40 and the base 48.

The cooking device 20 disclosed herein is configured to provide a more controlled and uniform environment therein. The environment is comprised of air flow, temperature and humidity. The cooking device 20 provides significant control of these characteristics. For example, cooking device 20 is separated into a plurality of zones. Smaller, divided zones within the cooking device and independent control thereof provide smaller environments which are easier to control than one larger environment. Additionally, with respect to independent control of each cooking zone, the fan, the air return and the air discharge are positioned within each cooking zone in a manner that limits air turbulence and controls the air throughout the coking zone in a more effective manner. The positioning of the components within each cooking zone and the independent control of each cooking zone facilitate more uniform temperature in the cooking locations of the cooking zones. Whereas, in conventional cooking devices, such conventional cooking devices may have a single large cooking cavity and blow heated air into the large cooking cavity from a top of the cooking cavity. In such a large cooking cavity, the air is free to move around in the cavity in a turbulent and uncontrolled/natural manner, which results in non-uniform temperatures within the large cooking cavity. Non-uniform temperatures result in unpredictable and/or unreliable cooking operation of the food product.

Referring now to FIGS. 5, 17 and 18, the illustrated example of the cooking device 20 includes a cleaning device 288 capable of cleaning the main conveyor belt 56. The main conveyor belt 56 wraps around various rollers 72 and is oriented between a pair of brushes 292. The brushes 292 are configured to engage the main conveyor belt 56 and brush or engage the main conveyor belt 56 to loosen or dislodge debris that is positioned on the main conveyor belt 56. The brushes 292 can have a variety of configurations and can be made of a variety of materials. For example, the brushes 292 may include a flat circumference, a plurality of projections or nodules extending outward from the circumference, a plurality of bristles, or any other configuration. Additionally, for example, the brushes 292 (including their circumference, projections, nodules, bristles, etc.) may be made out of a wide variety of materials including stainless steel, plastic, rubber, metal, composite materials, or any other material. In other examples, the cooking device 20 includes a single brush 292. In still other examples, the cooking device 20 includes any number of brushes 292 and all of such possibilities are intended to be within the spirit and scope of the present disclosure.

In the illustrated example, the main conveyor belt 56 passes between the pair of brushes 292. The first or top brush 292 engages a first surface 296 of the main conveyor belt 56 and the second or bottom brush 292 engages a second surface 300 of the main conveyor belt 56 opposite the first surface 296. In one example, the brushes 292 may be driven or rotated by a motor or other actuation device. In other examples, the brushes 292 may be passive and unpowered, whereby movement of the main conveyor belt 56 past the brushes 292 causes the brushes 292 to rotate. Returning to the illustrated example, the brushes 292 extend at least the width of the main conveyor belt 56 and in some cases wider than the main conveyor belt 56 to ensure the entire width of the main conveyor belt 56 is engaged by the brushes 292.

A plurality of sprayers 304 capable of spraying a fluid onto the main conveyor belt 56 are orientated adjacent to or near the main conveyor belt 56. In the illustrated example, the sprayers 304 are oriented downstream of the brushes 292 (downstream established based on the direction of movement of the main conveyor belt 56—in other words, the main conveyor belt 56 passes by the brushes prior to the sprayers 304). In this example, the sprayers 304 spray fluid onto the main conveyor belt 56 to loosen and/or dislodge debris that is on the main conveyor belt 56. By having the sprayers 304 downstream of the brushes 292, the brushes 292 may initially loosen and/or dislodge debris and the sprayers 304 will subsequently spray fluid onto the main conveyor belt 56 to remove the debris from the main conveyor belt 56. In one example, the sprayers 304 spray water. In another example, the sprayers 304 spray air. In a further example, the sprayers 304 may spray a mixture of water and cleaning solution or soap.

Returning to the illustrated example, the sprayers 304 extend at least the width of the main conveyor belt 56 and in some cases wider than the main conveyor belt 56 to ensure the entire width of the main conveyor belt 56 is sprayed by the sprayers 304. In other examples, the sprayers 304 may not extend the entire width of the main conveyor belt 56, but are capable of spraying the entire width of the main conveyor belt 56. In the illustrated example, the sprayers 304 are disposed below the main conveyor belt 56 or disposed below a nip 308 between the two brushes 292 through which the main conveyor belt 56 passes. The sprayers 304 spray the fluid upward toward the main conveyor belt 56. The sprayers 304 may also be generally directed toward the nip 308 between the two brushes 292. In another example, the sprayers 304 may be disposed above the main conveyor belt 56 or disposed above the nip 308. In such an example, the sprayers 304 would spray fluid downward toward the main conveyor belt 56. In this example, the sprayers 304 may also be directed toward the nip 308. In other examples, the cooking device 20 may include any number of sprayers arranged in any number of rows of sprayers or any other configuration. For example, some sprayers may be disposed above the main conveyor belt 56 and other sprayers may be disposed below the main conveyor belt 56.

The brushes 292 and sprayers 304 are disposed over a waste bin or container 312 which is configured to receive the sprayed fluid and any debris dislodged from the main conveyor belt 56. A drain 316 is positioned in a bottom of the waste bin 312 to evacuate the fluid and debris from the waste bin 312. In one example, the waste bin 312 is continuously drained under gravity. In another example, the cooking device 20 may include a pump to assist with draining the contents out of the waste bin 312. In one example, a sensor 320 (see FIG. 36) may be positioned in the waste bin 312 to sense a height of fluid accumulating in the waste bin 312. If the fluid level is too high and activates the sensor 320, the sensor 320 will send data to the control member 94 of the cooking device 20 to indicate a high fluid level in the waste bin 312. The control member 94 may react in a variety of manners. In one example, the control member 94 may shutdown the cooking device 20. In another example, the control member 94 may activate one or more of a visual indicator 324 (e.g., an illumination device such as a light, LED, display an item on a monitor or display, etc.) and an audible indicator 328 (e.g., such as an audible alarm, bell, speaker, etc.). In a further example, the control member 94 may send data or a communication to a server, database or other electronic device where the data will be stored and/or acted upon by at least one of a person or an electronic device. In still a further example, the control member 94 may shutdown the cleaning device 288. In such an example, the cleaning device 288 may include one or more valves 350 to selectively interrupt the flow of water to the cleaning device 288 and/or may interrupt power to the cleaning device 20.

Referring now to FIGS. 22-35, another example of a cooking device 20B is illustrated. The cooking device 20B includes many similarities to the cooking devices illustrated in FIGS. 1-21 and 36, and all of such similarities may be identified with like reference numbers and a "B". At least some of the differences between the cooking device 20B and the other cooking devices illustrated in FIGS. 1-21 and 36 will be described herein. It should be understood that the cooking device 20B is capable of having any of the structure, functionality and other examples or alternatives of the other cooking devices described herein in any combination. Accordingly, for the sake of brevity, it is not necessary to repeat each and every possible example and alternative associated with each component and functionality of the cooking device 20B. All of such possibilities are intended to be with in the spirit and scope of the present disclosure. It should further be understood that reference to one or more possible other examples or alternatives associated with the cooking device 20B or a lack of addressing other possible examples or alternatives for the sake of brevity is not intended to be limiting upon the present disclosure.

As indicated above, the cooking devices disclosed herein are capable of including any number of cooking zones and all of such possibilities are intended to be within the spirit and scope of the present disclosure. With particular reference to FIGS. 22-25, in the illustrated example, the cooking device 20B includes six cooking zones 124B, 128B, 132B, 136B, 400, 404. In the illustrated example, air flow through the cooking zones are represented by arrows 408. Similarly to the other cooking devices disclosed herein, the airflow in the cooking device 20B flows in alternating directions from zone to zone. Particular reference is made to FIG. 23 for examples of the airflow directions through the plurality of cooking zones. In the illustrated example, the cooking zones are designed to have substantially similar structure and function. By having the cooking zones substantially similar, the cooking zones have more uniform operation and equal behavior, thereby making it easier to add or subtract cooking zones to or from the cooking device 20B as desired. For example, with reference to FIG. 23, the zones are all shown as having the same length or same dimension W in the longitudinal direction of the cooking device 20B. It should also be understood that, in some examples, the cooking zones may also have the same width/depth and same height as each other so that all three dimensions of all the zones are the same.

It should be understood that the cooking device 20B is capable of having all the other examples and alternatives described above with respect to airflow therethrough. Additionally, in some examples, it should be understood that the shape and size of the cooking zones and the components of the cooking device 20B included in each of the cooking zones may vary greatly and any and all of such variations are intended to be within the spirit and scope of the present disclosure.

Figure 26:
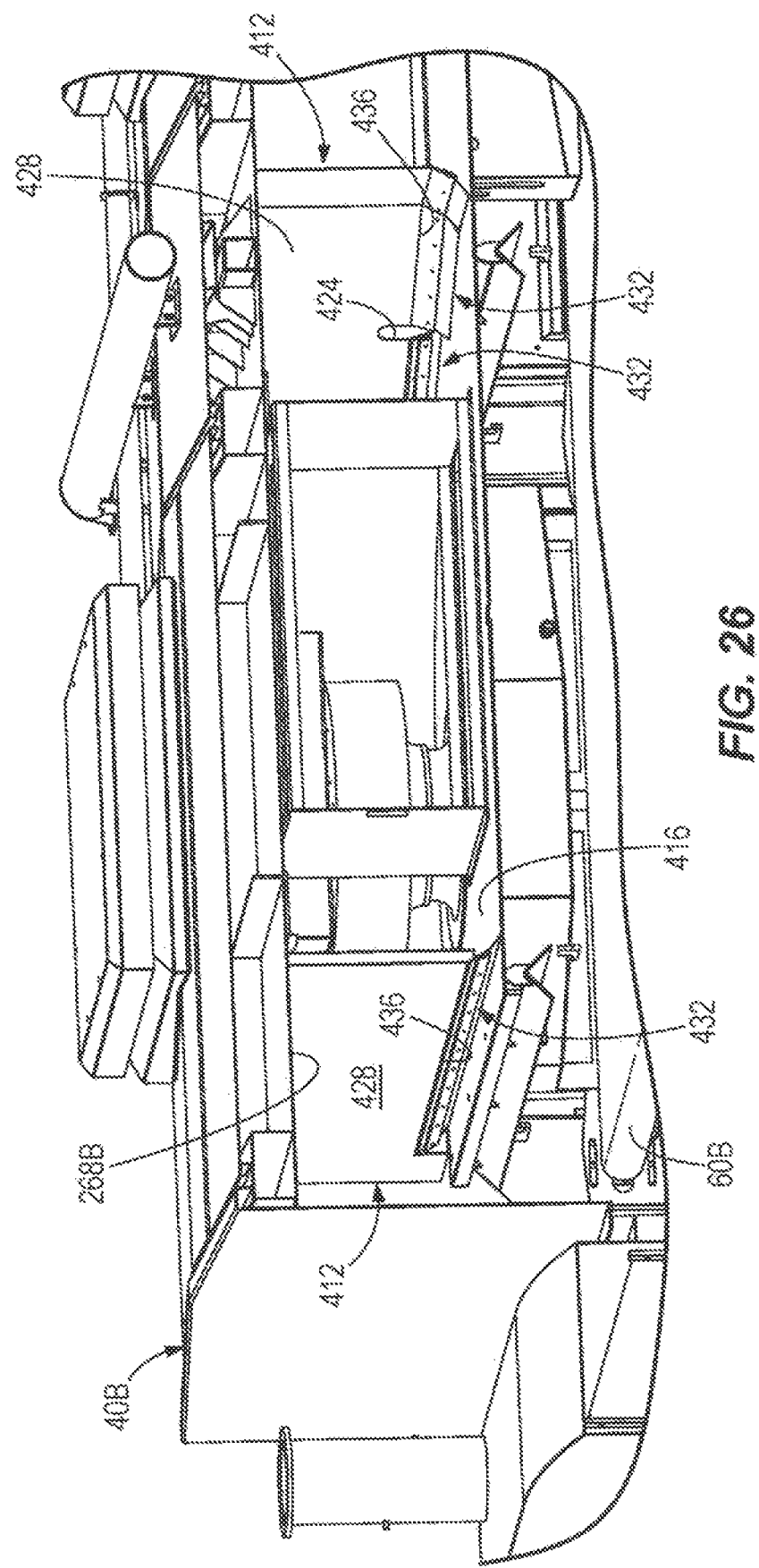
FIG. 26 is a top perspective view of a portion of the cooking device shown in FIG. 22 with one example of a plurality of zone dividing members, according to one aspect of the present disclosure.
Figure 27:
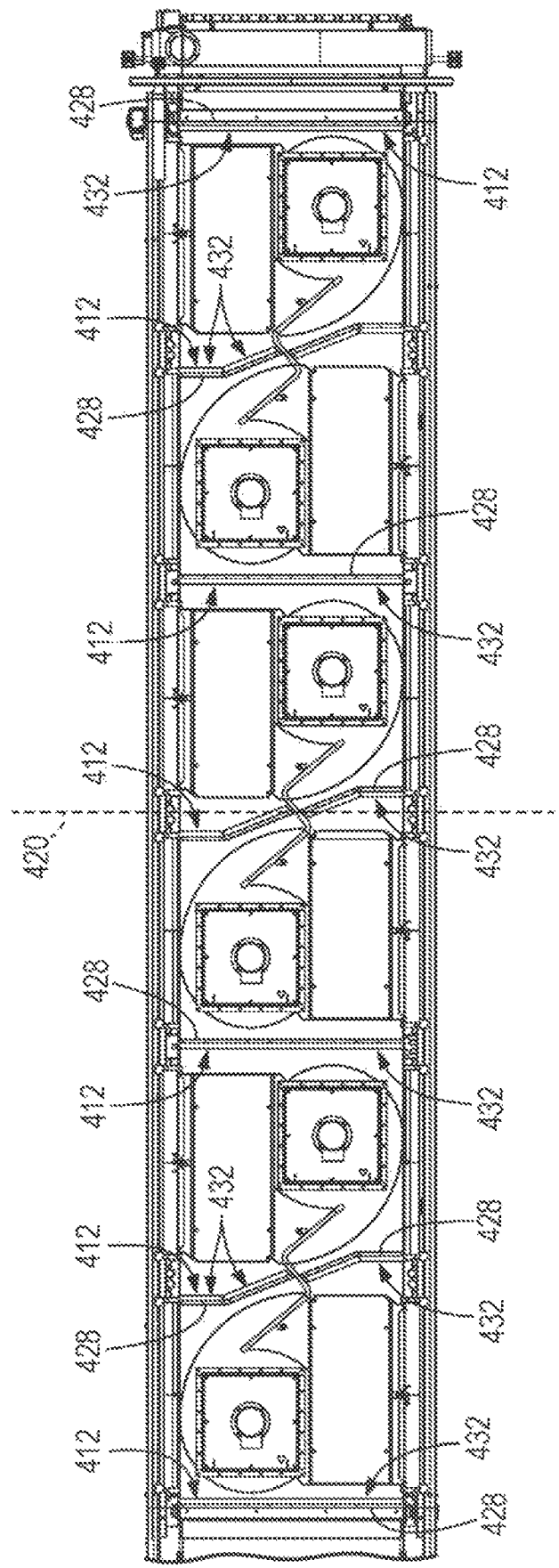
FIG. 27 is a partially broken away top view of the cooking device shown in FIG. 22 with a portion of the cooking device broken away to illustrate the zone dividing members illustrated in FIG. 26, according to one aspect of the present disclosure.

Referring now to FIGS. 26 and 27, the cooking device 20B includes one example of a plurality of sealing members or zone dividing members 412. The zone dividing members 412 are configured to assist with separating the cooking zones from one another and, for example, separate the environments within the cooking zones from one another. For example, as described above, it may be desirable to independently control the environment within each of the plurality of cooking zones. The zone dividing members 412 assist with separating these environments and make it easier to control these environments.

In the illustrated examples, the zone dividing members 412 extend downward from a top, inner surface 268B of the hood 40B and engage a surface 416 within the cooking device 20B. In the illustrated example, the zone dividing members 412 are positioned at the ends of the cooking device 20B (near the inlet and outlet of the cooking device 20B) to assist with defining the two end cooking zones, and positioned between the cooking zones. The zone dividing members 412 are capable of having a wide variety of shapes, sizes and configurations. In some examples, the zone dividing members 412 may all have a similar size, shape and configuration. In other examples, including the illustrated example, the zone dividing members 412 may have different shapes relative to each other.

With continued reference to FIGS. 26 and 27, the zone dividing members 412 near the inlet and outlet of the cooking device 20B are substantially straight and vertical. Proceeding inward from these zone dividing members 412 toward a longitudinal center 420 of the cooking device 20B, the next zone dividing members 412 are not substantially straight (e.g., could be considered zig-zag shaped). Continuing to proceed inward toward the longitudinal center 420 of the cooking device 20B, the next zone dividing members 412 are straight and a centrally located zone dividing member 412 is not straight (e.g., could be considered zig-zag shaped). Accordingly, in the illustrated example, the zone dividing members 412 alternate from straight to non-straight from one end of the cooking device 20B to the other end. In one example, the zone dividing members 412 alternate in shape in order to accommodate the orientation of the components within each cooking zone. For example, the orientation of at least one of the fan, air chambers, etc., within the cooking zones requires a non-straight zone dividing member 412 on one end of each cooking zone and a straight zone dividing member 412 on the other end of each cooking zone. Also, in the illustrated example, at least some of the zone dividing members 412 may include an aperture, slot or cutout 424 therein for allowing other components of the cooking device 20B to pass therethrough or thereby. In the illustrated example, the non-straight zone dividing members 412 include a slot 424 therein to allow components associated with the humidifying and/or cleaning capabilities of the cooking device 20B.

With additional reference to FIGS. 26 and 27, each zone dividing member 412 includes a rigid portion 428 and a flexible portion 432 extending from a bottom edge 436 of the rigid portion 428. The flexible portion 432 of each of the zone dividing members 412 is configured to engage the surface 416 within the cooking device 20B, thereby causing the flexible portion 432 to flex relative to the rigid portion 428 and the surface 416 within the cooking device 20B. The flexible portion 432 of each zone dividing member 412 provides a seal between the zone dividing members 412 and the surface 416 within the cooking device 20B, and allows for tolerances or variations that may occur within the cooking device 20B that may not be able to be facilitated by completely rigid zone dividing members.

Figure 28:
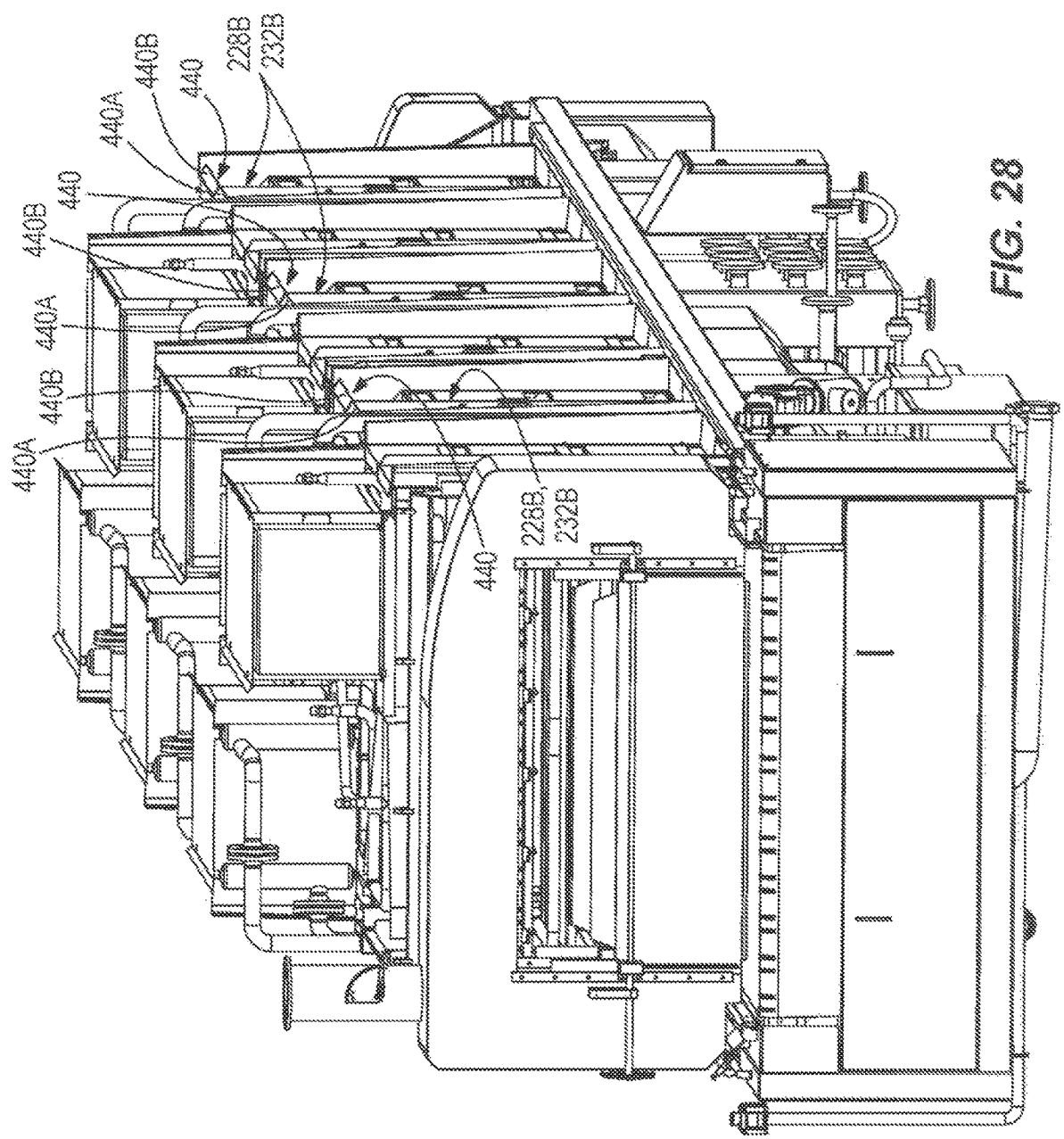
FIG. 28 is a top perspective view of the cooking device shown in FIG. 22 with one example of a plurality of discharge flanges, according to one aspect of the present disclosure.
Figure 29:
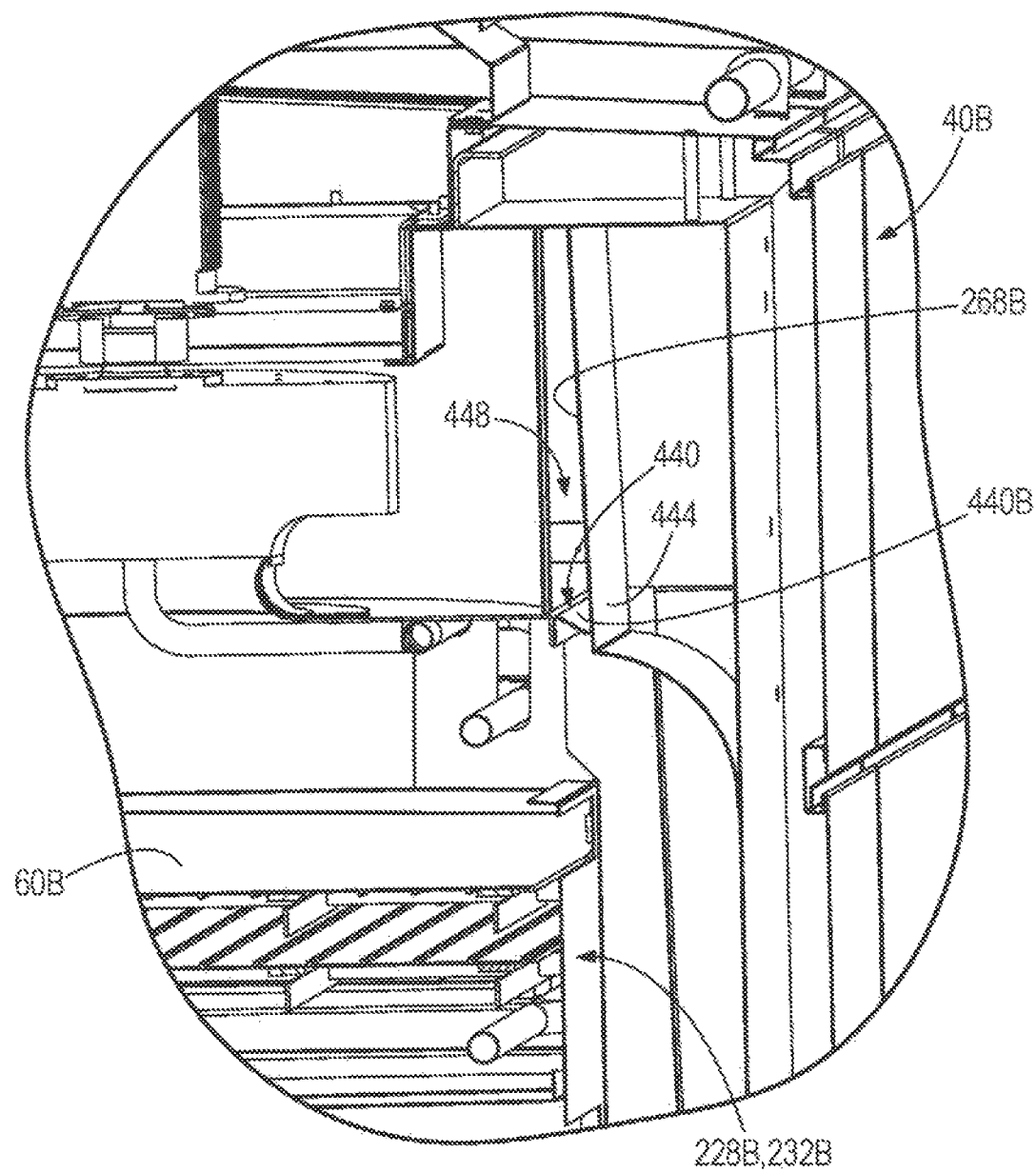
FIG. 29 is an enlarged perspective view of one of the discharge flanges shown in FIG. 28, according to one aspect of the present disclosure.

Referring now to FIGS. 28 and 29, at least some of the side plates 228B, 232B of the cooking device 20B include a flange 440 to assist with controlling the environment within each of the cooking zones. More particularly, the flanges 440 are configured to assist with defining air paths within the cooking zones to inhibit air from undesirably escaping the air paths. In the illustrated example, the side plates 228B, 232B that at least partially define the air return paths of the cooking zones include the flange 440. In one example, these flanges 440 engage a portion 444 of the inner surface 268B of the hood 40B to inhibit air from escaping the return air paths between the hood 40B and a portion of the cooking device 20B. These flanges 440 substantially close-off or seal gaps 448 between the inner surface of the hood 268B and a portion of the cooking device 20B associated with the cooking zones (see FIG. 29). In the illustrated example, the flanges 440 are angled downward relative to a horizontal plane. In other examples, the flanges 440 may have any shape, size and configuration and all of such possibilities are intended to be within the spirit and scope of the present disclosure. In one example, the flanges 440 engage the inner surface 268B of the hood 40B in the gaps 448. In other examples, the flanges 440 do not engage the inner surface 268B of the hood in the gaps 448, but still substantially close off or seal the gaps 448.

As indicated above, it should be understood that each cooking zone may include a single side plate 228B, 232B or a pair of sides plates at the sides of the cooking zones. In the illustrated example, each side plate 228B, 232B is comprised of a pair of side plates that pivot or rotate (similar to the pair of side plates 340 described above). In this illustrated example, the flange 440 is comprised of a pair of flanges 440A, 440B with one flange extending from a top and the length of a respective one of the two side plates. In other examples that include a single side plate 228B, 232B at the sides of each cooking zone, the flange 440 is a single flange 440 extending from a top and along the length of the single side plate 228B, 232B.

Figure 30:
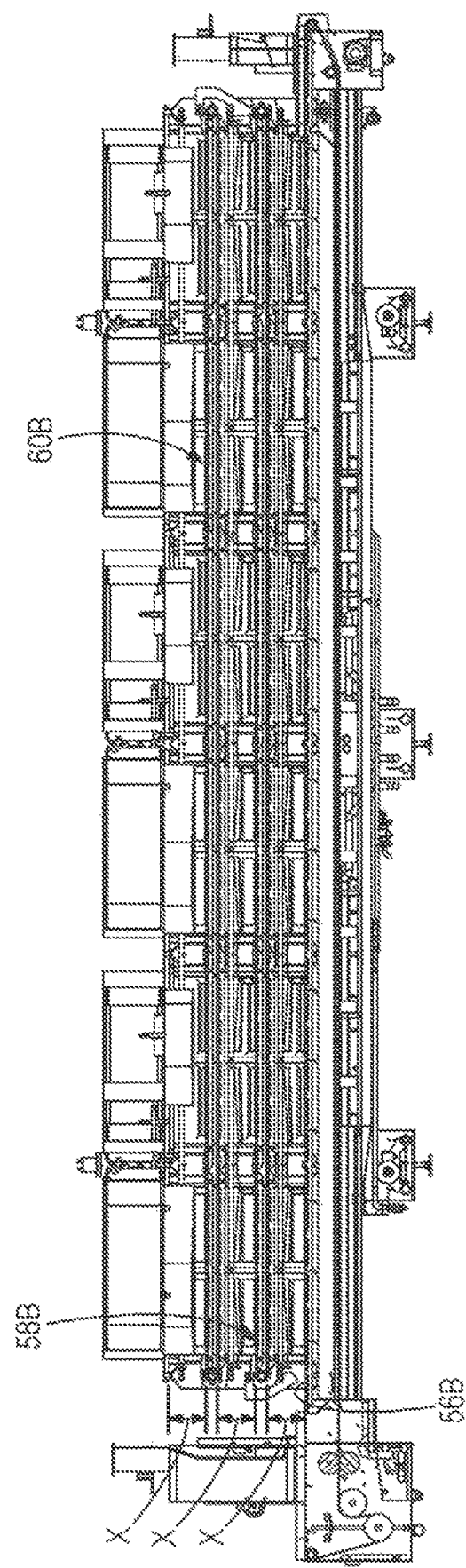
FIG. 30 is a cross-sectional view taken along line 30-30 in FIG. 22 showing an elevation of the cooking device shown in FIG. 22, according to one aspect of the present disclosure.
Figure 31:
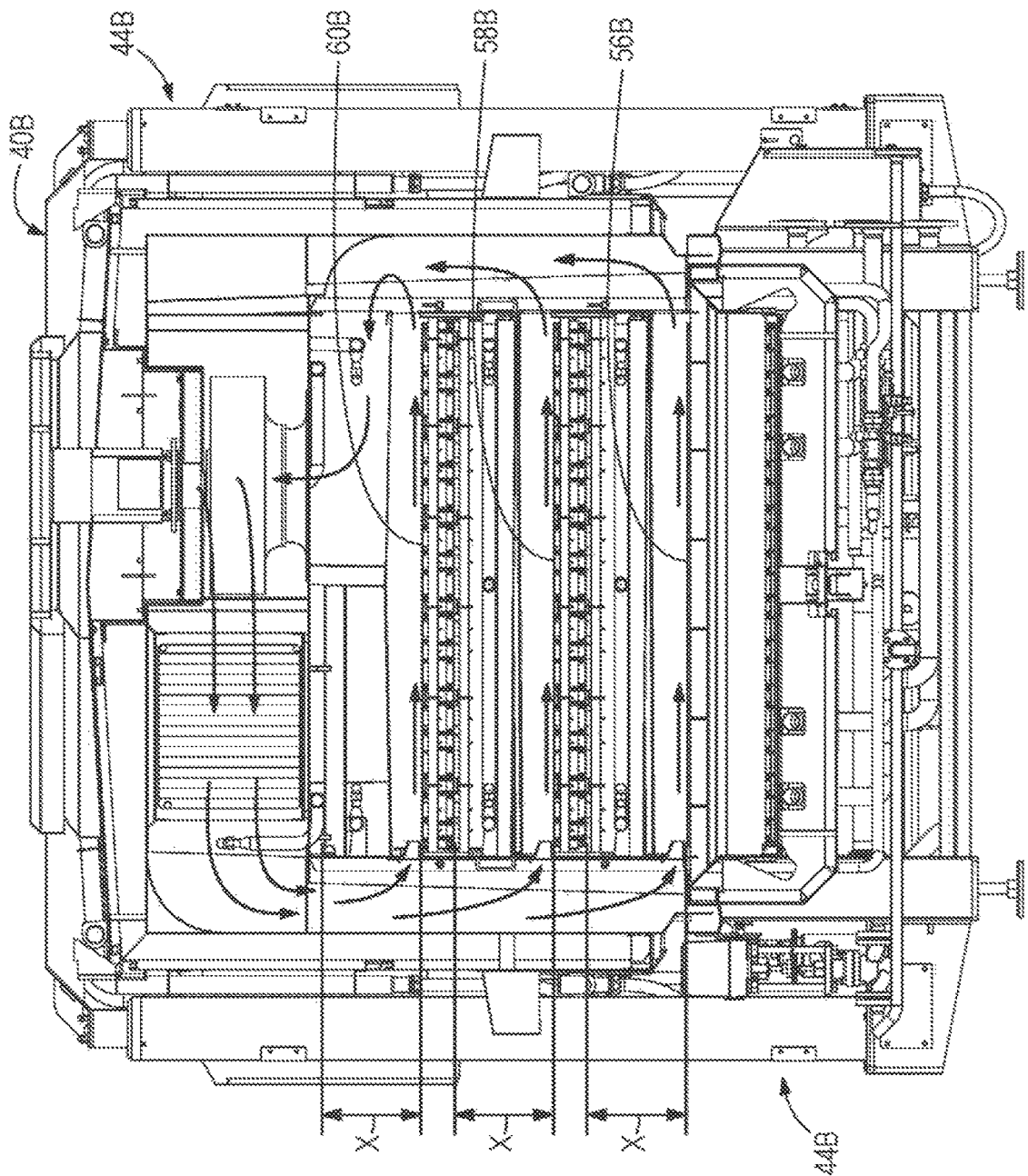
FIG. 31 is a cross-sectional view taken along line 31-31 in FIG. 23, according to one aspect of the present disclosure.

With reference to FIGS. 30 and 31, one example of the plurality of transport members or conveyor belts 56B, 58B, 60B of the cooking device 20B is illustrated. In this example, the plurality of transport members 56B, 58B, 60B are positioned more closely together in a vertical manner (see dimension X) than in other cooking devices disclosed herein (see, for example, dimension Z in FIG. 5). By decreasing the overall vertical distance between transport members 56B, 58B, 60B, the overall height of the cooking device 20B may be decreased, thereby providing efficiencies. Moreover, by having a lower overall height of the cooking device 20B, the height provided by the hood 40B when lifted upward by the lifting mechanisms 44B will also be lower. Decreasing the overall height of the hood 40B when lifted upward will allow the cooking device 20B to be used in more environments and/or facilities with limited overhead space. Also, for example, the overall height of the cooking zones is reduced, thereby providing less space or environment within the cooking zones to control. That is, environments within smaller spaces may be easier to control than environments within larger spaces. As a result of more easily controlled spaces and environments, the cooking device 20B requires less energy and/or resources to operate the cooking device 20B in a desired manner. Accordingly, the cooking device 20B is more efficient and may be less expensive to operate.

Figure 32:
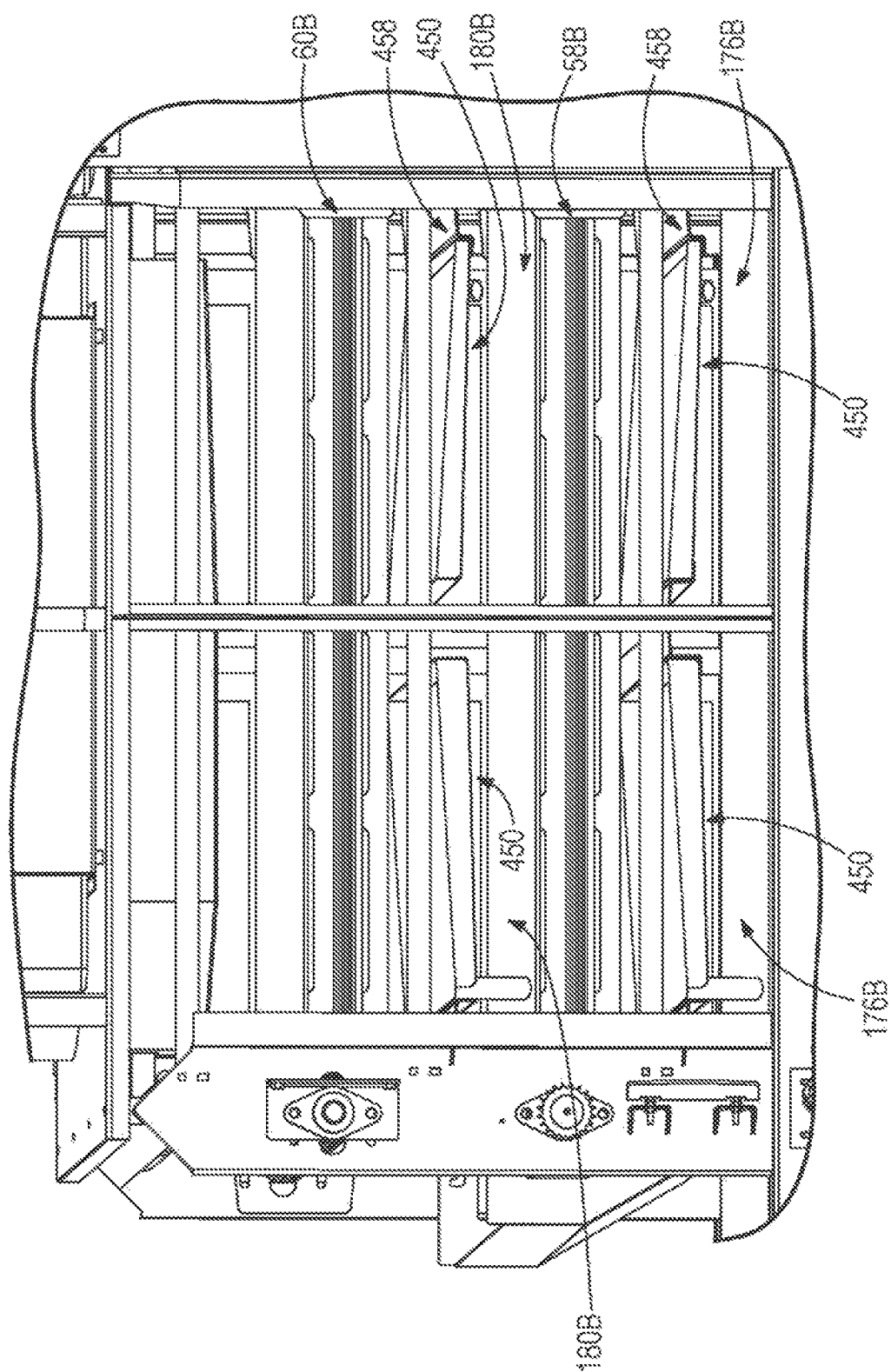
FIG. 32 is a top perspective view of a portion of the cooking device shown in FIG. 22 with a side plate removed to expose one example of a plurality of drip pans/air guides, according to one aspect of the present disclosure.
Figure 33:
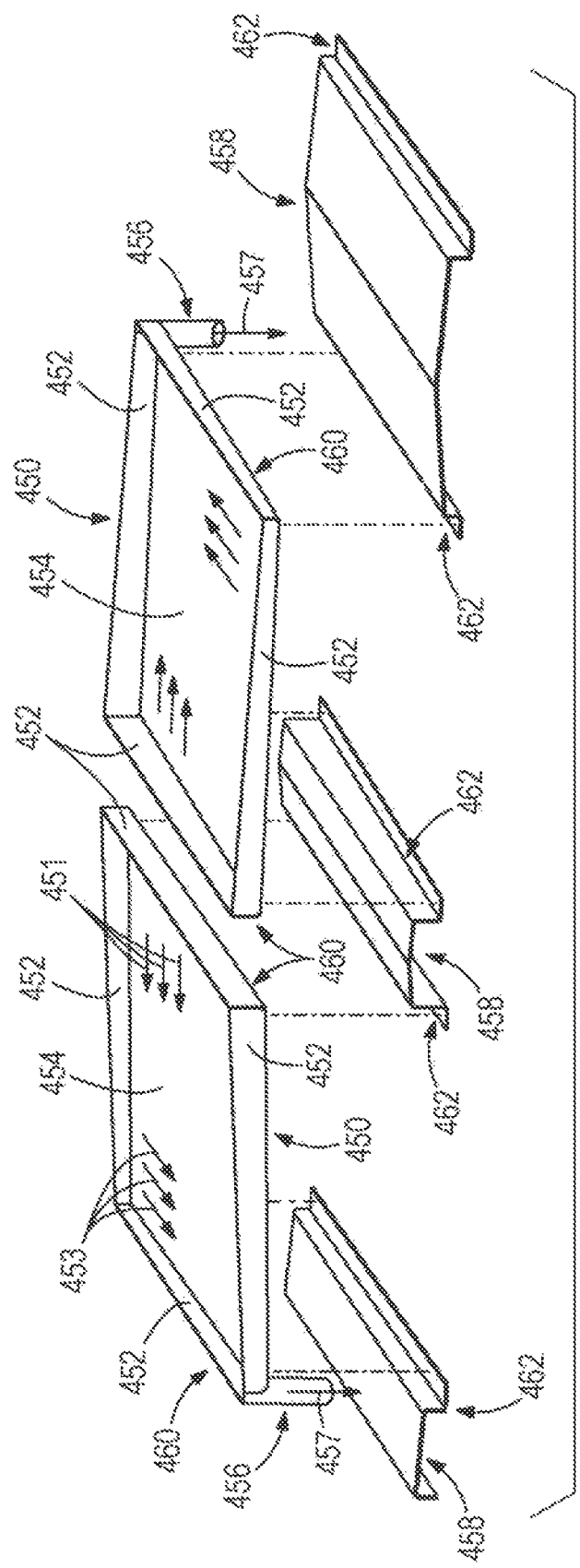
FIG. 33 is a partially exploded top perspective view of one of the plurality of drip pans/air guides shown in FIG. 32 along with one example of a plurality of support members configured to support the drip pans/air guides, according to one aspect of the present disclosure.

Referring now to FIGS. 32 and 33, the cooking device 20B includes one example of a plurality of drip pans 450. In the illustrated example, the cooking device 20B includes four drip pans 450 in each cooking zone. In each cooking zone, two of the drip pans 450 are positioned underneath the upper conveyor belt 60B and two drip pans 450 are positioned under the middle conveyor belt 58B. The drip pans 450 positioned under the upper conveyor belt 60B are configured to catch grease, food product, portions of food product, or any other debris that falls from the upper conveyor belt 60B. Similarly, the drip pans 450 positioned under the middle conveyor belt 58B are configured to catch grease, food product, portions of food product, or any other debris that falls from the middle conveyor belt 58B. In other examples, the cooking device 20B may include any number of drip pans 450 in each cooking zone and all of such possibilities are intended to be within the spirit and scope of the present disclosure. For example, the cooking device 20B may alternatively include a single drip pan under the upper conveyor belt 60B and a single drip pan under the middle conveyor belt 58B in each zone. In other examples, each cooking zone of the cooking device 20B may include more than two drip pans.

With particular reference to FIG. 32, in the illustrated example, the plurality of drip pans 450 are substantially identical in shape, size and configuration. In other examples, the drip pans 450 may have different shapes, sizes and configurations relative to each other and all of such possibilities are intended to be within the spirit and scope of the present disclosure.

Referring now to FIG. 33, a pair of the plurality of drip pans 450 are illustrated and will be described herein. The drip pans 450 are substantially identical in configuration and functionality, and it should be understood that the following description applies to all of the drip pans 450 included in the cooking device 20B. Each drip pan 450 includes a plurality of vertical walls 452 extending upward from a base or floor 454 of the drip pan 450 and a drain 456. In the illustrated example, the drain 456 is positioned in or near a corner of the drip pan 450, and the floor 454, in the illustrated example, is angled in two directions or manners relative to horizontal toward the drain 456. More particularly, with respect to the drip pan 450 illustrated on the left in FIG. 33, the floor 454 of the drip pan 450 angles, as viewed in FIG. 33 downward from right to left (represented by arrows 451) and from the rear to the front (represented by arrows 453), with both directions being toward the drain 456. Accordingly, grease or debris falling onto the drip pan 450 will flow or move under the force of gravity toward the drain 456. Any such grease and/or debris may then pass through the drain 456 and exhausts or exit from the drip pan 450 as represented by arrows 457.

Referring again to FIG. 32, the two drip pans 450 on the left (as viewed in FIG. 32) are positioned in the cooking device 20B in a first orientation and the two drip pans 450 on the right are positioned in the cooking device 20B in a second orientation. In the illustrated example, the two drip pans 450 on the right are positioned in the cooking device 20B at about a 180-degree rotated position relative to the drip pans 450 on the left. Thus, the drains 456 for the drip pans 450 on the left are positioned on one side of the cooking device 20B (the near side as viewed in FIG. 32) and the drains 456 for the drip pans 450 on the right are positioned on an opposite side of the cooking device 20B (the far side as viewed in FIG. 32). Additionally, in the illustrated example, the drains 456 of the upper drip pans 450 are substantially vertically aligned with the drains 456 of the lower drip pans 450 such that any grease, debris, etc., exhausted or dripping from the drains 456 of the upper drip pans 450 falls into the drains 456 of the respective lower drip pans 450.

With reference to FIGS. 32 and 33, in the illustrated example, the plurality of drip pans 450 are selectively couplable and removable from the cooking device 20B in order to facilitate cleaning, replacement and/or repair of the drip pans 450. In the illustrated example, the cooking device 20B includes a plurality of support members 458 configured to support the drip pans 450 within the cooking device 20B. The support members 458 are positioned within the cooking device 20B to support two, opposite sides 460 of each drip pan 450. In other examples, the plurality of drip pans 450 may be supported on any number of sides or supported within the cooking device 20B in any manner. In the illustrated example, the support members 458 include one or more generally L-shaped edge(s) 462 that is/are complementarily shaped to a corresponding edge or sides 460 of the drip pans 450. The drip pans 450 rest or are supported on the L-shaped edges 462 of the support members 458. This type of support or coupling of the drip pans 450 to the cooking device 20B provides vertical support to the drip pans 450 to inhibit the drip pans 450 from falling downward in the cooking device 20B, but allow horizontal sliding of the drip pans 450 relative to the cooking device 20B to enable the drip pans 450 to be removed from and inserted into the cooking device 20B. It should be understood that the drip pans 450 may be supported in or coupled to the cooking device 20B in a wide variety of manners and all of such manners are intended to be within the spirit and scope of the present disclosure.

With continued reference to FIG. 32, the drip pans 450 also act as air guiding plates to assist with guiding air in a desired manner through the cooking zones. In this manner, the drip pans/air guiding plates 450 are dual functional members. In the illustrated example, the drip pans/air guiding plates 450 are positioned in the lower and middle cooking areas 176B, 180B to assist with directing air in the lower and middling cooking areas 176B, 180B. The drip pans/air guiding plates 450 provide a ceiling or upper limit to the lower and middle cooking areas 176B, 180B to inhibit heated air from escaping the lower and middle cooking areas 176B, 180B through a top thereof. In this way, heated air remains in the lower and middle cooking areas 176B, 180B to heat the food product passing therethrough. Furthermore, the drip pans/air guiding plates 450 assist with providing optimal air speeds and/or reduce air turbulence in the cooking areas 176B, 180B.

Figure 34:
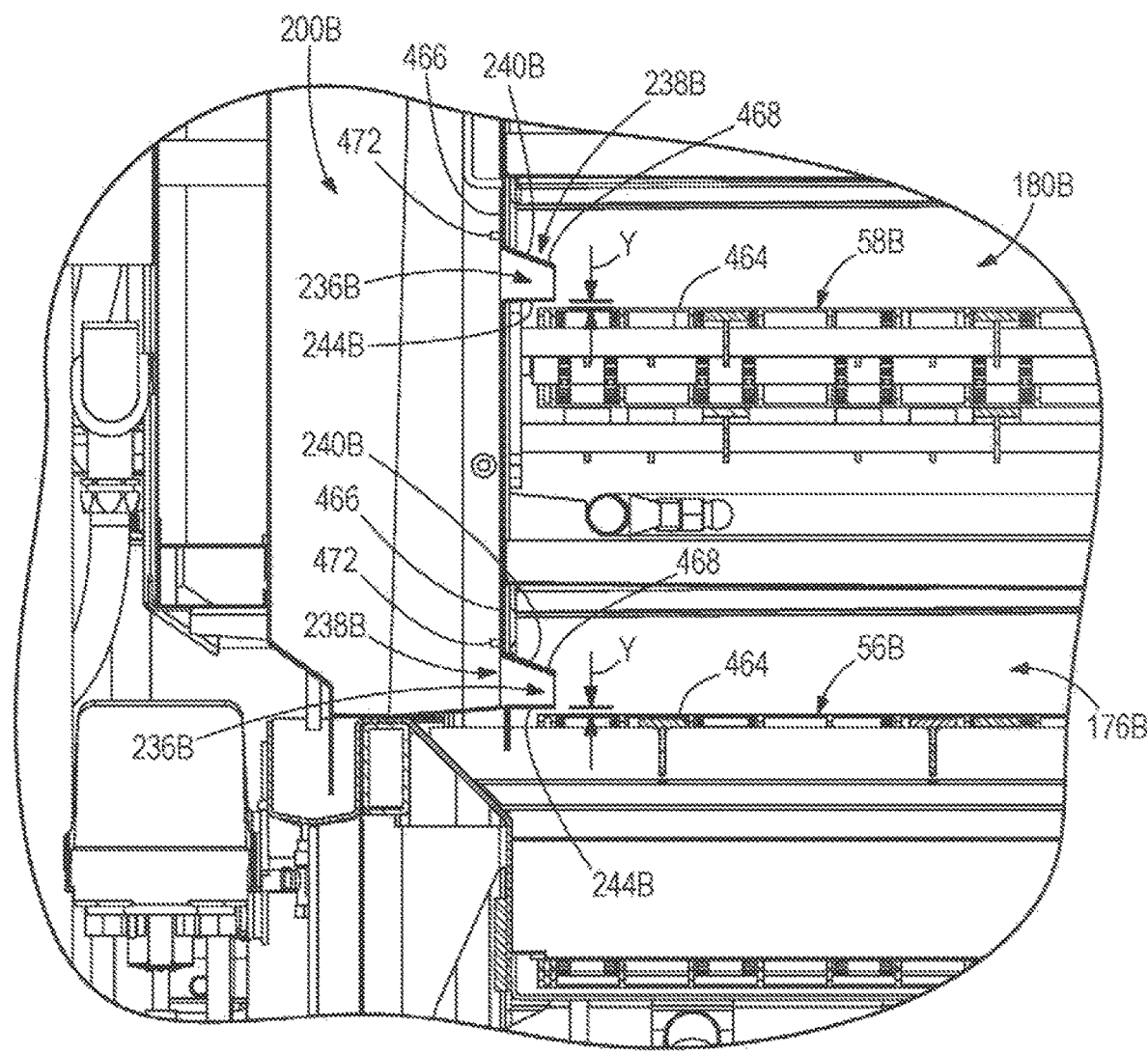
FIG. 34 is a cross-sectional view similar to a portion of FIG. 31 showing positioning of nozzles relative to the conveyor belts, according to one aspect of the present disclosure.

With reference to FIG. 34, the cooking device 20B is shown with a plurality of nozzles 238B oriented just above or very close (see dimension Y) to a top surface 464 of each of the conveyor belts 56B, 58B, 60B. The nozzles 238B are oriented to blow or exhaust heated air very close to the top surface 464 of the conveyor belts 56B, 58B, 60B and at the level of the food product being transported through the cooking device 20B on the conveyor belts 56B, 58B, 60B rather than at a level above the food product. In the illustrated example, the cooking device 20B does not include guide members at edges of the conveyor belts 56B, 58B, 60B (see FIG. 7 associated with cooking device 20 for guide members 262). The presence of guide members may prohibit the nozzles 238B from being positioned close or adjacent to the top surfaces 464 of the transport members 56B, 58B, 60B and at the level of the food product. By removing or not including the guide members, the nozzles 238B can be positioned lower in the cooking areas 176B, 180B, 184B.

Figure 35:
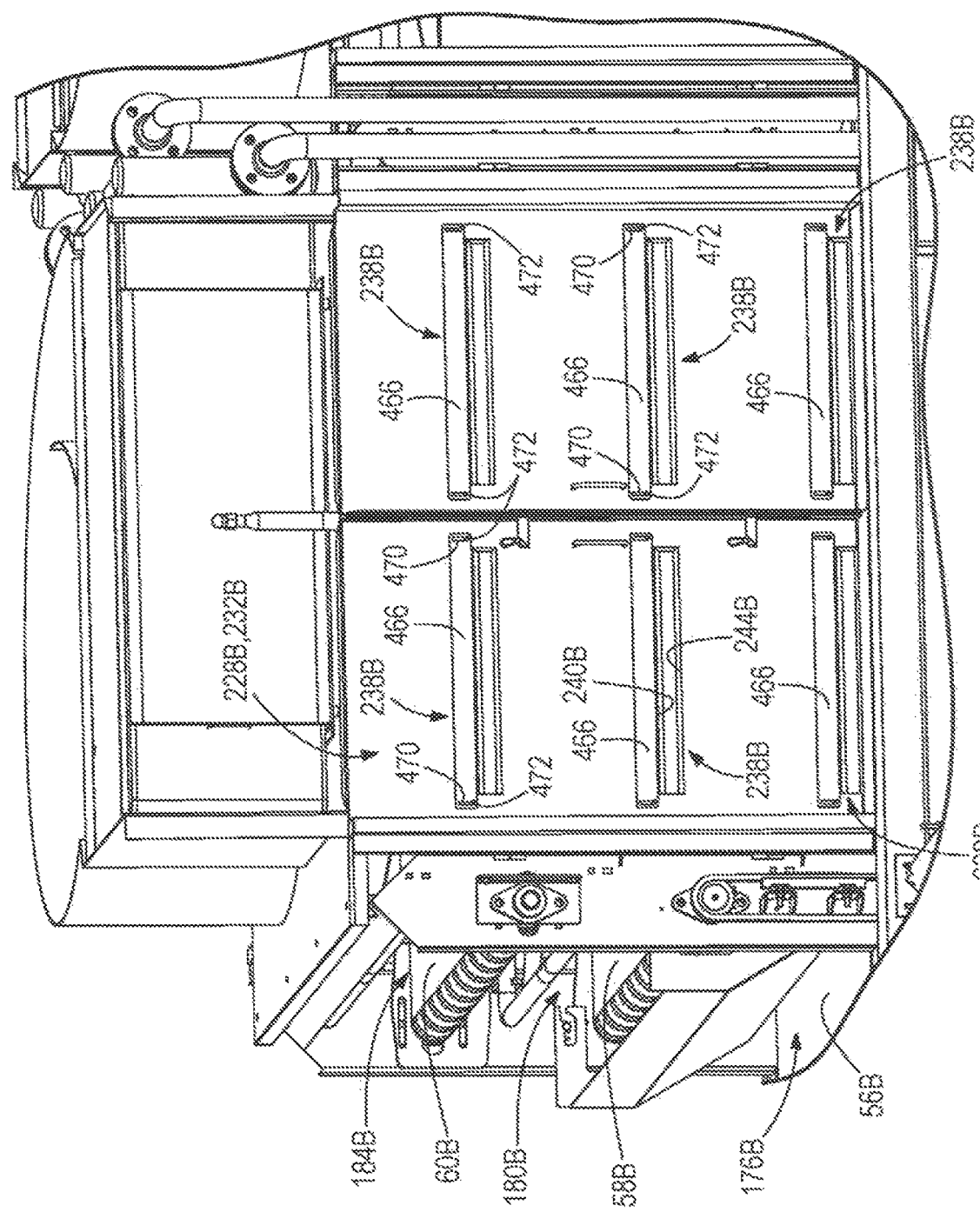
FIG. 35 is a top perspective view of one example of a side plate of the cooking device shown in FIG. 22, according to one aspect of the present disclosure.

With reference to FIGS. 34 and 35, one example of a side plate 228B or 232B is illustrated and includes a plurality of nozzles 238B. In the illustrated example, each nozzle 238B includes a pair of converging plates 240B, 244B having an inlet and an outlet with the outlet of the nozzle 238B being smaller than the inlet. This nozzle 238B configuration increases the velocity and/or flow rate of the heated air as it passes from the air infeed path 200B into the cooking locations 176B, 180B, 184B. It should be understood that the nozzles 238B may have any configuration and all of such possibilities are intended to be within the spirit and scope of the present disclosure. Returning to the illustrated example, the nozzles 238B may be adjustable to adjust the spacing between the two plates 240B, 244B, thereby effecting the airflow in a manner described above with respect to the cooking device 20. In the illustrated example, the upper plate 240B is moveable and the lower plate 244B is fixed and a rigid part of the side plate 228B, 232B. In the illustrated example, the upper plate 240B is adjusted vertically. That is, a height of each of the openings 236B is adjusted to be higher or lower by moving the upper plate 240B. Each upper plate 240B includes a vertical portion 466 and an angled portion 468. The vertical portion 466 defines a pair of slots 470 therein configured to each receive a projection 472 therein. The slots 470 and projections 472 cooperate to facilitate vertical sliding of the upper plate 240B relative to the side plate 228B, 232B and inhibit horizontal movement of the upper plate 240B relative to the side plate 228B, 232B. The projections 472 may be threaded members such as, for example, bolts, and complementary threaded members, such as, for example, nuts, may cooperate with the projections 472 to selective secure or couple the upper plate 240B in place relative to the side plate 228B, 232B. The angled portion 468 extends from the vertical portion 466 at an obtuse angle into the cooking locations 176B, 180B, 184B to direct heated air into the cooking locations 176B, 180B, 184B. As can be seen in FIG. 34, the lower plate 244B of the nozzle 238B is extremely close or adjacent to the top surface 464 of the conveyor belts 56B, 58B, 60B (see dimension Y). In the illustrated example, the cooking device 20B does not include product guiding. However, with the nozzles 238B positioned in close proximity to the top surfaces 464 of the conveyor belts 56B, 58B, 60B, the nozzles 238B themselves may act as guiding members since any food product approaching edges of the conveyor belts 56B, 58B, 60B would engage the nozzles 238B and be biased away from the edges of the conveyor belts 56B, 58B, 60B by the nozzles 238B.

Figure 36:
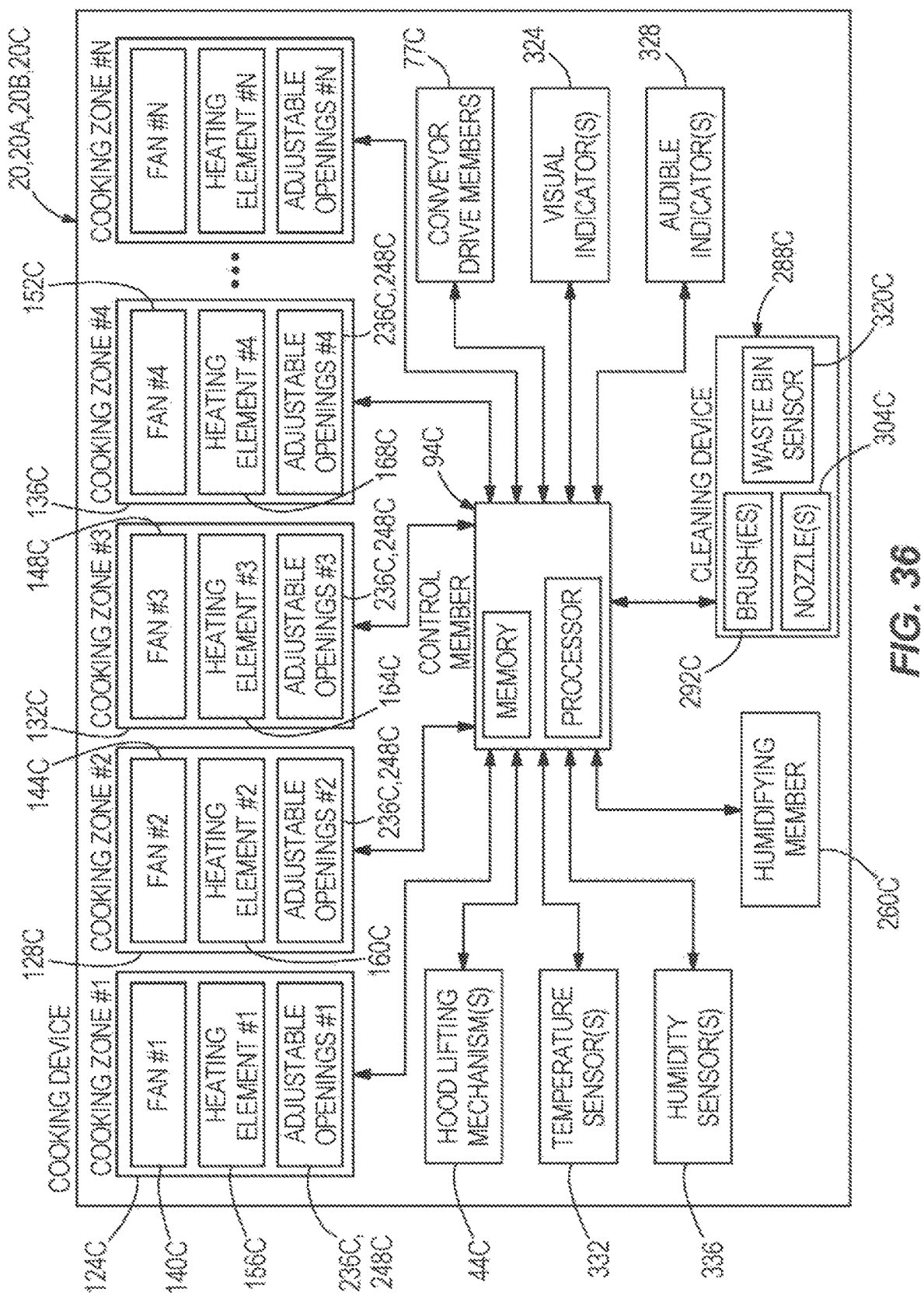
FIG. 36 is one example of a block diagram of one example of a cooking device, according to one aspect of the present disclosure.

Referring now to FIG. 36, one example of a block diagram associated with one example of a cooking device 20C is illustrated. The block diagram is not intended to be limiting upon any of the cooking devices disclosed herein, but is rather provided to demonstrate at least some of the principles of the present disclosure. At least some of the components included in this exemplary block diagram have been introduced and described above in detail. Moreover, any of the components or functionality disclosed in the block diagram or described herein with respect to the block diagram may be incorporated into any of the cooking devices disclosed herein in any quantity and in any combination, with all of such possibilities intended to be within the spirit and scope of the present disclosure.

In the illustrated example, the cooking device 20C may also include a temperature sensor 332 and a humidity sensor 336 (see FIGS. 2 and 36) in communication with the control member 94C. The control member 94C receives data associated with the temperature sensor 332 and the humidity sensor 336 to maintain the cooking device 20C at a desired cooking condition. The cooking device 20C may include any number of temperature sensors 332 and any number of humidity sensors 336, both of which may be positioned anywhere within the cooking device 20C, and all of such possibilities are intended to be within the spirit and scope of the present disclosure. In one example, the cooking device 20C may include a single temperature sensor 332 and a single humidity sensor 336. In another example, the cooking device 20C may include a temperature sensor 332 and a humidity sensor 336 in each of the cooking zones 124C, 128C, 132C, 136C, #N. In a further example, the cooking device 20C may include a single humidity sensor 336 therein and a temperature sensor 332 in each of the cooking zones 124C, 128C, 132C, 136C, #N.

In one example, control member 94C communicates with the various components of the cooking device 20C to retrieve and/or send information or data as necessary. The control member 94C may include any necessary hardware, software or any combination thereof to achieve the processes, methods, functionalities, operations, etc., of the present disclosure.

In one example, the control member 94C may be comprised of one or more of software and/or hardware in any proportion. In such an example, the control member 94C may reside on a computer-based platform such as, for example, a server or set of servers. Any such server or servers may be a physical server(s) or a virtual machine(s) executing on another hardware platform or platforms. The nature of the configuration of such server or servers is not critical to the present disclosure. Any server, or for that matter any computer-based system, systems or elements described herein, will be generally characterized by one or more processors and associated processing elements and storage devices communicatively interconnected to one another by one or more busses or other communication mechanism for communicating information or data. In one example, storage within such devices may include a main memory such as, for example, a random-access memory (RAM) or other dynamic storage devices, for storing information and instructions to be executed by the processor(s) and for storing temporary variables or other intermediate information during the use of the control member 94C described herein. In one example, the control member 94C may also include a static storage device such as, for example, read-only memory (ROM), for storing static information and instructions for the processor(s). In one example, the control member 94C may include a storage device such as, for example, a hard disk or solid state memory, for storing information and instructions. Such storing information and instructions may include, but not be limited to, instructions to compute, which may include, but not be limited to processing and analyzing information of all types. RAMs, ROMs, hard disks, solid state memories, and the like, are all examples of tangible computer readable media, which may be used to store instructions which comprise processes, methods and functionalities of the present disclosure. Execution of such instructions by the control member 94C may cause the various computer-based elements of the control member 94C to perform the processes, methods, functionalities, operations, etc., described herein. In some examples, the control member 94C of the present disclosure may include hard-wired circuitry to be used in place of or in combination with, in any proportion, such computer-readable instructions to implement the disclosure.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the cooking devices and any component thereof may be utilized in any orientation and use of such terms is intended to correspond to the exemplary orientation of the cooking devices and its components illustrated in the drawings. The use of these terms in association with the cooking devices and their components are not intended to limit the cooking devices or its components to a single orientation or to limit the cooking devices and their components in any manner.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A cooking device comprising:
a first cooking zone with air configured to move horizontally there through in a first direction;
a second cooking zone with air configured to move horizontally there through in a second direction different than the first direction; and
a first conveyor belt, a second conveyor belt positioned above the first conveyor belt, and a third conveyor belt positioned above the first and second conveyor belts, wherein the first, second and third conveyor belts are at least partially positioned in the first cooking zone and the second cooking zone, wherein the first, second and third conveyor belts are configured to transport food product thereon through the first cooking zone and the second cooking zone.

2. The cooking device of claim 1, wherein the second direction is opposite the first direction.

3. The cooking device of claim 1, wherein the cooking device has a longitudinal extent, and wherein the first and second directions are transverse to the longitudinal extent.

4. The cooking device of claim 3, wherein the first and second directions are generally perpendicular to the longitudinal extent of the cooking device.

5. The cooking device of claim 1, wherein the cooking device includes a top, a bottom, an inlet end, an outlet end, a left side and a right side opposite the left side, wherein the first direction is from the left side to the right side, and wherein the second direction is from the right side to the left side.

6. The cooking device of claim 1, further comprising a first adjustable opening in fluid communication with the first cooking zone and a second adjustable opening in fluid communication with the second cooking zone, wherein heated air is configured to pass through the first adjustable opening into the first cooking zone and heated air is configured to pass through the second adjustable opening into the second cooking zone, and wherein a size of the first adjustable opening and a size of the second adjustable opening are adjustable.

7. The cooking device of claim 1, further comprising:
a first cooking location between the first conveyor belt and the second conveyor belt;
a second cooking location between the second conveyor belt and the third conveyor belt;
a third cooking location above the third conveyor belt;
a first adjustable opening in fluid communication with the first cooking location, wherein heated air is configured to pass through the first adjustable opening into the first cooking location;
a second adjustable opening in fluid communication with the second cooking location, wherein heated air is configured to pass through the second adjustable opening into the second cooking location; and
a third adjustable opening in fluid communication with the third cooking location, wherein heated air is configured to pass through the third adjustable opening into the third cooking location.

8. The cooking device of claim 7, wherein the first adjustable opening, the second adjustable opening and the third adjustable opening are adjustable independent of each other.

9. The cooking device of claim 7, wherein heated air moves horizontally through the first cooking location, the second cooking location and the third cooking location.

10. The cooking device of claim 1, further comprising:
a first air guiding plate positioned in the first cooking zone to at least partially assist with guiding air horizontally through the first cooking zone; and
a second air guiding plate positioned in the second cooking zone to at least partially assist with guiding air horizontally through the second cooking zone.

11. The cooking device of claim 1, further comprising:
a third cooking zone with air configured to move horizontally there through in the first direction; and
a fourth cooking zone with air configured to move horizontally there through in the second direction.

12. The cooking device of claim 11, wherein the first, second, third and fourth zones are consecutively positioned in the cooking device from an infeed end of the cooking device to an outlet end of the cooking device.

13. A cooking device comprising:
a first cooking zone with air configured to move horizontally there through in a first direction;
a second cooking zone with air configured to move horizontally there through in a second direction different than the first direction;
a first adjustable opening in fluid communication with the first cooking zone and a second adjustable opening in fluid communication with the second cooking zone, wherein heated air is configured to pass through the first adjustable opening into the first cooking zone and heated air is configured to pass through the second adjustable opening into the second cooking zone, and wherein a size of the first adjustable opening and a size of the second adjustable opening are adjustable;
a first adjustable nozzle defining the first adjustable opening therein, wherein the first adjustable nozzle includes a first member and a second member spaced apart from the first member to define the first adjustable opening therebetween, wherein at least one of the first member and the second member of the first adjustable nozzle are movable relative to each other to adjust a size of the first adjustable opening; and
a second adjustable nozzle defining the second adjustable opening therein, wherein the second adjustable nozzle includes a first member and a second member spaced apart from the first member to define the second adjustable opening therebetween, wherein at least one of the first member and the second member of the second adjustable nozzle are movable relative to each other to adjust a size of the second adjustable opening.

14. The cooking device of claim 13, wherein the first member and the second member of the first adjustable nozzle converge toward one another to provide a first nozzle inlet that is larger than a first nozzle outlet, and wherein the first member and the second member of the second adjustable nozzle converge toward one another to provide a second nozzle inlet that is larger than a second nozzle outlet.

15. The cooking device of claim 13, wherein one of the first member and the second member of the first adjustable nozzle is fixed and the other one of the first member and the second member of the first adjustable nozzle is moveable, and wherein one of the first member and the second member of the second adjustable nozzle is fixed and the other one of the first member and the second member of the second adjustable nozzle is moveable.

16. The cooking device of claim 13, further comprising a conveyor belt at least partially positioned in the first cooking zone and the second cooking zone, wherein the conveyor belt is configured to transport food product thereon through the first cooking zone and the second cooking zone.

17. A cooking device comprising:
- a first cooking zone with air configured to move horizontally there through in a first direction;
- a second cooking zone with air configured to move horizontally there through in a second direction different than the first direction;
- a first air guiding plate positioned in the first cooking zone to at least partially assist with guiding air horizontally through the first cooking zone; and
- a second air guiding plate positioned in the second cooking zone to at least partially assist with guiding air horizontally through the second cooking zone,
- wherein the first air guiding plate is also a first drip pan configured to catch debris within the first cooking zone, and wherein the second air guiding plate is also a second drip pan configured to catch debris within the second cooking zone.

* * * * *